US006704303B1

(12) United States Patent
Bowman-Amuah

(10) Patent No.: US 6,704,303 B1
(45) Date of Patent: Mar. 9, 2004

(54) IP/TELEPHONY USER INTERFACE FOR A HYBRID COMMUNICATION SYSTEM

(75) Inventor: Michel K. Bowman-Amuah, Colorado Springs, CO (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/324,456

(22) Filed: Jun. 2, 1999

(51) Int. Cl.⁷ .............................................. H04L 12/66
(52) U.S. Cl. ........................ 370/352; 370/401; 370/463
(58) Field of Search ................................. 370/352, 389, 370/392, 390, 236, 401, 522, 468, 463, 493, 354, 355, 395.52, 400, 252, 254, 466; 709/223, 224, 225, 226

(56) References Cited

U.S. PATENT DOCUMENTS

| | | | |
|---|---|---|---|
| 5,295,244 A | 3/1994 | Dev et al. ..................... 395/161 |
| 5,461,611 A | 10/1995 | Drake, Jr. et al. ............ 370/54 |
| 5,652,787 A | 7/1997 | O'Kelly ....................... 379/569 |
| 5,694,548 A | 12/1997 | Baugher et al. ............. 395/200 |
| 5,864,823 A | 1/1999 | Levitan ........................ 105/14 |
| 5,867,494 A | * 2/1999 | Krishnaswamy et al. ... 370/352 |
| 5,944,795 A | 8/1999 | Civanlar ...................... 709/227 |
| 5,999,525 A | * 12/1999 | Krishnaswamy et al. ... 370/352 |

FOREIGN PATENT DOCUMENTS

| | | |
|---|---|---|
| EP | 0941010 A2 | 9/1999 |
| EP | 0944209 A2 | 9/1999 |
| WO | WO 98/18237 | 4/1998 |
| WO | WO 99/34587 | 7/1999 |

OTHER PUBLICATIONS

Maren S. Leizaola, *Tuning IP Performance: The Right Tools for the Task*, May 1998 URL: http://data.com/tutorials/tuning.html, Viewed Oct. 15, 1999.

Mick Seaman et al., *Going the Distance with QOS*, Feb. 1999, URL, http://data.com/issue/990207/distance.html, Viewed Oct. 15, 1999.

Stephen Saunders, *The Policy Makers*, May 1999, URL, http://data.com/issue/990507/policy.html, Viewed Oct. 15, 1999.

* cited by examiner

*Primary Examiner*—Chi Pham
*Assistant Examiner*—Alexander O. Boakye
(74) *Attorney, Agent, or Firm*—Oppenheimer Wolff & Donnelly LLP

(57) ABSTRACT

Integrating IP telephony and a computer user interface across a hybrid communication network may include the following. Data is transmitted over a hybrid communication system during a data session. Telephonic communication is allowed over the hybrid communication system during the data session. The telephonic communication is routed over the hybrid communication system via a user action. The telephonic communication over the hybrid communication system is limited based on a user profile. The user profile is enforced by rules in an active database that provides seamless cross-location registration without a need for duplicate databases located on different networks. Customized fault management tools may be provided.

17 Claims, 43 Drawing Sheets

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | CR ID ||||||| CD ID |||||||||
| 01 | TP1 BITS 0-15 ||||||||||||||||
| 02 | TP1 BITS 16-31 ||||||||||||||||
| 03 | TP3 BITS 0-12 ||||||||||||| TP6 0-2 |||
| 04 | TP6 BITS 3-12 |||||||||| TP7 BITS 0-5 ||||||
| 05 | TP7 BITS 6-21 ||||||||||||||||
| 06 | OPL. ORIGINATING PORT 0-15 ||||||||||||||||
| 07 | OP | TPL. TERMINATING PORT 0-14 |||||||||||||||
| 08 | TP | OTG. ORIGINATING TRUNK GROUP ||||||||||||| TT ||
| 09 | TERMINAGING TRUNK GROUP (1-12) ||||||||||||| TP3Q |||
| 10 | TP6Q ||| ACTION CODE |||||| OTC |||| TTC |||
| 11 | ID1 |||| ID2 |||| ANI INDEX ||||||||
| 12 | CLI 1 |||| CLI 2 |||| CLI 3 |||| CLI 4 ||||
| 13 | CLI 5 |||| CLI 6 |||| CLI 7 |||| CLI 8 ||||
| 14 | CLI 9 |||| CLI 10 |||| A1 |||| A2 ||||
| 15 | A3 |||| A4 |||| A5 |||| A6 ||||
| 16 | A7 |||| A8 |||| A9 |||| A10 ||||
| 17 | A11 |||| A12 |||| A13 |||| A14 ||||
| 18 | A15 |||| A16 |||| A17 |||| A18 ||||
| 19 | A19 |||| A20 |||| A21 |||| A22 ||||
| 20 | D1 |||| D2 |||| D3 |||| D4 ||||
| 21 | D5 |||| D6 |||| D7 |||| D8 ||||
| 22 | D9 |||| D10 |||| D11 |||| D12 ||||
| 23 | D13 |||| D14 |||| D15 |||| D16 ||||
| 24 | D17 |||| PTD1 |||| PTD2 |||| PTD3 ||||
| 25 | PTD4 |||| PTD5 |||| PTD6 |||| PTD7 ||||
| 26 | PTD8 |||| PTD9 |||| PTD10 |||||||
| 27 | FC |||| TMC |||| KAT |||| TP7Q ||||
| 28 | EC, ENTRY CODE |||||| PD |||| ND ID |||| DIVID |||
| 29 | D0 || CC | IN || SC | CD | DE | DT ||| SA | NOCLI ||||
| 30 | CN1 |||| CN2 |||| CN3 |||| CN4 ||||
| 31 | ACIF |||| SS7 RELEASE CODE |||||||| NCIDSEQ ||| NL | RS |

FIG. 3

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | colspan="6" | CR ID | | | | | | colspan="10" | CD ID | | | | | | | |
| 01 | colspan="16" | TP1 BITS 0-15 | | | | | | | | | | | | | | |
| 02 | colspan="16" | TP1 BITS 16-31 | | | | | | | | | | | | | | |
| 03 | colspan="13" | TP3 BITS 0-12 | | | | | | | | | | | | colspan="3" | TP6 0-2 | | |
| 04 | colspan="10" | TP6 BITS 3-12 | | | | | | | | | | colspan="6" | TP7 BITS 0-5 | | | | | |
| 05 | colspan="16" | TP7 BITS 6-21 | | | | | | | | | | | | | | |
| 06 | colspan="16" | OPL. ORIGINATING PORT 0-15 | | | | | | | | | | | | | | |
| 07 | OP | | colspan="15" | TPL. TERMINATING PORT 0-14 | | | | | | | | | | | | |
| 08 | TP | | colspan="13" | OTG. ORIGINATING TRUNK GROUP | | | | | | | | | | | | TT |
| 09 | colspan="12" | TERMINAGING TRUNK GROUP (1-12) | | | | | | | | | | | colspan="4" | TP3Q | | | |
| 10 | TP6Q | colspan="7" | ACTION CODE | | | | | | | colspan="4" | OTC | | | | colspan="4" | TTC | | | |
| 11 | colspan="4" | ID1 | | | | colspan="4" | ID2 | | | | colspan="8" | ANI INDEX | | | | | | | |
| 12 | colspan="4" | CLI 1 | | | | colspan="4" | CLI 2 | | | | colspan="4" | CLI 3 | | | | colspan="4" | CLI 4 | | | |
| 13 | colspan="4" | CLI 5 | | | | colspan="4" | CLI 6 | | | | colspan="4" | CLI 7 | | | | colspan="4" | CLI 8 | | | |
| 14 | colspan="4" | CLI 9 | | | | colspan="4" | CLI 10 | | | | colspan="4" | CL11 | | | | colspan="4" | CL12 | | | |
| 15 | colspan="4" | CL13 | | | | colspan="4" | CL14 | | | | colspan="4" | CL15 | | | | colspan="4" | A1 | | | |
| 16 | colspan="4" | A2 | | | | colspan="4" | A3 | | | | colspan="4" | A4 | | | | colspan="4" | A5 | | | |
| 17 | colspan="4" | A6 | | | | colspan="4" | A7 | | | | colspan="4" | A8 | | | | colspan="4" | A9 | | | |
| 18 | colspan="4" | A10 | | | | colspan="4" | A11 | | | | colspan="4" | A12 | | | | colspan="4" | A13 | | | |
| 19 | colspan="4" | A14 | | | | colspan="4" | A15 | | | | colspan="4" | A16 | | | | colspan="4" | A17 | | | |
| 20 | colspan="4" | A18 | | | | colspan="4" | A19 | | | | colspan="4" | A20 | | | | colspan="4" | A21 | | | |
| 21 | colspan="4" | A22 | | | | colspan="4" | A23 | | | | colspan="4" | A24 | | | | colspan="4" | A25 | | | |
| 22 | colspan="4" | A26 | | | | colspan="4" | A27 | | | | colspan="4" | A28 | | | | colspan="4" | A29 | | | |
| 23 | colspan="4" | A30 | | | | colspan="4" | A31 | | | | colspan="4" | A32 | | | | colspan="4" | A33 | | | |
| 24 | colspan="4" | A34 | | | | colspan="4" | A35 | | | | colspan="4" | A36 | | | | colspan="4" | A37 | | | |
| 25 | colspan="4" | A38 | | | | colspan="4" | A39 | | | | colspan="4" | A40 | | | | colspan="4" | A41 | | | |
| 26 | colspan="4" | A42 | | | | colspan="4" | A43 | | | | colspan="4" | A44 | | | | colspan="4" | A45 | | | |
| 27 | colspan="4" | FC | | | | colspan="4" | TMC | | | | colspan="4" | KAT | | | | colspan="4" | TP7Q | | | |
| 28 | colspan="6" | EC, ENTRY CODE | | | | | | colspan="3" | PD | | | colspan="4" | ND ID | | | | colspan="3" | DIVID | | |
| 29 | D0 | MN | CC | IN | | SC | CD | DE | DT | | | SA | colspan="4" | NOCLI | | | |
| 30 | colspan="4" | CN1 | | | | colspan="4" | CN2 | | | | colspan="4" | CN3 | | | | colspan="4" | CN4 | | | |
| 31 | colspan="4" | ACIF | | | | colspan="7" | SS7 RELEASE CODE | | | | | | | | colspan="3" | NCIDSEQ | | | NL | RS |
| BIT | 00 | 01 | 02 | 03 | 04 | 05 | 06 | 07 | 08 | 09 | 10 | 11 | 12 | 13 | 14 | 15 |

MSB (left) — LSB (right)

FIG. 4A

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 32 | | | | | | | | | | | | | | | | |
| 33 | | | | | | | | | | | | | | | | |
| 34 | ID1 | | | | ID2 | | | | ID3 | | | | ID4 | | | |
| 35 | ID5 | | | | ID6 | | | | ID7 | | | | ID8 | | | |
| 36 | ID9 | | | | ID10 | | | | ID11 | | | | ID12 | | | |
| 37 | ID13 | | | | ID14 | | | | ID15 | | | | ID16 | | | |
| 38 | ID17 | | | | ID18 | | | | ID19 | | | | ID20 | | | |
| 39 | ID21 | | | | ID22 | | | | ID23 | | | | ID24 | | | |
| 40 | ID25 | | | | PTD1 | | | | PTD2 | | | | PTD3 | | | |
| 41 | PTD4 | | | | PTD5 | | | | PTD6 | | | | PTD7 | | | |
| 42 | PTD8 | | | | PTD9 | | | | PTD10 | | | | PTD11 | | | |
| 43 | PTD12 | | | | PTD13 | | | | PTD14 | | | | PTD15 | | | |
| 44 | EIR CALL TYPE | | | | | | | | OVFAL | | | | | | | CB |
| 45 | OVFCL | | | | DTA1 | | | | DTA2 | | | | DTA3 | | | |
| 46 | DTA4 | | | | DTA5 | | | | DTA6 | | | | DTA7 | | | |
| 47 | DTA8 | | | | DTA9 | | | | DTA10 | | | | DTA11 | | | |
| 48 | DTA12 | | | | DTA13 | | | | DTA14 | | | | DTA15 | | | |
| 49 | OVFC | | | | | | | DTAC | | | | | | NCID | | |
| 50 | NETWORK CALL IDENTIFIER (NCID) | | | | | | | | | | | | | | | |
| 51 | NETWORK CALL IDENTIFIER (NCID) | | | | | | | | | | | | | | | |
| 52 | NETWORK CALL IDENTIFIER (NCID) | | | | | | | | | | | | | | | |
| 53 | NETWORK CALL IDENTIFIER (NCID) | | | | | | | | | | | | | | | |
| 54 | NETWORK CALL IDENTIFIER (NCID) | | | | | | | | | | | | | | | |
| 55 | | | | | | | | | | | | | | | | |
| 56 | | | | | | | | | | | | | | | | |
| 57 | | | | | | | | | | | | | | | | |
| 58 | | | | | | | | | | | | | | | | |
| 59 | | | | | | | | | | | | | OUS TYPE | | | OUIE |
| 60 | OUIE COUNT CONT. | | | | | | | | | | | | | OVFCS | | |
| 61 | ORIGINATING NX64 BITMAP (1-16) | | | | | | | | | | | | | | | |
| 62 | ORIG. NX64 BITMAP (17-24) | | | | | | | | TERM NX64 BITMAP (17-24) | | | | | | | |
| 63 | TERMINATING NX64 BITMAP (9-24) | | | | | | | | | | | | | | | |
| BIT | 00 | 01 | 02 | 03 | 04 | 05 | 06 | 07 | 08 | 09 | 10 | 11 | 12 | 13 | 14 | 15 |

FIG. 4B

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | \multicolumn{6}{c\|}{CR ID} | | | | | | | | | | | |

MSB ... LSB

| WORD | Bits 00–15 |
|---|---|
| 00 | CR ID \| CD ID |
| 01 | TP1 BITS 0-15 |
| 02 | TP1 BITS 16-31 |
| 03 | TP4 BITS 0-12 \| TP6 0-2 |
| 04 | TP6 BITS 3-12 \| TP7 BITS 0-5 |
| 05 | TP7 BITS 6-21 |
| 06 | OPL. ORIGINATING PORT 0-15 |
| 07 | OP \| TPL. TERMINATING PORT 0-14 |
| 08 | TP \| OTG. ORIGINATING TRUNK GROUP \| TT |
| 09 | TERMINAGING TRUNK GROUP (1-12) \| TP3Q |
| 10 | TP6Q \| ACTION CODE \| OTC \| TTC |
| 11 | ID1 \| ID2 \| ONACC \| TNACC |
| 12 | CLI 1 \| CLI 2 \| CLI 3 \| CLI 4 |
| 13 | CLI 5 \| CLI 6 \| CLI 7 \| CLI 8 |
| 14 | CLI 9 \| CLI 10 \| A1 \| A2 |
| 15 | A3 \| A4 \| A5 \| A6 |
| 16 | A7 \| A8 \| A9 \| A10 |
| 17 | A11 \| A12 \| A13 \| A14 |
| 18 | A15 \| A16 \| A17 \| A18 |
| 19 | A19 \| A20 \| A21 \| A22 |
| 20 | D1 \| D2 \| D3 \| D4 |
| 21 | D5 \| D6 \| D7 \| D8 |
| 22 | D9 \| D10 \| D11 \| D12 |
| 23 | D13 \| D14 \| D15 \| D16 |
| 24 | D17 \| OPIN |
| 25 | OPIN \| TPS BITS 0-12 |
| 26 | RN1 \| RN2 \| RN3 \| RN4 |
| 27 | FC \| TMC \| KAT \| TP7Q |
| 28 | EC, ENTRY CODE \| PD \| ND ID \| DIVID |
| 29 | DO \| CC \| IN \| SC \| CD \| DE \| DT \| PP \| XC \| SA \| NOCLI |
| 30 | CN1 \| CN2 \| CN3 \| CN4 |
| 31 | ACIF \| SS7 RELEASE CODE \| NCIDSEQ \| NL \| RS |

FIG. 5

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | colspan CR ID ||||||| colspan CD ID |||||||||
| 01 | TP1 BITS 0-15 |||||||||||||||| 
| 02 | TP1 BITS 16-31 ||||||||||||||||
| 03 | TP4 BITS 0-12 ||||||||||||| TP6 0-2 |||
| 04 | TP6 BITS 3-12 |||||||||| TP7 BITS 0-5 ||||||
| 05 | TP7 BITS 6-21 ||||||||||||||||
| 06 | OPL. ORIGINATING PORT 0-15 ||||||||||||||||
| 07 | OP | TPL. TERMINATING PORT 0-14 |||||||||||||||
| 08 | TP | OTG. ORIGINATING TRUNK GROUP ||||||||||||||  TT |
| 09 | TERMINAGING TRUNK GROUP (1-12) |||||||||||| TP3Q ||||
| 10 | TP6Q | ACTION CODE |||||| OTC ||||| TTC ||||
| 11 | ID1 |||| ID2 |||| ONACC |||| TNACC ||||
| 12 | CLI 1 |||| CLI 2 |||| CLI 3 |||| CLI 4 ||||
| 13 | CLI 5 |||| CLI 6 |||| CLI 7 |||| CLI 8 ||||
| 14 | CLI 9 |||| CLI 10 |||| CL11 |||| CL12 ||||
| 15 | CL13 |||| CL14 |||| CL15 |||| A1 ||||
| 16 | A2 |||| A3 |||| A4 |||| A5 ||||
| 17 | A6 |||| A7 |||| A8 |||| A9 ||||
| 18 | A10 |||| A11 |||| A12 |||| A13 ||||
| 19 | A14 |||| A15 |||| A16 |||| A17 ||||
| 20 | A18 |||| A19 |||| A20 |||| A21 ||||
| 21 | A22 |||| A23 |||| A24 |||| A25 ||||
| 22 | A26 |||| A27 |||| A28 |||| A29 ||||
| 23 | A30 |||| A31 |||| A32 |||| A33 ||||
| 24 | A34 |||| A35 |||| A36 |||| A37 ||||
| 25 | A38 |||| A39 |||| A40 |||| A41 ||||
| 26 | A42 |||| A43 |||| A44 |||| A45 ||||
| 27 | FC |||| TNC |||| KAT |||| TP7Q ||||
| 28 | EC, ENTRY CODE ||||||| PD ||| ND ID ||| DIVID |||
| 29 | DO | MM | CC | IN | SC | CD | DE | DT | PP | XC | SA | NOCLI |||||
| 30 | CN1 |||| CN2 |||| CN3 |||| CN4 ||||
| 31 | ACIF |||| SS7 RELEASE CODE |||||||| NCIDSEQ ||| NL | RS |
| BIT | 00 | 01 | 02 | 03 | 04 | 05 | 06 | 07 | 08 | 09 | 10 | 11 | 12 | 13 | 14 | 15 |

EOSR/EPOSR FORMAT

FIG. 6A

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 32 | T & C GUEST 1 ||||||||  T & C GUEST 2 ||||||||
| 33 | T & C GUEST 3 |||||||| T & C GUEST 4 ||||||||
| 34 | ID1 |||| ID2 |||| ID3 |||| ID4 ||||
| 35 | ID5 |||| ID6 |||| ID7 |||| ID8 ||||
| 36 | ID9 |||| ID10 |||| ID11 |||| ID12 ||||
| 37 | ID13 |||| ID14 |||| ID15 |||| ID16 ||||
| 38 | ID17 |||| ID18 |||| ID19 |||| ID20 ||||
| 39 | ID21 |||| ID22 |||| ID23 |||| ID24 ||||
| 40 | ID25 |||| PTD1 |||| PTD2 |||| PTD3 ||||
| 41 | PTD4 |||| PTD5 |||| PTD6 |||| PTD7 ||||
| 42 | PTD8 |||| PTD9 |||| PTD10 |||| PTD11 ||||
| 43 | PTD12 |||| PTD13 |||| PTD14 |||| PTD15 ||||
| 44 | EIR CALL TYPE |||||||| OVFAL ||||||| CB |
| 45 | OVFCL |||| DTA1 |||| DTA2 |||| DTA3 ||||
| 46 | DTA4 |||| DTA5 |||| DTA6 |||| DTA7 ||||
| 47 | DTA8 |||| DTA9 |||| DTA10 |||| DTA11 ||||
| 48 | DTA12 |||| DTA13 |||| DTA14 |||| DTA15 ||||
| 49 | OVFC |||||| DTAC |||||| | NCID |||
| 50 | NETWORK CALL IDENTIFIER (NCID) ||||||||||||||||
| 51 | NETWORK CALL IDENTIFIER (NCID) ||||||||||||||||
| 52 | NETWORK CALL IDENTIFIER (NCID) ||||||||||||||||
| 53 | NETWORK CALL IDENTIFIER (NCID) ||||||||||||||||
| 54 | NETWORK CALL IDENTIFIER (NCID) ||||||||||||||||
| 55 | T & C ROOM 1 |||||||| T & C ROOM 2 ||||||||
| 56 | T & C ROOM 3 |||||||| T & C ROOM 4 ||||||||
| 57 | T & C ROOM 5 |||||||| T & C ROOM 6 ||||||||
| 58 | EAC1 |||| EAC2 |||| EAC3 |||| EAC4 ||||
| 59 | EAC5 |||| EAC6 |||| EAC7 |||| EAC8 ||||
| 60 | EAC9 |||| EAC10 |||| EAC11 |||| EAC12 ||||
| 61 | OPIN ||||||||||||| OVFCS |||
| 62 | TP-5 OPERATOR RELEASE ||||||||||||||||
| 63 | RN1 |||| RN2 |||| RN3 |||| RN4 ||||

FIG. 6B

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | \multicolumn{5}{c}{CR ID} | | | | | | | | | | | |
| 00 | colspan CR ID | | | | | colspan SYNC WORD (MINUS 2, OCTAL 7776) | | | | | | | | | | |
| 01 | CDID, CALL DISCONNECT I.D. NUMBER (0-15) |||||||||||||||
| 02 | CDID, CALL DISCONNECT I.D. NUMBER (16-31) |||||||||||||||
| 03 | SWID 1 ||||| SWID 2 ||||| SWID 3 |||||
| 04 | ST-SWITCH TYPE |||||||| EQ-EVENT QUALIFIER ||||||||
| 05 | SERIT-SER EVENT TIME (0-15) |||||||||||||||
| 06 | SERIT-SER EVENT TIME (16-31) |||||||||||||||
| 07 | | | | | FCDID-FIRST RECORD CDID (12 LSA'S) |||||||||||
| 08 | | | | | LCDID-LAST RECORD CDID (12 LSA'S) |||||||||||
| 09 | | | | | NCDID-NEXT RECORD CDID (12 LSA'S) |||||||||||
| 10 | NBSN-NEMAS BLOCK SEQUENCE NUMBER |||||||||||||||
| 11 | PT-PREVIOUS TIME (0-15) |||||||||||||||
| 12 | PT-PREVIOUS TIME (16-31) |||||||||||||||
| 13 | SI | TIME OFFSET |||||||||| | | | | |
| 14 | | | | | | | | | | | | | | | | |
| 15 | | | | | | | | | | | | | | | | |
| 16 | SOFTWARE LOAD ID1 |||||||| SOFTWARE LOAD ID2 ||||||||
| 17 | SOFTWARE LOAD ID3 |||||||| SOFTWARE LOAD ID4 ||||||||
| 18 | SOFTWARE LOAD ID5 |||||||| SOFTWARE LOAD ID6 ||||||||
| 19 | LAST PATCHS/PR RLS1 |||||||| LAST PATCHS/PR RLS2 ||||||||
| 20 | QCDR |||||| QSCDR |||||| | | | |
| 21 | QPMR |||||| QSPMR |||||| | | | |
| 22 | QOSR |||||| QSOSR |||||| | | | |
| 23 | QPOSR |||||| QSPOSR |||||| | | | |
| 24 | QSER |||||| CNPN |||||| | | | |
| 25 | CDR THROTTLE START TIME (0-15) |||||||||||||||
| 26 | CDR THROTTLE START TIME (16-31) |||||||||||||||
| 27 | CDR THROTTLE STOP TIME (0-15) |||||||||||||||
| 28 | CDR THROTTLE STOP TIME (16-31) |||||||||||||||
| 29 | | | | | | | | | | | | FORMAT VER. |||||
| 30 | THROTTLE COUNT (0-15) |||||||||||||||
| 31 | THROTTLE COUNT (16-31) |||||||||||||||

FIG. 7

IP/TELEPHONY USER INTERFACE FOR A HYBRID COMMUNICATION SYSTEM

FIELD OF THE INVENTION

The present invention relates to communication networks and more particularly to in-band IP telephony communication while utilizing other IP based applications.

BACKGROUND OF INVENTION

The current telecommunication service providers' networks reflect the architecture of the PSTN network as it has evolved over the last 100 years. This is largely based on circuit switched technologies. Initially, all telecommunication services were offered via a wired infrastructure. As the user-base increased and requirements changed over the last few decades, new types of services were created e.g. wireless PSTN, cable video, multi-service (PSTN, video, satellite). The networks that supported these services were created as parallel networks, along-side the existing PSTN network. As technologies matured, there was some convergence (e.g. they shared the same SONET backbone) in the network architecture. During the late 1980s, with the explosion of data networking and Internet, data networking networks like frame relay and ATM were developed, and later large internet based data networks were constructed in parallel with the existing PSTN infrastructure. These data networks again shared the PSTN infrastructure only at the SONET backbone layer. This state of current networks is called the existing "Core". Thus the "Core" network is a set of parallel networks; PSTN, wireless, satellite, cable, ATM, frame relay, IP. There is some interoperability between the services on these parallel network (e.g. PSTN, and wireless), but generally these networks are vertically integrated to provide distinct set of non-interoperable services.

SUMMARY OF INVENTION

According to a broad aspect of a preferred embodiment of the invention, telephone calls, data and other multimedia information is routed through a hybrid network system which includes transfer of information across the internet utilizing telephony routing information and internet protocol address information. The system includes integrated fP telephony services allowing a user of a web application to communicate in an audio fashion in-band without having to pick up another telephone. Users can click a button and go to a call center through the hybrid network using IP telephony. The system invokes an IP telephony session simultaneously with the data session, and uses an active directory lookup whenever a user uses the system. The communication may be limited based on a user profile, where the profile is enforced by rules in an active database that provides seamless cross-location registration without a need for duplicate databases located on different networks. Customized fault management tools also may be provided.

DESCRIPTION OF THE DRAWINGS

The foregoing and other objects, aspects and advantages are better understood from the following detailed description of a preferred embodiment of the invention with reference to the drawings, in which:

FIG. 1B-1 is a flowchart illustrating a Network Data Management process in accordance with a preferred embodiment;

FIG. 1C-1 is a flowchart illustrating a Customer Interface Management Process in accordance with a preferred embodiment;

FIG. 1D-1 is a flowchart illustrating a Customer Quality of Service Management Process in accordance with a preferred embodiment;

FIG. 1E-1 is a flowchart illustrating a Service Quality Management Process in accordance with a preferred embodiment;

FIG. 1F-1 is a flowchart illustrating a Problem Handling Management Process in accordance with a preferred embodiment;

FIG. 1G-1 is a flowchart illustrating Rating and Discounting Process in accordance with a preferred embodiment;

FIG. 1H-1 is a flowchart illustrating an Invoice and Collections Process in accordance with a preferred embodiment;

FIGS. 4(A) and 4(B) collectively illustrate the ECDR and EPNR call record formats in accordance with a preferred embodiment;

FIG. 5 illustrates the OSR and POSR call record formats in accordance with a preferred embodiment;

FIGS. 6(A) and 6(B) collectively illustrate the EOSR and EPOSR call record formats in accordance with a preferred embodiment;

FIG. 7 illustrates the SER call record format in accordance with a preferred embodiment;

DETAILED DESCRIPTION

Figure 1A:
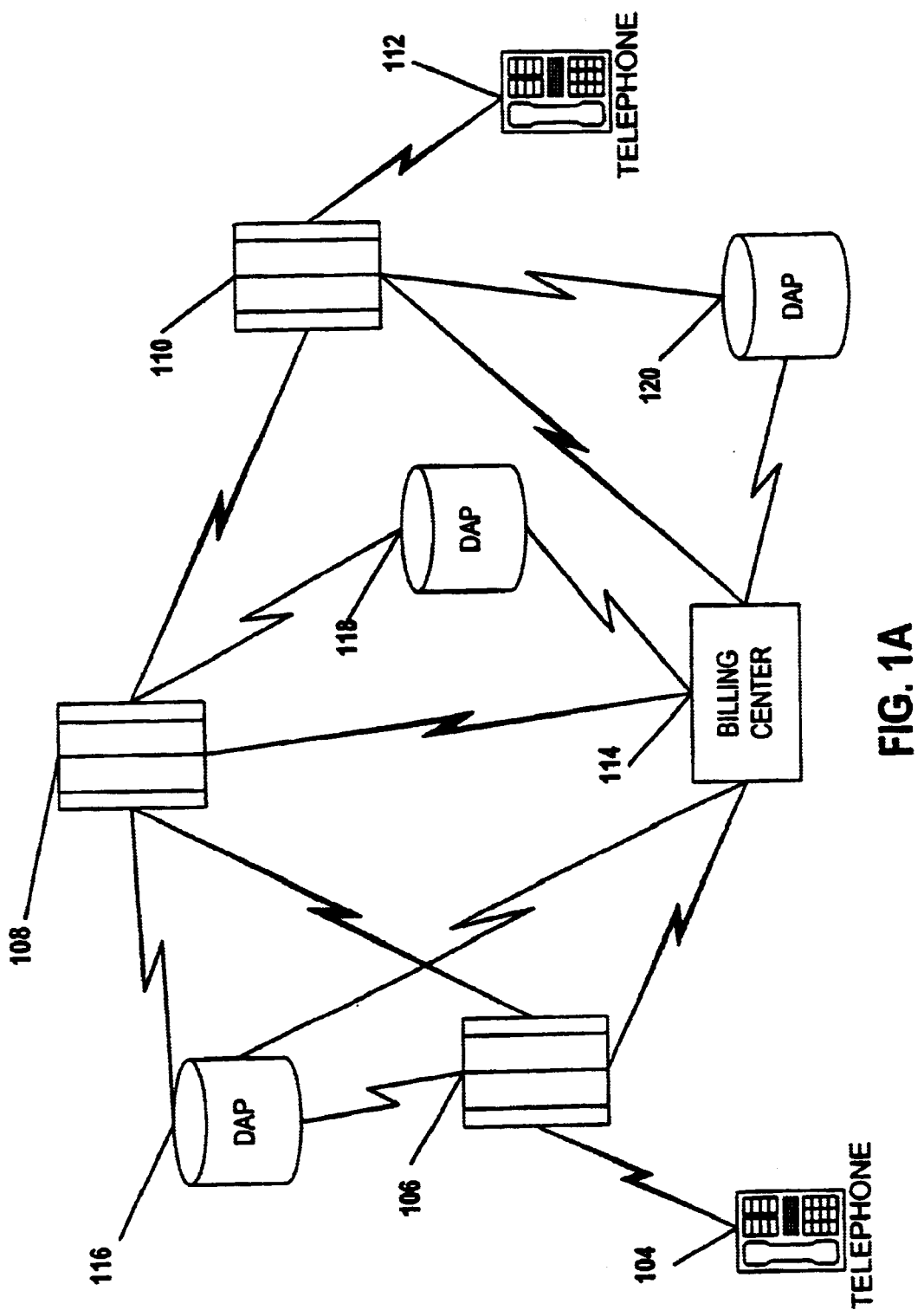
FIG. 1A is a block diagram of an exemplary telecommunications system in accordance with a preferred embodiment.

The following table is used to clarify terms used in the detailed description of the invention.

| | |
|---|---|
| AAA | Authentication, Authorization, Addressing |
| ADSL | Asymmetric Digital Subscriber Line |
| AIN | Advanced Intelligent Networks |
| AMA | Automatic Message Accounting |
| ATM | Asynchronous Transfer Mode |
| BIM | Business Integration Methodology |
| BSS | Business Support System |
| CDR | Call Detail Record |
| DTMF | Dual-Tone Multi-Frequency |
| GSM | Global System for Mobile Communications |
| IN | Intelligent Network |
| IP | Internet Protocol |
| JPEP | Joint Picture Expert Group |
| LMDS | Local Multi-Point Distribution Service |
| MPEG | Moving Picture Expert Group |
| NGN | Next Generation Network |
| OSS | Operational Support Systems |
| PCM | Pulse Code Modulation |
| PSTN | Public Switched Telephone Network |
| QoS | Quality of Service |
| RAS | Remote Access Server |
| SCE | Service Creation Environment |
| SCP | Service Control Point |
| SMDS | Switched Multi Megabit Data Service |
| SSP | Service Switching Point |
| SONET | Synchronous Optical Network |

-continued

| | |
|---|---|
| STP | Service Transfer Point |
| TCP | Transmission Control Protocol |
| xDSL | Generic name for Digital Subscriber Line |
| (D)WDM | (Dense) Wave Division Multiplexing |

Data networks today rely heavily on shared medium, packet-based LAN technologies for both access and backbone connections. The use of packet switching systems, such as bridges and routers, to connect these LANs into global internets is now widespread. An internet router must be capable of processing packets based on many different protocols, including IP, IPX, DECNET, AppleTALK, OSI, SNA and others. The complexities of building networks capable of switching packets around the world using these different protocols is challenging to both vendors and users. Standards-based LAN systems work reasonably well at transfer rates up to about 100 Mbps. At transfer rates above 100 Mbps, providing the processing power required by a packet switch interconnecting a group of networks becomes economically unrealistic for the performance levels desired. This inability to economically "scale up" performance is beginning to cause restrictions in some user's planned network expansions. Also, today's data networks do not provide network managers with enough control over bandwidth allocation and user access.

Tomorrow's networks are expected to support "multimedia" applications with their much greater bandwidth and real-time delivery requirements. The next generation networks should also have the ability to dynamically reconfigure the network so that it can guarantee a predetermined amount of bandwidth for the requested quality of service (QOS). This includes providing access, performance, fault tolerance and security between any specified set of end systems as directed by the network's manager. The concept is to provide network managers with complete "command and control" over the entire network's infrastructure—not just tell them when a failure has occurred.

A new set of technologies known as asynchronous transfer mode (ATM) may provide the best:, long-term solution for implementing the requirements of both private and public internets. ATM promises to provide a more economical and scalable set of technologies for implementing the ultra-high-performance information networks that will be required to provide the quality of service users will demand. Thus, over the next 20 years, the network infrastructure may change from packet-based standards to one based on ATM cell switching. While changes in the accompanying network will be dramatic, it would be desirable for users making the transition to be able to retain their most recent equipment investment.

Another expected change in tomorrow's networks is a change in data flow. Data flow in today's network typically follows the client-server computing model. This is where many clients are all transferring data into and out of one or more network servers. Clients do not normally talk to each other; they share data by using the server. While this type of data exchange will continue, much more of the information flow in tomorrow's networks will be peer-to-peer. Since the ultimate goal is a truly distributed computing environment where all systems act as both the client and server, more of the data flow will follow a peer-to-peer model. The network will be required to provide more direct access to all peers wishing to use high-performance backbone internets connecting, for example, the desktop computers.

The bulk of information transported in the future will be of digital origin. This digital information will require a great deal more bandwidth than today's separate voice, fax, and SNA networks which operate with acceptable performance using voice grade telephone lines. Voice will shrink as a percentage of total traffic, while other forms of information including image and video will greatly increase. Even when compressing is available, the bandwidth requirements for both inside and outside building networks will need to be greatly expanded.

Text files and images can be sent over existing packet-based networks because the delivery of this information is not time critical. The new traffic (voice and video) is delivery time sensitive—variable or excessive latency will degrade the quality of service and can render this information worthless.

The usefulness of packet switching networks for the transmission of digital information, particularly burst type information, has long been recognized. Such networks are generally point-to-point in nature in that a packet from a single source is directed to a single destination by an address attached to the packet. The network responds to the packet address by connecting the packet to the appropriate destination.

Packet switching networks are also used which combine burst type data with the more continuous types of information such as voice, high quality audio, and motion video. (Commercialization of voice, video and audio transmission makes it desirable to be able to connect packets to multiple destinations, called packet broadcasting. For example, a broadcast video service such as pay-per-view television involves a single source of video packets, each of which is directed to multiple video receivers. Similarly, conferencing capabilities for voice communication also require single source to multiple destination transmission.

One prior packet broadcast arrangement comprises a network consisting of a packet duplication arrangement followed by a packet routing arrangement. As a broadcast packet enters this network, packet copies are made in the packet duplicating arrangement until as many copies exist as there are destinations for the packet. A translation table look up is then performed at the duplication arrangement outputs for each of the packet copies to provide a different, single destination address for each copy. All of the packet copies with their new packet addresses are then applied to the packet routing arrangement, which connects them to the appropriate network output ports.

In packet switching networks, packets in the form of units of data are transmitted from a source—such as a user terminal, computer, application program within a computer, or other data handling or data communication device—to a destination, which may be simply another data handling or data communication device of the same character. The devices themselves typically are referred to as users, in the context of the network. Blocks or frames of data are transmitted over a link along a path between nodes of the network. Each block consists of a packet together with control information in the form of a header and a trailer which are added to the packet as it exits the respective node. The header typically contains, in addition to the destination address field, a number of subfields such as operation code, source address, sequence number, and length code. The trailer is typically a technique for generating redundancy checks, such as a cyclic redundancy code for detecting errors. At the other end of the link, the receiving node strips off the control information, performs the required synchronization and error detection, and reinserts the control information onto the departing packet.

Packet switching arose, in part, to fulfill the need for low cost data communications in networks developed to allow access to host computers. Special purpose computers designated as communication processors have been developed to offload the communication handling tasks which were formerly required of the host. The communication processor is adapted to interface with the host and to route packets along the network; consequently, such a processor is often simply called a packet switch. Data concentrators have also been developed to interface with hosts and to route packets along the network. In essence, data concentrators serve to switch a number of lightly used links onto a smaller number of more heavily used links. They are often used in conjunction with, and ahead of, the packet switch.

In virtual circuit (VC) or connection-oriented transmission, packet-switched data transmission is accomplished via predetermined end-to-end paths through the network, in which user packets associated with a great number of users share link and switch facilities as the packets travel over the network. The packets may require storage at nodes between transmission links of the network until they may be forwarded along the respective outgoing link for the overall path. In connectionless transmission, another mode of packet-switched data transmission, no initial connection is required for a data path through the network. In this mode, individual datagrams carrying a destination address are routed through the network from source to destination via intermediate nodes, and do not necessarily arrive in the order in which they were transmitted.

The widely-used Telenet public packet switching network routes data using a two-level hierarchy. The hierarchy comprises a long distance-spanning backbone network with a multiplicity of nodes or hubs, each of which utilizes a cluster of backbone switches; and smaller geographic area networks with backbone trunks, access lines and clustered lower level switches connected to each hub. Packet-switched data is transmitted through the network via VCs, using CCITT (International Telegraph and Telephone Consultative Committee of the International Telecommunications Union) X.75 protocol, which is a compatible enhancement of X.25 protocol.

For a communication session to proceed between the parties to a connection, it is essential that data be presented in a form that can be recognized and manipulated. The sequence of required tasks at each end, such as the format of the data delivered to a party, the rate of delivery of the data, and resequencing of packets received out of order, is generally handled in an organized manner using layered communication architectures. Such architectures address the two portions of the communications problem, one being that the delivery of data by an end user to the communication network should be such that the data arriving at the destination is correct and timely, and the other being that the delivered data must be recognizable and in proper form for use. These two portions are handled by protocols, or standard conventions for communication intelligently, the first by network protocols and the second by higher level protocols. Each of these protocols has a series of layers. Examples of layered architectures include the Systems Network Architecture (SNA) developed by IBM, and the subsequently developed Open Systems Interconnection (OSI) reference model. The latter has seven layers, three of which are network services oriented including physical, data link, and network layers, and the other four providing services to the end user by means of transport, session, presentation, and application layers, from lowest to highest layer.

X.25 is an interface organized as a three-layered architecture for connecting data terminals, computers, and other user systems or devices, generally refereed to as data terminal equipment (DTE), to a packet-switched network through data circuit terminating equipment (DCE) utilized to control the DTE's access to the network. The three layers of the X.25 interface architecture are the physical level, the frame level and the packet level. Although data communication between DCEs of the network is routinely handled by the network operator typically using techniques other than X.25, communication between the individual user system and the respective DCE with which it interfaces to the network is governed by the X.25 or similar protocol. In essence, X.25 establishes procedures for congestion control among users, as well as call setup (or connect) and call clearing (or disconnect) for individual users, handling of errors, and various other packet transmission services within the DTE-DCE interface.

X.25 is employed for virtual circuit (VC) connections, including the call setup, data transfer, and call clearing phases. Call setup between DTEs connected to the network is established by one DTE issuing an X.25 call-request packet to the related DCE, the packet containing the channel number for the logical connections, the calling and called DTE addresses, parameters specifying the call characteristics, and the data. The destination DCE issues an incoming call packet, which is of the same general format as the call-request packet, to the destination DTE, the latter replying with a call-accepted packet. In response, the calling DCE issues a call-connected packet to its related DTE. At that point the call is established and the data transfer phase may begin by delivery of data packets. When the call is compared, i.e., the session is to end, a call-clearing procedure is initiated.

Prospective routing paths in the network are initially determined by a network control center, which then transmits these predetermined paths to the backbone switches as routing tables consisting of primary and secondary choices of available links from each hub. The secondary choices are viable only in the event of primary link failures, and the specific secondary link selection is a local decision at the respective hub based principally on current or recent traffic congestion patterns. The unavailability of an outgoing link from a hub at the time of the call setup effects a clearing back of the VC for the sought call to the preceding hub. An alternative link is then selected by that hub, or, if none is available there, the VC circuit is again cleared back to the next preceding hub, and so forth, until an available path is uncovered from the routing tables. Messages concerning link and/or hub failures are communicated immediately to the network control center, and that information is dispatched to the rest of the network by the center.

In typical present-day concentrators and packet switches, the data processing devices reside in a plurality of cards or boards containing printed circuits or integrated circuits for performing the various functions of the respective device in combination with the system software. Typically, the cards are inserted into designated slots in cages within a console, with backplane access to a data bus for communication with one another or to other devices in the network. The VME bus is presently the most popular 16/32-bit backplane bus. References from time to time herein to cards or boards will be understood to mean the various devices embodied in such cards or boards.

Many public data networks (PDNs) offer little or no security for communications between users and hosts or other data processing devices within the network, in keeping with the "public purpose" of the network and the desire for accessibility by a large number of actual and prospective users. Where restrictions on access are necessary or desirable, it is customary to assign each authorized user an identification (ID) number or a password, or both, which must be used to gain access to the host. More elaborate security measures are necessary where access may be had to highly confidential data.

Some data communication networks involve a variety of different customers each of whom makes available a host and one or more databases to its users, and may place a level of security on its database which differs from the level placed by other customers on their respective hosts and databases. In those instances, it is customary to make the host responsible for security and access to itself and its associated database. Thus, a user might have access to certain destinations in the network without restriction, but no access to other destinations.

Market Drivers

According to Yankee Group Research, network management costs continue to lo increase, with network managers spending an average of 45 percent of their budget on ongoing network management, 20 percent on equipment, and 35 percent on network transport services. It is a constant battle to reduce these costs yet somehow improve overall service to their customers. Reducing overall network management costs can be very difficult in today's business environment. Networks continue to become more complex, with more and more demands being placed on the network managers and planners., For example, the exponential growth of remote access has made their jobs more difficult, as the requirement to establish and manage connections for remote offices and telecommuters is often required without additional personnel or budget resources. Unfortunately, network managers and planners spend so much time in "firefighting" mode, trying to support their complex networks, that very little time is actually spent planning for network growth and enhancements. Combined with this is the fact that it is becoming difficult to keep highly skilled employees given the demand for certain skills in the marketplace, and the premiums that will be paid for those skills. So, what is a network manager to do? More and more, they are looking outside for help The market for customer network management services is generally referred to as Managed Networked Services (MNS). Yankee Group estimates this market will estimated to grow from $3B to 9B within the next three years. MNS became the focus of service providers in 1995 as they saw revenues for frame relay network services double for two years in a row. What began as a way to boost the popularity of frame relay services by offering to lease and manage routers has blossomed into a diverse set of services that are now closer to those associated with outsourcing.

Yankee Group research shows that 37 percent of Fortune 1000 managers are already outsourcing or plan to outsource their ongoing network operations management. In addition, it is the communications provider that is thought of as the most likely provider for one-stop shopping services.

The present invention's overall approach to implementing the NM/MNS market offering is two fold. The current opportunity that presents itself is MNS. While this market opportunity for clients is large, they need assistance in understanding data network management—for years they have been solely focused on voice. Additionally, they need to move into this market quickly in order to maintain and grow revenue. To this end, the present invention includes a set of assets consisting primarily of job aids and software that can greatly reduce our clients lead time for service implementation.

Secondly, the present invention assists service providers by providing them the tools to better manage their carrier data networks—the packet switched networks of the future. The present invention significantly enhances and scales MNS assets to address carrier network management in a data networking world. This solution template enables the convergence of circuit and packet switching network control centers and workforces.

The present invention's market offering suggests companies take a graduated approach to delivering MNS. One end of the continuum consists of MNS for current network services, including leased lines, frame relay, and X.25. On the far end is outsourced MNS characterized by long-term contracts, involving hundreds of millions of dollars. The NM/MNS market offering is proposing our clients go beyond the management of the router and the WAN, and into the world of the local area network (LAN), even as far as the desktop and business applications. Service providers have been intimidated by these propositions in the past, since management of the LAN and its equipment and applications has clearly not been their forte.

It is hard to describe a typical MNS engagement because this is such a new. There are three "entry points" in which the present invention can become involved in helping our companies to move into the MNS market:

Business Strategy—Companies may look to the present invention for assistance in creating a business strategy for entering the MNS market. Typically, this type of engagement will defines a company's target market for MNS (small, mid-market, large) and defines the service offerings that are best suited for the company to offer. These engagements will be followed by analysis, design and implementation projects.

Requirements Analysis—Companies may already have developed a concrete business strategy that defines which services they will offer within markets. In this case, the present invention's work will begin by helping define the company's network environment requirements. This work will be followed by design and implementation projects.

Design and Implementation—Companies may be ready to move to the design and implementation phases of creating an MNS capability. Generally, the present invention will confirm that their network meets the requirements to provide the service, then assist the client in the designing and implementing an appropriate solution suite.

In an effort to clearly communicate exactly how we define NMIMNS we have created an online catalog of services. The present invention's solution is a continuous cycle that begins with the four major processes associated with NM/MNS. These processes drive the technology and the people components of the solution. Within each of these processes are a number of core functions and sub-functions. The MNS Online Catalog contains all of this information, including the supporting process, technology and organizational solutions for each function.

Our solution is called the Managed Networked Services Integrated Solution (MNSIS) and has been developed using an approach which integrates Process, Technology, and People considerations.

Process

At the highest level, there are four major processes that must be performed to manage any network:

Service Planning
Managing Change
Operations Management
Service Management

Each process should be performed in order to provide a complete NM MNS solution. As mentioned above, each process has a number of associated functions and sub-functions that provide the complete picture of the process. The major functions associated with each process are as follows.

Technology

The main goal of the technology solution is to provide access to network information to make informed decisions. The present invention includes three layers of management: element management, information services management and presentation management. Every action starts with an incident. Processing is tailored to handling the incident with technology that responds to the unique characteristics of each incident.

Element Manager

The element manager communicates with the network elements to receive alarms and alerts through trapping and polling techniques. The element manager is the layer where the primary data reduction functions reside. At this layer, events received at the element manager will be filtered, aggregated and correlated to further isolate problems within the network. Information that is deemed critical to monitor and manage the network is translated into a standard object format and forwarded to the Information Services Manager. An element manager can be, but is not necessarily, software which adheres to open standards such as the Simple Network Management Protocol (SNMP) and the Object Management Group's (OMG) Common Object Request Broker Architecture (CORBA).

Information Services Manager

The information services manager provides the data management and data communications between element managers and presentation managers. All information forwarded from the element managers is utilized by the information services manager to provide information to the network operators. The information services manager adheres to CORBA standards to provide ubiquitous information access via an Object Request Broker (ORB). The ORB allows the information services manager to share management information stored in distributed databases.

The information services manager stores critical management information into operational (real-time) and analytical (historical) distributed databases. These databases provide common data storage so that new products can be easily inserted into the management environment. For example, if an event is received at an element manager that is deemed critical to display to a network user, the information services manager will store a copy of the alarm in the operational database and then forward the alarm to the appropriate network operator.

Media and textual databases are also provided by the information services manager. The databases includes online manuals for administrative purposes, as well as for the maintenance specialists to access element specific information. The databases also provide procedures, policies and computer based training to network users.

The information services manager provides requested information (real-time and historical) to the network users via the presentation manager.

Presentation Manager

The presentation manager performs the function its name implies: the presentation of the information to an end user. Because different locations and job functions require access to different types of information, there are at least two types of display methods. The first is for graphic intensive presentations and the second is for nomadic use, such as field technicians. The first environment requires a graphic intensive display, such as those provided by X-Windows/MOTIF. The second environment is potentially bandwidth poor where dial-up or wireless access may be used along with more traditional LAN access. This is also where browser technology is employed.

People

The people vision for the NM/MNS include an organization model for customer service support, the corresponding roles and responsibilities for this organization model and a conceptual design for workforce transformation to packet switching.

Customer Service Support

Customer service support provides a single point of contact that is customer focused. This single point of contact provides technical expertise in resolving customer incidents, troubles and requests. Generally a three tiered support structure is optimal for satisfying customer service needs. Each tier, or level, possesses an increasing level of skill, with tasks and responsibilities distributed accordingly. Such a structure is as follows:

Tier 1—typically has a broad set of technical skills and is the first level of support to the customer. Typically this group is responsible for resolving 60–70 percent of the opened problems.

Tier 2—are technical experts and field support personnel who may specialize in specific areas. Typically this group is responsible for resolving 30–40 percent of the opened problems.

Tier 3—are considered solution experts and often consist of hardware vendors, software vendors or custom application development/maintenance teams (in-depth skills needed to investigate and resolve difficult problems within their area of expertise). They are the last resort for solving the most difficult problems. Typically this group is responsible for resolving 5 percent or fewer of the opened problems.

The above model is generally referred to as the Skilled Model because personnel at all three tiers are highly skilled. This model generally creates a high percentage of calls resolved on the first call. Other approaches include:

Functional Model

In this model, users are requested to contact different areas (via VRU) depending on the nature of the incident. Calls are routed to the customer support representative best able to handle the call. This model can easily be coupled with the Skilled Model, and has been at previous client engagements.

Bypass Model

In this model, Tier 1 only logs calls, they do not resolve calls. One advantage of this model is that skilled resources don't have to waste time logging calls.

Software and Assets

Managed Networked Services Integrated Solution—The integrated network management solution template consists of a suite of best of breed third party software products that automate problem diagnosis, notification, custom-developed reporting, and IP services monitoring. This solution template is a great first step in realizing our technology solution vision.

Web-Based SLA Reporting Tool—is a browser based tool that provides the personalized SLA reports to customers in both a template and ad-hoc format.

Data Mining Demonstration—Provides the capability to analyze network management data looking for patterns and correlations across multiple dimensions. Build models of the behavior of the data in order to predict future growth or problems and facilitate managing the network in a proactive, yet cost-effective manner.

Customer to Event Mapping Module—Add-on module to the Managed Networked Services Integrated Solution which maps network element events, to service offerings, to customers. This tool allows the Customer Service Representative to proactively address network outages with customers.

Process Definitions and Functions

Service Planning

Service Planning includes both the strategic and tactical planning required to manage distributed environments effectively. Although most planning typically occurs during roll-out of the system, certain planning activities must otherwise take place. Service Planning ensures that change can be successfully controlled and implemented.

Service Management Planning

Operations Management Planning

Managing Change Planning

Strategic Planning

Managing Change

Includes processes and procedures for handling necessary changes to systems or the organization in a distributed environment.

Change Control

Testing

Implementing

Software Distribution

Operations Management

Systems Management consists of the day-to-day operational functions required to maintain the system (e.g. fault detection/correction, security management and performance management).

Production Control

Monitoring and Control

Fault Management

Security Management

Service Management

Service Management controls the overall service to the users of the system. It isolates users from how the system is managed, and ensures that users receive the quality support services they need to carry out their daily business activities.

SLA/OLA Management.

Help Desk

Quality Management

Billing and Accounting

The present invention includes a system, method, and article of manufacture for providing a hybrid circuit switched/packet switched network. This hybrid network is used as a transitioning network to transition from old "Core" network architectures to "New Core" networks. In the present description, the details of the NGN transitioning network will first be set forth after which details relating to specific billing aspects of the present invention will be described. PSTN, wireless, and cable networks have continued to grow at their organic rates determined by the growth of the vertical services they were providing. In the beginning, the data networks used a small portion of the backbone SONET bandwidth, while PSTN was still the dominant bandwidth user. Due to the exponential growth in IP traffic, the IP based data networks are soon slated to utilize more bandwidth than the PSTN. Also huge technical advances in packet technologies have made it possible to carry traditional voice over IP networks. This has started a move towards the "Next Generation Network (NGN)" where there will be more sharing of common network infrastructure to provide services, and these services will start to become more interoperable. The main thrust of technologies in the "NGN" will be to provide interoperability between the new packet based infrastructure and existing legacy infrastructures. Due to the large investments made in the legacy infrastructure, they will continue to exist for some time, but most new innovations will occur on the packet based infrastructure. Slowly, the parallel networks that were created to serve distinct services will merge to use a common packet based backbone and only differ in how access is provided (wire-line, wireless, cable, satellite). The "NGN" is a transition network which will exist during the transformation from the current "Core" to the "New Core".

As packet technologies continue to develop rapidly, it will be possible to support what was once a distinct set of services (voice, video, wireless) on separate parallel networks, on one integrated packet based network. There will still be separate access technologies (wireless, satellite, cable, wire-line) to access these services, but the access networks will all use a common "New Core" network and its capabilities. The services will be interoperable across various access technologies, and users will freely use services that cross many access technologies, e.g. wireless to cable phone services, web browsing from wireless devices etc.

The present invention maps a course for the network evolution from circuit to packet switched technology using a migratory approach in which the network becomes a hybrid circuit and packet topology over a 3 to 7 year period. Next, the network architecture for the wire-line network as it transforms from "Core" to, "NGN" to "New Core" will be described. Followed by architecture for cable, wireless and satellite based access networks.

The Wire-line Network Architecture

"Core" Network Architecture

The current wire-line "Core" network consists of parallel PSTN, SMDS, ATM, Frame-Relay, B/PRI and IP networks. The PSTN network has been evolving over the last century and is a mix of old and new circuit switched technologies. The PSTN network mainly provides point-to-point interactive two-way voice communication services. The service set has evolved to include many intelligent network (IN) service features. During the late 1980s, Advanced Intelligent Networks (AIN) emerged as the architecture to support new voice based services on the PSTN infrastructure.

IN Requirements and Architecture in the Current "Core"

The major IN requirements include session establishment, advanced call processing, call routing and call treatment (network messages and call termination). Examples of applications and features are the CLASS family of services (Call waiting, Call forwarding, Conference calling, Call rejection), enhanced call routing, Number Portability, Calling Card Services, and Audio delivered Information Services (e.g. travel, stocks and weather).

These IN capabilities are enabled by devices such as SCP, STP, SSP and EIP in the AIN environment. These devices participate in the execution and completion of an IN service. In order to develop, test and launch new IN service applications on the above mentioned components, service providers deploy Service Creation Environment (SCE) platforms, which provide an environment to quickly create new IN services. These SCE platforms are closely tied to the runtime environment and therefore with very few exceptions become a major undertaking and a complex coordination effort to launch a new or modified IN service in the "Core" network environment.

Data Networks in the "Core"

While the PSTN was growing in feature functionality as well as traffic demand, new data networks have been created to support the inter-networking of computing devices. These data networks provide interconnection to geographically dispersed computing devices at varying levels of transmission bandwidth (e.g. 56/64K, T-1/E-1, T-3/E-3, OC-3/STM-1). The data networks consist of many technologies e.g. SMDS, ATM, frame-relay and IP. In some cases, these data networks themselves are parallel networks, in other cases, they share a common technology in the backbone (e.g. ATM can be the backbone for frame relay and IP data networks). These data networks share the same SONET based backbone with the PSTN network. The services on the PSTN and the data networks are very distinct and non-interoperable (example: voice versus web access).

With the rapid explosion of the Internet, and innovation in packet based technologies, the IP based data network has become the dominant network in terms of user traffic, and its growth is slated to continue exponentially. This phenomenon has created a dilemma for traffic planners and engineers of the Core network. They have seen traffic grow on the access portions of their networks (PSTN) but have realized very little financial benefits from this usage because third party service providers have been the termination point of these internet data users. The incumbents have began to devise intelligent network solutions for this data traffic (example RAS with SS7 gateway) in order to solve two major challenges: 1) off loading data traffic from the voice infrastructure to alleviate the congestion issues that face traditional voice customers and 2) collecting revenues from the third party data services providers (ISP's) for access and routing callers to their Points Of Presence.

Due to the high growth in IP and other data services, many new service providers have emerged that are building only IP based data networks, and provide only IP based data services. Their business strategy is to continue to ride the technological innovation of IP and packet based technologies and build complete suites of services on a packet based infrastructure. Because they are investing in only one form of network (as opposed to many parallel networks), their unit cost of services is low, they are not encumbered by legacy networks and systems, and they can provide cheaper and better services to customers; hence they pose a significant threat to incumbent telecom service providers.

Next Generation "Network" Architecture

As packet based technologies continue to develop and provide the services that were only available on other networks (e.g. PSTN, cable), and new (green field) service providers continue to exploit their advantage, it has become necessary for many incumbent service providers to transition their "Core" network to the "Next Generation Network", where they can share the rapid technical advantages of packet technologies, and improve their cost structure, and at the same time offer new services on the "Next Generation Network".

New IP Based Services in the "NGN"

While there are components in the NGN that ensure interoperability between "NGN" and PSTN, there are also a huge new set of new services that are built entirely on the NGN components which is provide feature rich multimedia (voice, video, data) based communication services as well as enabling many E-Commerce services enabled by IP technologies. These components (described later in detail) include directories, policies, user authentication, registration, and encryption. These components enable services like integrated messaging, multimedia conversations, on-demand multi-point conference, enhanced security & authentication, various classes of media transport services, numerous automations in electronic internet commerce activities e.g. banking, shopping, customer care, education, etc. As the NGN matures third party value added service providers will develop IP based services that will combine applications such as electronic commerce (procurement, warehousing, distribution and fulfillment) as well as online banking to present the consumer with an integrated boundless shopping experience.

Growth of bandwidth in the "NGN"

In addition to new service features, the NGN also employs the use of new wire-line broadband access technologies, notably xDSL. Traditional wire-line access technologies will continue to be deployed at higher and higher speeds; wire-line access will move from predominantly T-1 speeds to T-3 and OC-n speeds. These new broadband access technologies will increase the need for higher bandwidth in "NGN" core. The "NGN" core continues to use a SONET backbone, but will gradually move to using (D)WDM technologies to provide the bandwidth required to support broadband access.

New and emerging technologies such as Giga-Bit Ethernet and Wire Speed IP may find their way to the network backbone, but not until Giga-bit Ethernet technology matures to handle a wide array of network services such as connection oriented circuit emulation. The use of Wire Speed IP technology is suitable for an enterprise network but lacks the robustness and scalability needed for carrier grade backbones. For this reason, there will always be a need for ATM in the backbone.

The architecture in the "NGN" provides seamless interoperability of services between the packet based network and the traditional PSTN. New "NGN" packet based capabilities will be developed to support AIN type features, while inter-operating with legacy PSTN/SS7/AIN. Large scale innovation in the IP based IN type capabilities (e.g. global number transparency, utilization of web based information, rich media communications) will create new services for IP enabled communication devices. Innovations on the PSTN will occur slowly, and may be restricted to maintaining interoperability of legacy PSTN with "NGN". In many cases, legacy PSTN components (e.g. SSP, SCP) will continue to evolve so that they can use common IP based packet switching technologies (e.g. IP, TCP, UDP), as opposed to using existing circuit switched technologies (e.g. MTP).

IN Requirements and Architecture in the Next Generation Network (NGN)

Given the huge revenues and global nature of PSTN services, as well as their use of SS7 and AIN technologies, components that allow interoperability between "NGN" and PSTN will need to be developed. These will include IP/PSTN Gateways, IP/PSTN address translators, IP/SS7 Gateways, IP enabled SSP's, and IP based Intelligent Peripherals. In addition to IN enablers, new components (as will be describe later) with features like directories, policies, user authentication, registration, session encryption, etc. will also be developed to enhance the IN capabilities. The NGN-IN enablers will provide the next level of intelligence in order to address communication over mixed media types, control of multiple session characteristics, collaborative communications needs, ubiquitous network access, "any to any" communications, and multimedia delivered information services. Note that these "NGN" components will continue to evolve to provide similar and enhanced capabilities in the "New Core".

The following provides a description of new components in the "NGN" and the "New Core" that provide enhanced IP based services. The Intelligent IP ($I^2P$) Network enablers are categorized as follows:

Session Control (Bandwidth, Switching and Routing)

Media Control (Call Treatment such as media conversion)

Policy Management (Directory, Access control, Security)

Bandwidth Management (Transport and real time restoration)

The components for the "NGN" are described as individual functional units but may be combined for practicality on individual network devices as the requirements dictate. These components have been designed to operate in a distributed network environment to increase the flexibility of the NGN and New Core. The architecture provides a robust, sccurc and isolated messaging infrastructure for delivering control plane information to these devices.

This infrastructure includes a well defined message set for accessing the functions that are provided by these components and data that resides in the rules database. The control plane architecture is efficient and has a unique mechanism for sharing service, user and control data without duplication. This permits mobile NGN service users to maintain the same experience and have access to the same information regardless of where or how they access the network.

Example: Assuming a US based NGN service user was roaming in Europe and wanted to access the network but has the use of specific calling information stored in his profile database in the US, how would such a challenge be overcome without replicating the user's data onto every rules database on the NGN to ensure that the user would not be denied access to features and services which the user typically subscribed. Obviously, storing or replicating this data and then managing synchronicity over a worldwide network would be process intensive, costly and cumbersome. This intelligent network architecture addresses these issues efficiently with mechanisms that make remote data available locally for the duration of a session and then caches the information in short term non-volatile memory not in the foreign rules database server. In other words although a user's profile may be physically stored in a Rules database in the United States, the user may access the network from Europe and be automatically granted access to the specific services and features that normally would be available during his US service experience. The remote session controller in Europe would communicate with the cross network location register and rules database server to identify the subscriber's "home" rules database in order to collect the policies and profile of the subscriber for use in Europe; this is done by using the inter device message sets (command and control ) over the control plane sub network. Unlike other mechanisms often employed, this mechanism does not replicate this information onto the local (European) rules database, making long term control data management predictable. The design is CORBA compliant and therefore can be interconnected with other standards based networks.

Rules Database Server

Determines Subscriber Profile

Session requirements such as Bandwidth, Quality Of Service, Class Of Service

Routing preferences based on Priority, Cost, Termination Location

Media and Application requirements ( Voice Telephone to Video Telephone, Multi-point, text to speech, Fax to E-mail etc.)

Content Separation (Example: Tells the intelligent peripheral and protocol converter to separate the Audio stream from the data and video stream on an H.32x call; It may also instruct the protocol converter to process the stream so as to enable this audio stream to be fed to a destination which supports traditional analog voice hence the G.728/9 content from the H.32x session would be converted first to AD/PCM and then sent to a Class 5 circuit based switch and terminated on a circuit switched SS7 network POTS line)

Access Device (Session Control)

Provides connectivity and session termination from customer premises to the NGN

Acts as the hub for the various applications ( Video, Voice, Fax, Web Data, Unified Messaging)

Provides systems management and reporting functions

May provide application multiplexing ( allowing simultaneous multi application access)

Intelligent Peripheral (Media Control)

Provides services such as DTMF parsing, Voice prompting, Messaging, Speech recognition, Text to Speech, Text to Fax, etc.

Protocol Conversion (Policy Management)

Receives session requirements from Rules database

Selects and executes required filters to enable activation, processing and tear-down of sessions Interfaces with existing CORE network to process information across NGN/Extended CORE Filters and Converts signals from SS7/ISDN to TCP/IP/H.323

Converts Signaling data from one format to another (example: G.728/9 to AD/PCM or Vocaltec to Vienna Systems, etc.)

Network Access Control Point (Session Control)

Similar to a switching node on an SS7 circuit switched network.

First or Last Access Point in the network

Provides actual call/session handling, routing and processing based on instructions from the Rules Database server Session Manager/Event Logger (Session Control)

This process or application is critical since it is the "glue" between the end user-application and the communications network. It is responsible for collection and distribution of end-user session preferences, application requirements, access device capability and accounting policy information to the required "IN enabling" components. In summary its main functions are to:

Create the AMA/CDR and other usage records

Interfaces external $3^{rd}$ party Network Gateways.

Liase with Clearing Houses and Cross Network Location Registers

Feeds the Financial Infrastructure

Cross Network (Roaming) Location Register (Policy Management)

Similar to the Home location register in the wireless/cellular telephony world. This functional component provides the required policies governing users who access third party networks and cross geographical boundaries. It keeps in constant contact with other cross network location registers of the geographically dispersed but inter-connected networks, exchanging accounting, service feature profile and control data for local and roaming subscribers.

"New Core" Network Architecture

Most of the attributes of the "New Core" will already be in place as part of "NGN". These include all intelligent components of the packet based "NGN" described above. The emergence of "New Core" signals the retirement of legacy PSTN network infrastructure. The traditional PSTN may never get removed from the public network, it may continue to be available as a universally accessible telecommunication service, highly subsidized and regulated by government agencies (AMTRAK model). But for the purposes for business and technical innovation, traditional PSTN network will largely become irrelevant.

As the PSTN based access methods go away, entirely IP based access methods will emerge in the "New Core", where all end devices connected to the "New Core" are IP enabled. All existing methods of wire-line based access (xDSL, T-1, T-3, fiber) will continue to provide access to IP based services over the "New Core". New access technologies (e.g. power-line) will emerge, but will still use the same packet based capabilities in the "New Core".

The trends observed in the "NGN" will continue with increased broadband access. Other access methods (cable, satellite, wireless) will also complete their transformation to the "New Core". These will all become IP enabled access technologies that will use the "New Core" for complete set of services, thus really providing seamless services across many different access technologies.

The Wireless Data Network Architecture

The current wireless "Core" network consists of wireless based access and roaming capabilities that inter-operate with wire-line PSTN "Core" infrastructure to provide interoperable PSTN services. As the PSTN migrates to "NGN" and "New Core", the wireless PSTN access infrastructure will also migrate to connect to "NGN"

and "New Core" to provide wireless PSTN access services while utilizing new capabilities in the "NGN" and the "New Core". There will also be innovations in the wireless end-devices such that they will become IP enabled, and will thus allow a broad range of innovations by allowing mobility to the wire-line IP based service capabilities (e.g. web browsing, e-mail etc.). These wireless access methods to the "New Core" will be restricted to lower speeds due to the legacy nature of this wireless infrastructure while new broadband wireless access may emerge to provide a new set of IP enabled wireless devices that can provide broadband services over wireless/mobile devices. In Europe, significant improvements in technologies such as GSM have provided insight into some NGN and New CORE capabilities such as 300 Kilobits of access bandwidth to deliver information to hand-held wireless devices. The potential of such capabilities coupled with the traditional strengths of wireless communications such as roaming and error handling enabled by digitization, at this stage seems limitless when aggregated with the intelligence of the NGN and New CORE backbone.

LMDS is an emerging technology in the local high speed wire-less access, which utilizes the 25–35 GHz microwave spectrum for point to point and point to multi-point communications. The end users either share an antenna connected to a digital receiver which is connected to a channel bank. The application server be it voice (PBX), video (CODEC), or Data (Router or Switch) interfaces with the NGN via the channel bank. A session originates from the application which interacts with the server to request authentication (AAA), then a session is established between originator and destination application by routing the call through the NGN components such as Gateways and Switches.

The Emerging Satellite Data Network Architecture

In addition to the wireless access infrastructure, new service providers have emerged that are trying to use low earth orbiting satellites (LEOS) to build a new access as well as backbone network infrastructure. The earlier version of these networks were built using traditional PSTN service model, hence they lack the bandwidth scalability for data services. In the "New Core", these will migrate to new packet switched based broadband LEO infrastructure, which will provide both high speed access as well as high speed backbone in the packet based "NGN" and "New Core". A satellite based broadband access mechanism will also be very suitable for multi-point services that will be developed on the "New Core".

The Cable Network Architecture

Cable networks were developed for mainly broadband broadcast of analog video entertainment services. The current "Core" cable infrastructure is suitable to serve one way video broadcast. Cable service providers are now upgrading their cable infrastructure to support high speed internet access. Thus in the "NGN" scenario for cable networks, cable will provide a new access mechanism for IP services, while simultaneously transport video content using the current video broadcast technology. Thus the IP enabled devices attached to the "NGN" cable infrastructure can take advantage of all the new components and capabilities described in the wire-line "NGN". This will enable seam-less services between devices that are accessing the "NGN" via a wire-line or cable infrastructures. This "NGN" cable infrastructure can provide IP based telephony services using the same components of the wire-line "NGN" that provide IP telephony to wire-line IP devices.

The digital network segment that interfaces with the "NGN" comprises of a coaxial cable local loop which is connected to a cable data modulator running QAM/DPSK protocols. The coaxial loop is terminated at the customer premise by an Ethernet cable modem which delivers the IP Tone to the applications (Voice, Video, Data) that may reside on a PC or application server. The cable modems used provide users and applications with a wide range of bandwidth options from 2 to 10 Mbits per second depending on configuration and choice of equipment vendor.

With the evolution of the "New Core" in the wire-line, the cable will continue to provide another broadband access mechanism for IP based services. As the "New Core" matures and enhances in capabilities (probably 10 years away), such that it can provide high speed real-time video content (to provide same quality as cable), it can be envisaged that the cable will becomes an entirely IP access mechanism (Oust like all wire-line access becomes an IP access mechanism). Then the broadcast video content will be delivered to IP enabled cable attached devices just like any other rich media will be delivered over the IP network. It is even conceivable that video encoding technologies such as MPEG2 and motion JPEG will be further improved to deliver higher resolution digital media over the cable infrastructure using NGN and CORE delivery mechanisms. The network becomes transparent and the applications and content drive the creativity of the service creation process. The PSTN like services will be delivered to devices connected via cable access just like they are delivered to other wire-line connected devices on the "New Core".

NGN Creation Strategy

The network transformation plan comprises of the following phases

Strategy

Market Trial

Service Launch

Consolidation and Optimization

Strategy

Determine where our current network fits in the evolutionary continuum from CORE to NGN or New CORE. Having identified the appropriate positioning of the network, select an architectural scenario that best serves business and technical objectives of the engagement.

Market Trial

Develop and launch a market trial that would measure and assess the viability of the introduction of the proposed service. Additionally, this trial validates the approach to transform specific parts of the infrastructure towards the "NGN" and "New Core". The market trial provides the entry-exit criteria, metrics, Key Performance Indicators etc. to assess the success of the market trial.

Service Launch

Develop, plan and manage the detailed network, systems, process and program management aspects of the launch of a "New Core" that is applicable for the network based on the strategy developed above. This ensures that the network systems planned and developed will be future-ready. The OSS and back-office systems are be able to support the processes required for service creation and management in the "New Core". The network creation processes provides the program management tools to ensure that the launch is successfully executed. These include entry and exit criteria for network creation, KPIs for quality management, program planning and management tool-kits.

Service Consolidation and Optimization

As the network operator moves into operating and maintaining the "NGN", there will be many parallel market driven journeys during which services and capabilities will be developed for the "NGN". The network creation process provides tools to assist the client into improving efficiencies of these parallel journeys. These optimization efforts will include organizational, process and technology driven changes to create efficiency based on consolidation of processes, as well as measurement tools to determine the success of such consolidation. The network architecture roadmap and business blueprint will act as the foundation to ensure that during the consolidation phase the "NGN" maintains the required architecture framework to sustain it for the long term.

Now that the details regarding the NGN have been set forth, information will now be presented concerning billing when the quality of service is degraded.

Degraded Quality of Service and Billing

A typical telecommunication network comprises multiple telecommunication switches located throughout a geographical area. When a user makes a call, the call may be routed through one or more switches before reaching its destination.

FIG. 1A illustrates an exemplary telecommunications system 102 across the United States. For purposes of illustration, a caller 104 places a call from Los Angeles, Calif. to a party 112 located in New York City, N.Y. Such a call is typically transmitted across three (3) switches: the Los Angeles, Calif. switch 106; the Chicago, Ill. switch 108; and the New York City, N.Y. switch 110. In this scenario, the originating switch is the Los Angeles, Calif. switch 106, and the terminating switch is the New York City, N.Y. switch 110.

Each of the switches, 106–110, is connected to two (2) or more Data Access Points (DAP) 116–120, for instance a primary DAP 116–120 and a backup DAP 116–120. A DAP 116–120 is a facility that receives requests for information from the switches 106–110, processes the requests, and returns the requested information back to the requesting switch 106–110. The switches 106–110 use information from the DAPs 116–120 to process calls through the network.

When a call passes through one of the switches, 106–110, that switch creates a call record. The call record contains information on the call, including but not limited to: routing, billing, call features, and trouble shooting information. After the call is terminated, each switch 106–110 that processed the call completes the associated call record. The switches 106–110 combine multiple call records into a billing block.

When a switch 106–110 fills the billing block, the switch 106–110 sends the billing block to a billing center 114. Thus, the billing center 114 receives one billing block from each switch 106–110 that handled the call, which in this case would be three billing blocks. The billing center 114 searches each billing block and retrieves the call record associated with the call, thereby retrieving one call record per switch 106–110 that handled the call. The billing center 114 then uses one or more of the retrieved call records to generate a billing entry. The billing center 114 is also connected to each DAP 116–120 to retrieve information regarding a switch 106–110 or call record. However, billing in the present invention is increased because the hybrid network also contains proxy intelligence.

Figure 1B:
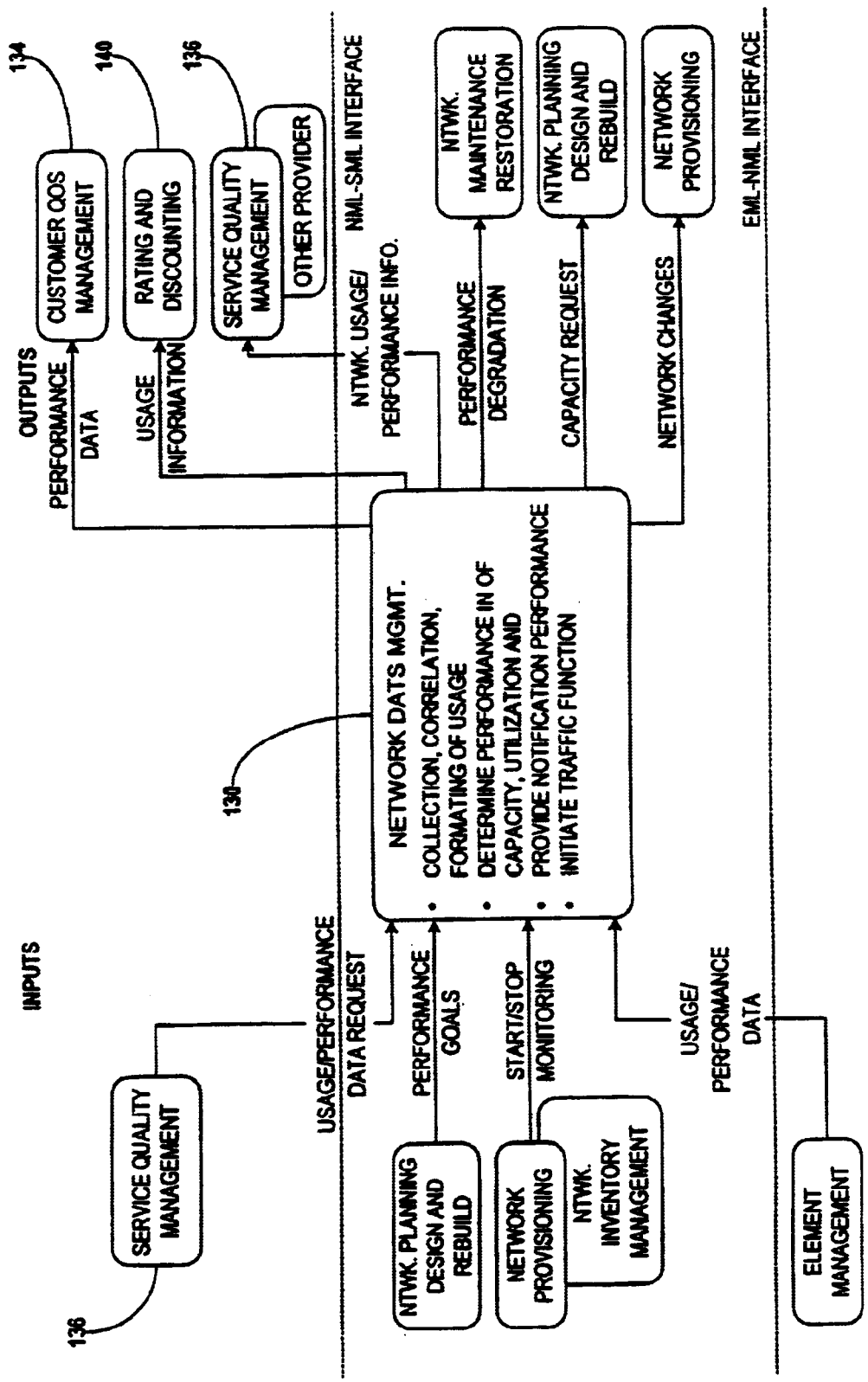
FIG. 1B shows a block diagram of the Network Data Management in accordance with a preferred embodiment.

FIG. 1B shows a block diagram of the Network Data Management 130 in accordance with a preferred embodiment of the present invention. Network Data Management 130 encompasses the collection of usage data and events for the purpose of network performance and traffic analysis. This data may also be an input to Billing (Rating and Discounting) processes at the Service Management Layer, depending on the service and its architecture.

The process provides sufficient and relevant information to verify compliance/non-compliance to Service Level Agreements (SLA). The process provides sufficient usage information for rating and billing.

This process ensures that the Network Performance goals are tracked, and that notification is provided when they are not met (threshold exceeded, performance degradation). This also includes thresholds and specific requirements for billing. This includes information on capacity, utilization, traffic and usage collection. In some cases, changes in traffic conditions may trigger changes to the network for the purpose of traffic control. Reduced levels of network capacity can result in requests to Network Planning for more resources.

Figures 1, 1B:
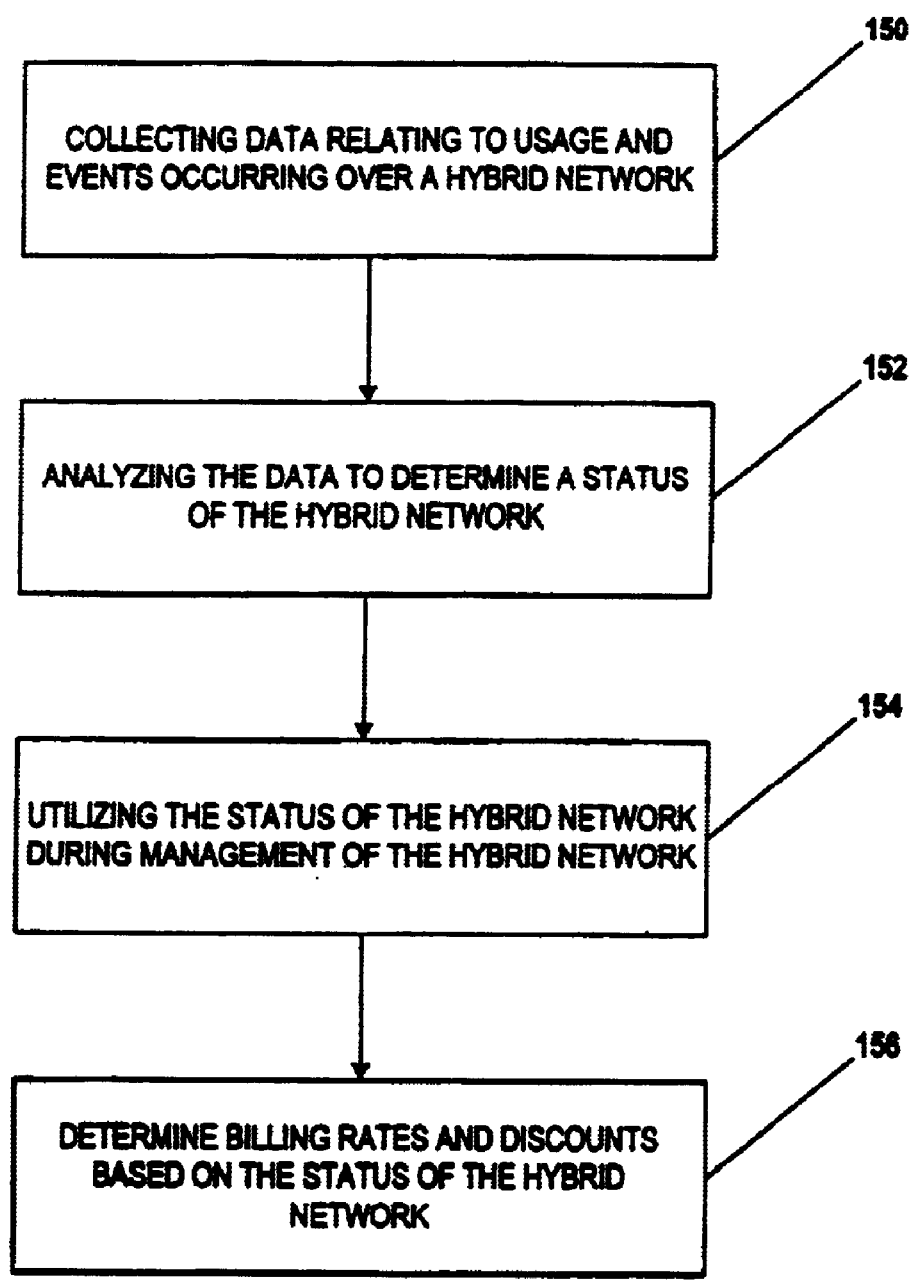

FIG. 1B-1 is a flowchart illustrating a network data management process in accordance with a preferred embodiment. First, in step 150, data is collected relating to usage and events occurring over a hybrid network. Next, in step 152, the data is analyzed to determine a status of the hybrid network which in turn, in step 154, is utilized during management of the hybrid network. Further, in step 156, billing rates and discounts are determined based on the status of the hybrid network.

Figure 1C:
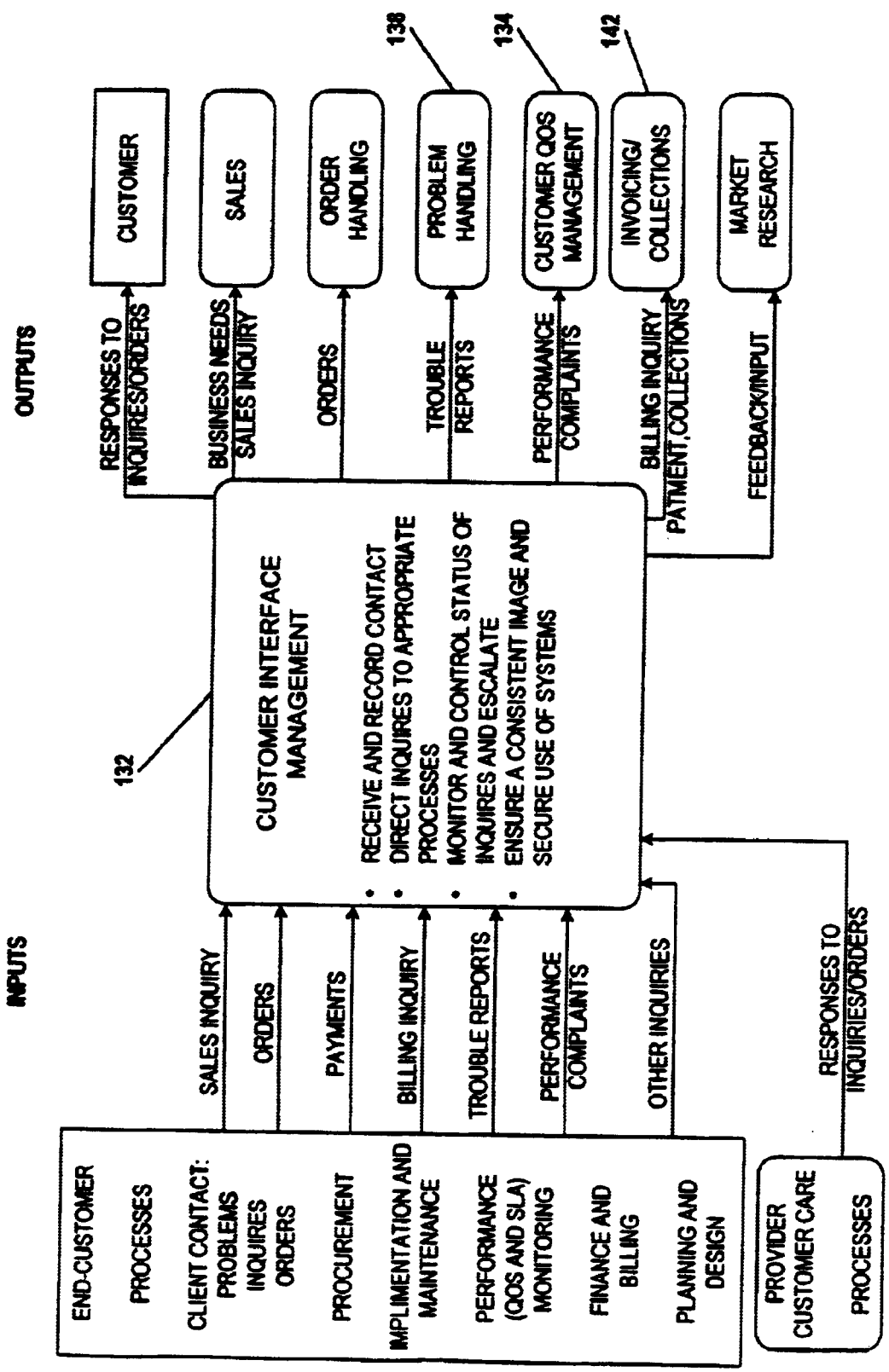
FIG. 1C shows a block diagram of the Customer Interface Management Process in accordance with a preferred embodiment.
Figures 1, 1C:
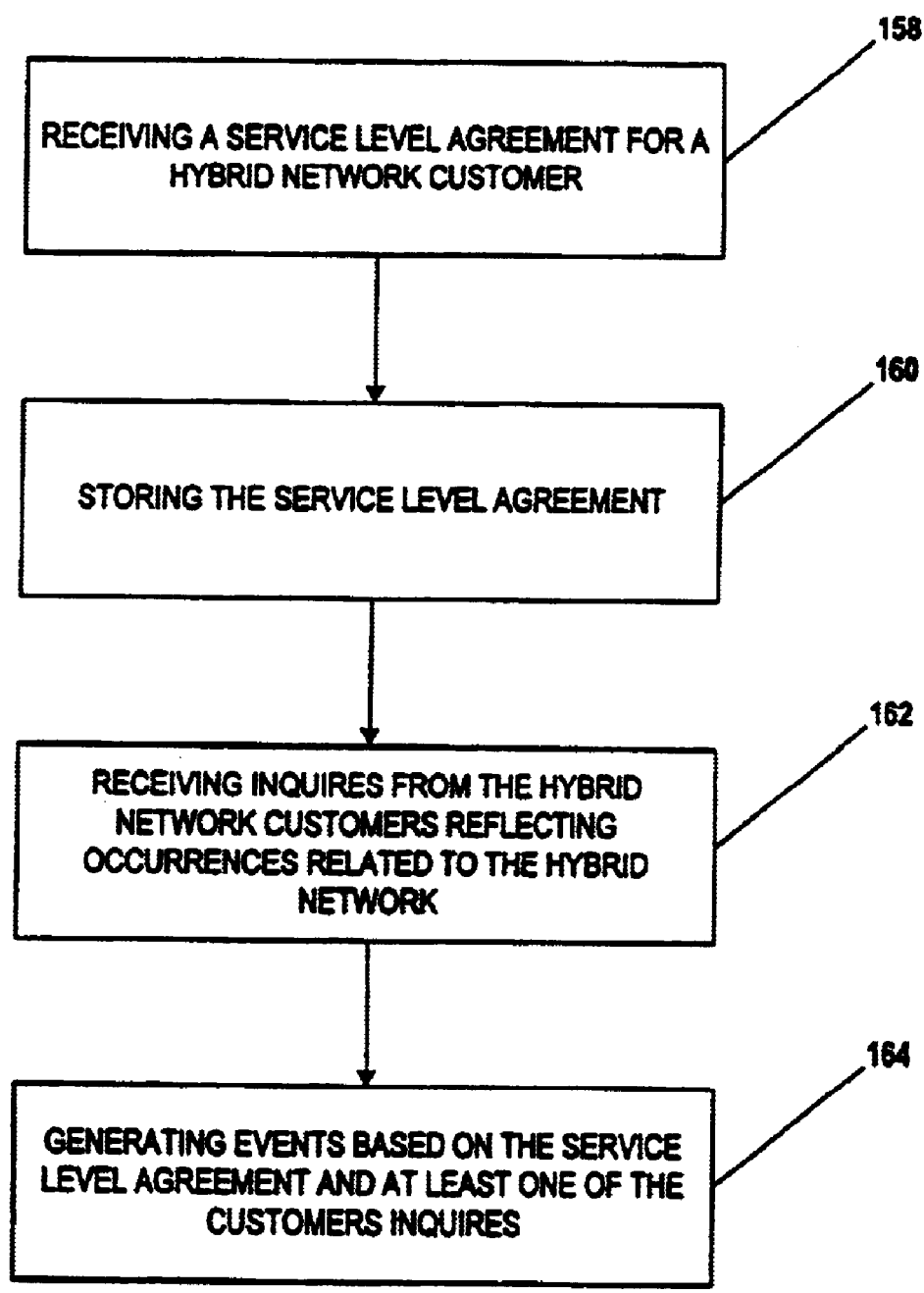

In addition to the Network Data Management 130 generating billing events, the present invention also uses a Customer Interface Management process 132, as shown in FIG. 1C, to directly interact with customers-and translate customer requests and inquiries into appropriate "events" such as, the creation of an order or trouble ticket or the adjustment of a bill. This process logs customer contacts, directs inquiries to the appropriate party, and tracks the status to completion. In those cases where customers are given direct access to service management systems, this process assures consistency of image across systems, and security to prevent a customer from harming their network or those of other customers. The aim is to provide meaningful and timely customer contact experiences as frequently as the customer requires.

FIG. 1C-1 is a flowchart illustrating a Customer Interface Management Process in accordance with a preferred embodiment. First, in step 158, a service level agreement is received for a hybrid network customer. Next, in step 160, the service level agreement is stored after which, in step 162, inquiries are received from network customers reflecting occurrences related to the hybrid network. Thereafter, in step 164, events are generated based on the customer inquiries and the service level agreement.

Figure 1D:
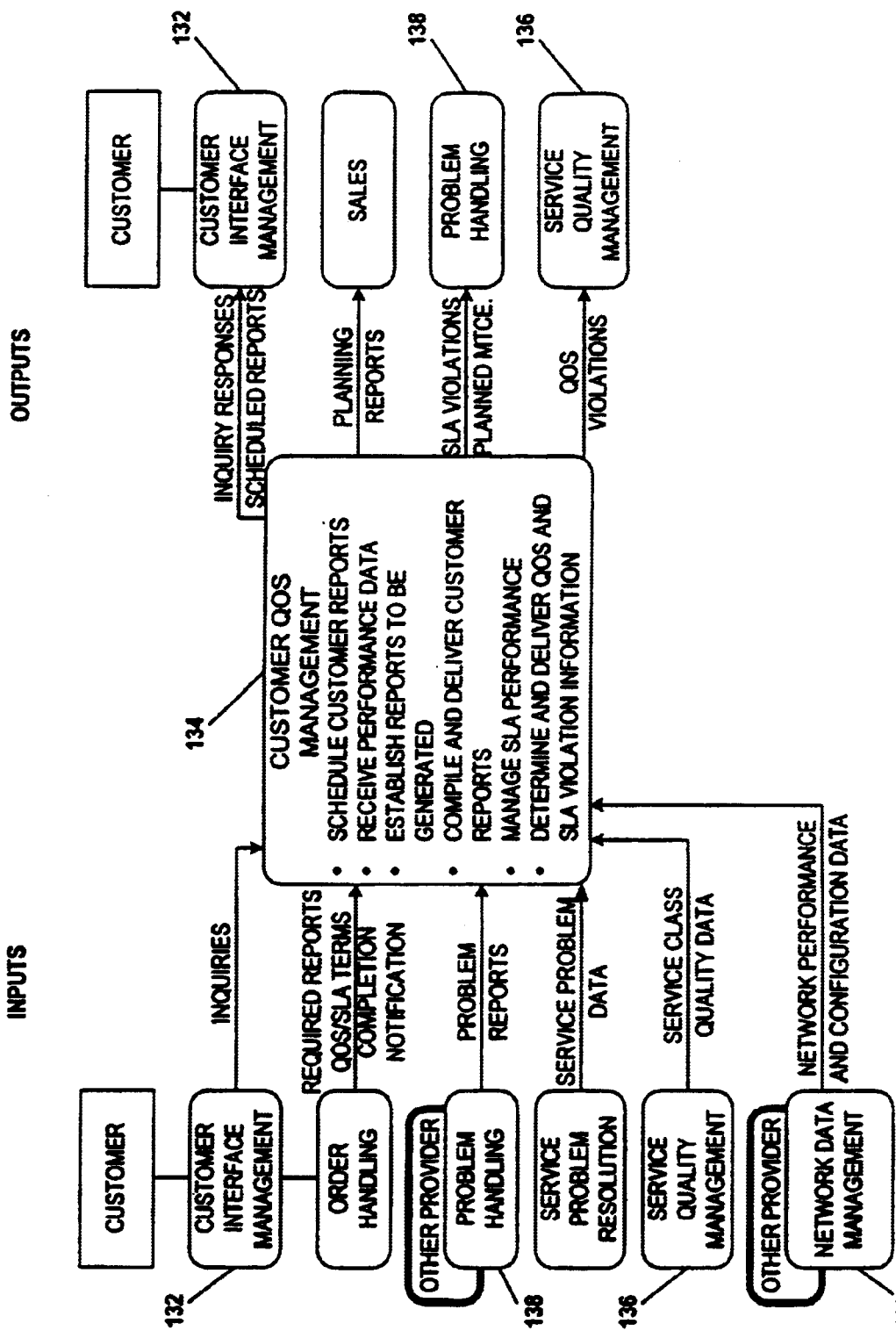
FIG. 1D shows a block diagram of the Customer Quality of Service Management Process in accordance with a preferred embodiment.
Figures 1, 1D:
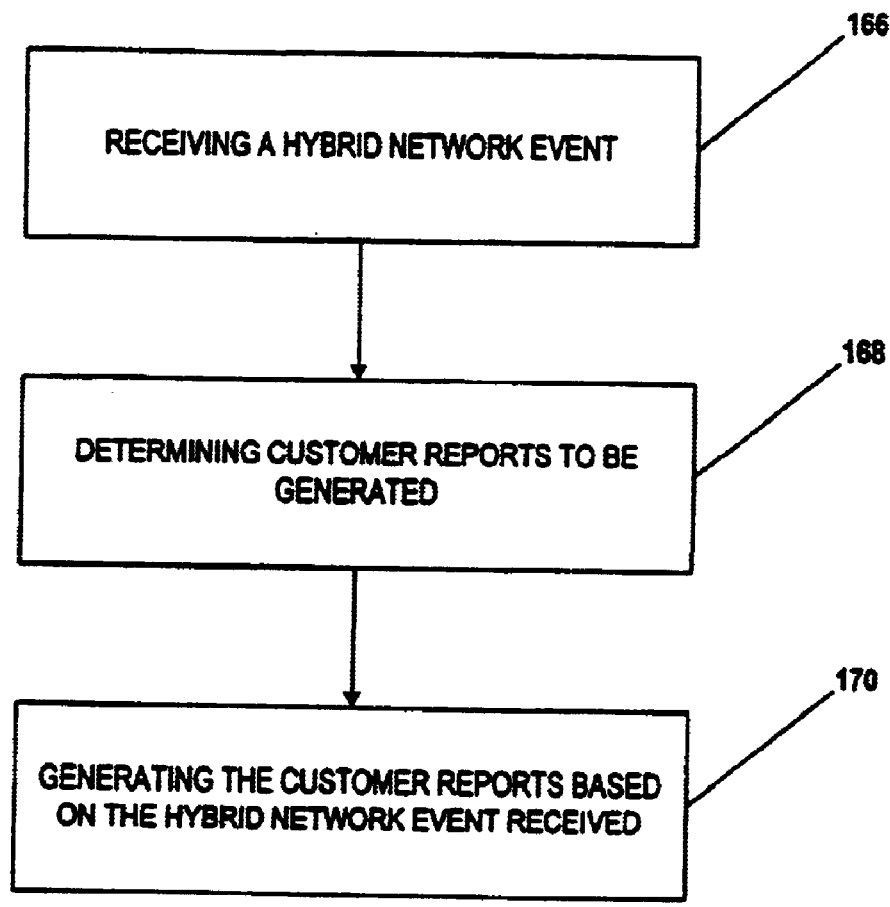

The Network Data Management 130 and Customer Interface Management process 132 are used to give information to the Customer Quality of Service Management Process 134, as shown in FIG. 1D. The Customer Quality of Service Management Process 134 encompasses monitoring, managing and reporting of quality of service as defined in Service Descriptions, Service Level Agreements (SLA), and other service-related documents. It includes network performance, but also performance across all of service parameters, e.g., Orders Completed On Time. Outputs of this process are standard (predefined) and exception reports, including; dashboards, performance of a service against an SLA, reports of any developing capacity problems, reports of customer usage patterns, etc. In addition, this process responds to performance inquiries from the customer. For SLA violations, the process supports notifying Problem Handling and for QoS violations, notifying Service Quality Management 136. The aim is to provide effective monitoring. Monitoring and reporting must provide SP management and customers meaningful and timely performance information across the parameters of the services provided. The aim is also to manage service levels that meet specific SLA commitments and standard service commitments.

FIG. 1D-1 is a flowchart illustrating a Customer Quality of Service Management Process in accordance with a preferred embodiment. First, in step 166, a hybrid network event is received which may include customer inquiries, required reports, completion notification, quality of service terms, service level agreement terms, service problem data, quality data, network performance data, and/or network configuration data. Next, in step 168, the system determines customer reports to be generated and, in step 170, generates the customer reports accordingly based on the event received.

Figure 1E:
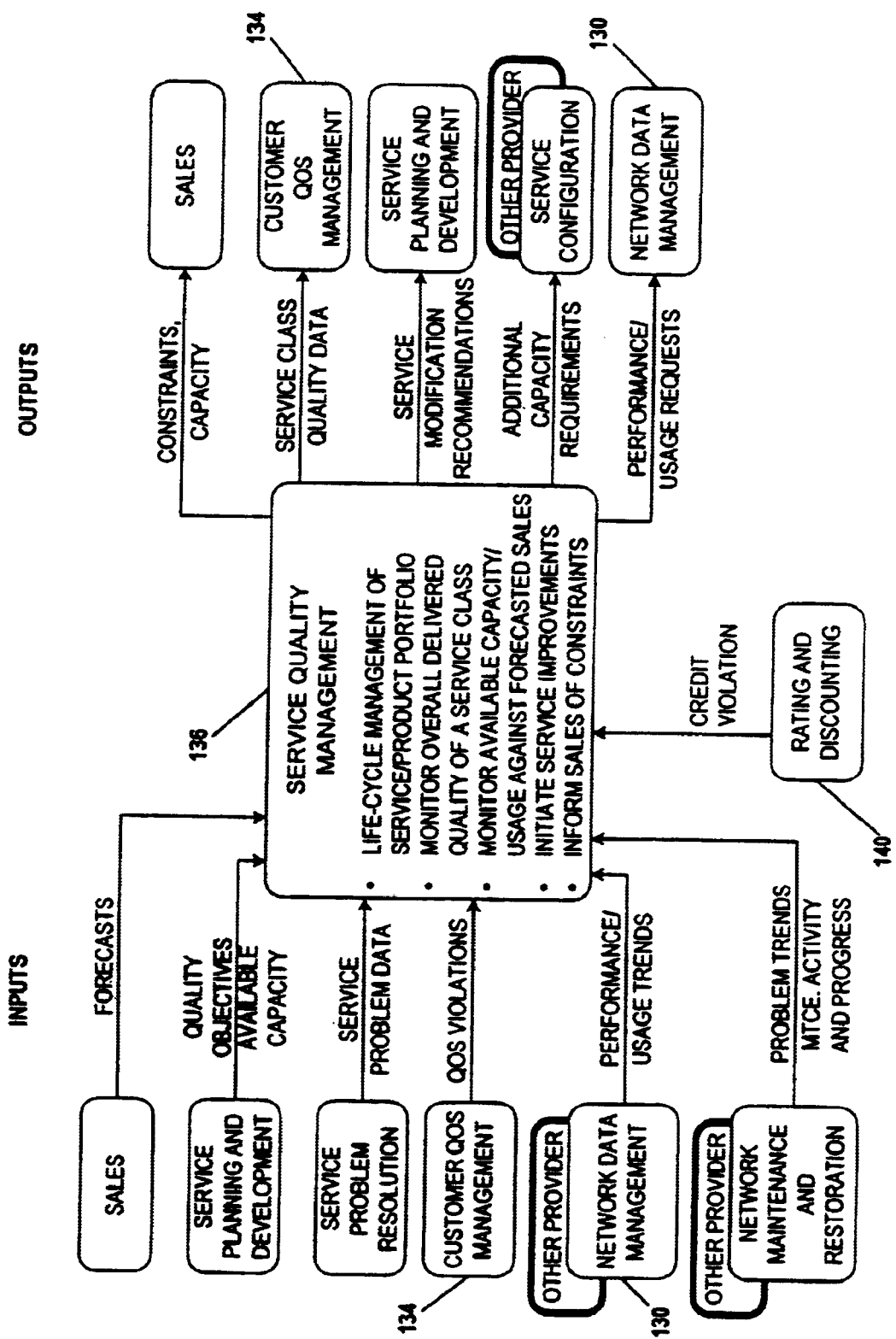
FIG. 1E shows a block diagram of the Service Quality Management in accordance with a preferred embodiment.
Figures 1, 1E:
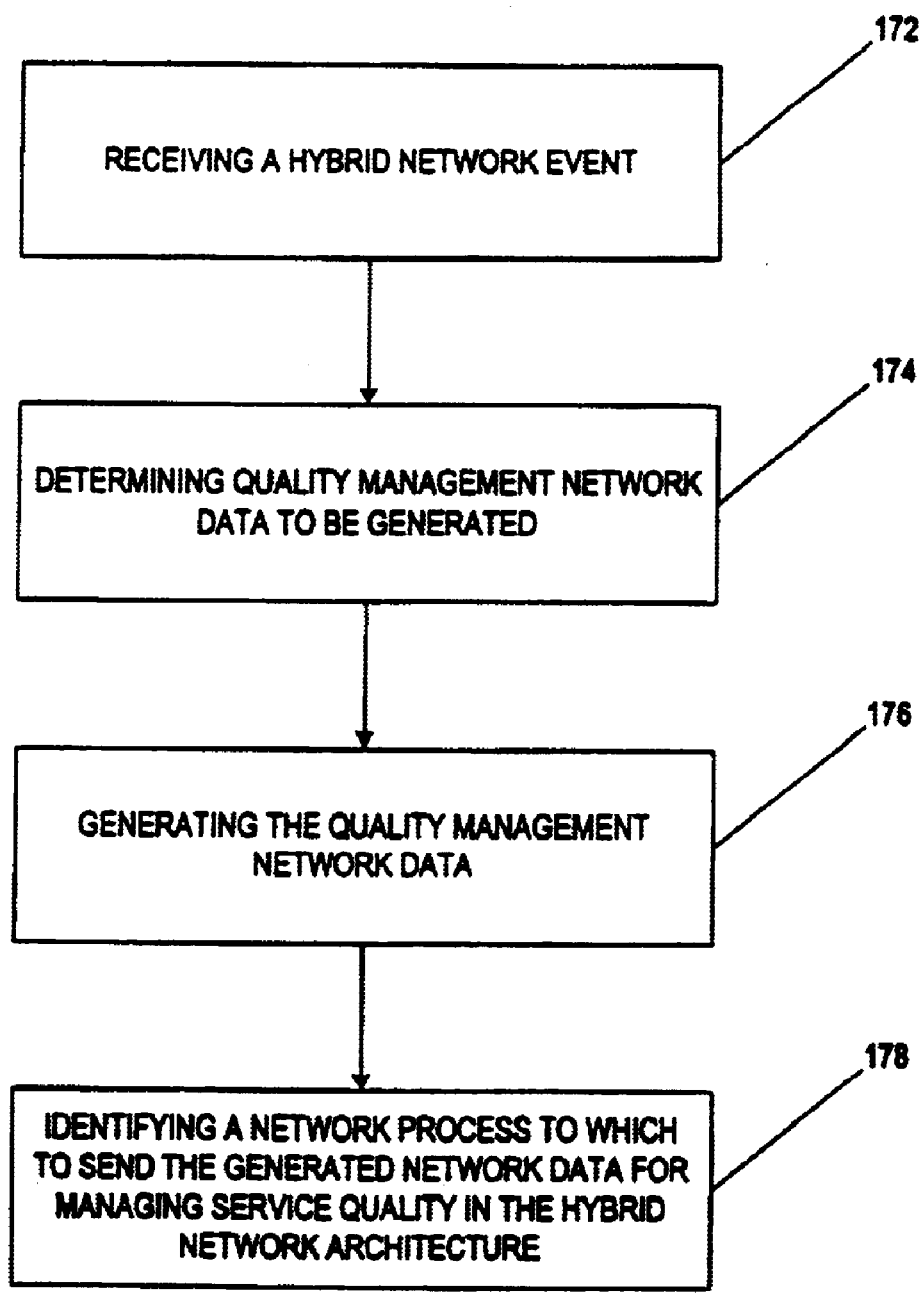

FIG. 1E shows a block diagram of the Service Quality Management 136 in accordance with a preferred embodiment of the present invention. The Service Quality Management Process 136 supports monitoring service or product quality on a service class basis in order to determine Whether service levels are being met consistently Whether there are any general problems with the service or product Whether the sale and use of the service is tracking to forecasts.

This process also encompasses taking appropriate action to keep service levels within agreed targets for each service class and to either keep ahead of demand or alert the sales process to slow sales. The aim is to provide effective service specific monitoring, management and customers meaningful and timely performance information across the parameters of the specific service. The aim is also to manage service levels to meet SLA commitments and standard commitments for the specific service.

FIG. 1E-1 is a flowchart illustrating a Service Quality Management Process in accordance with a preferred embodiment. First, in step 172, a hybrid network event is received that may include forecasts, quality objectives, available capacity, service problem data, quality of service violations, performance trends, usage trends, problem trends, maintenance activity, maintenance piogress, and/or credit violations. Next, in step 174, quality management network data is determined and, in step 176, the quality management network data is generated. Such quality management network data may include constraint data, capacity data, service class quality data, service modification recommendations, additional capacity requirements, performance requests, and/or usage requests. Finally, in step 178, a network process to which to send the generated data is identified.

Figure 1F:
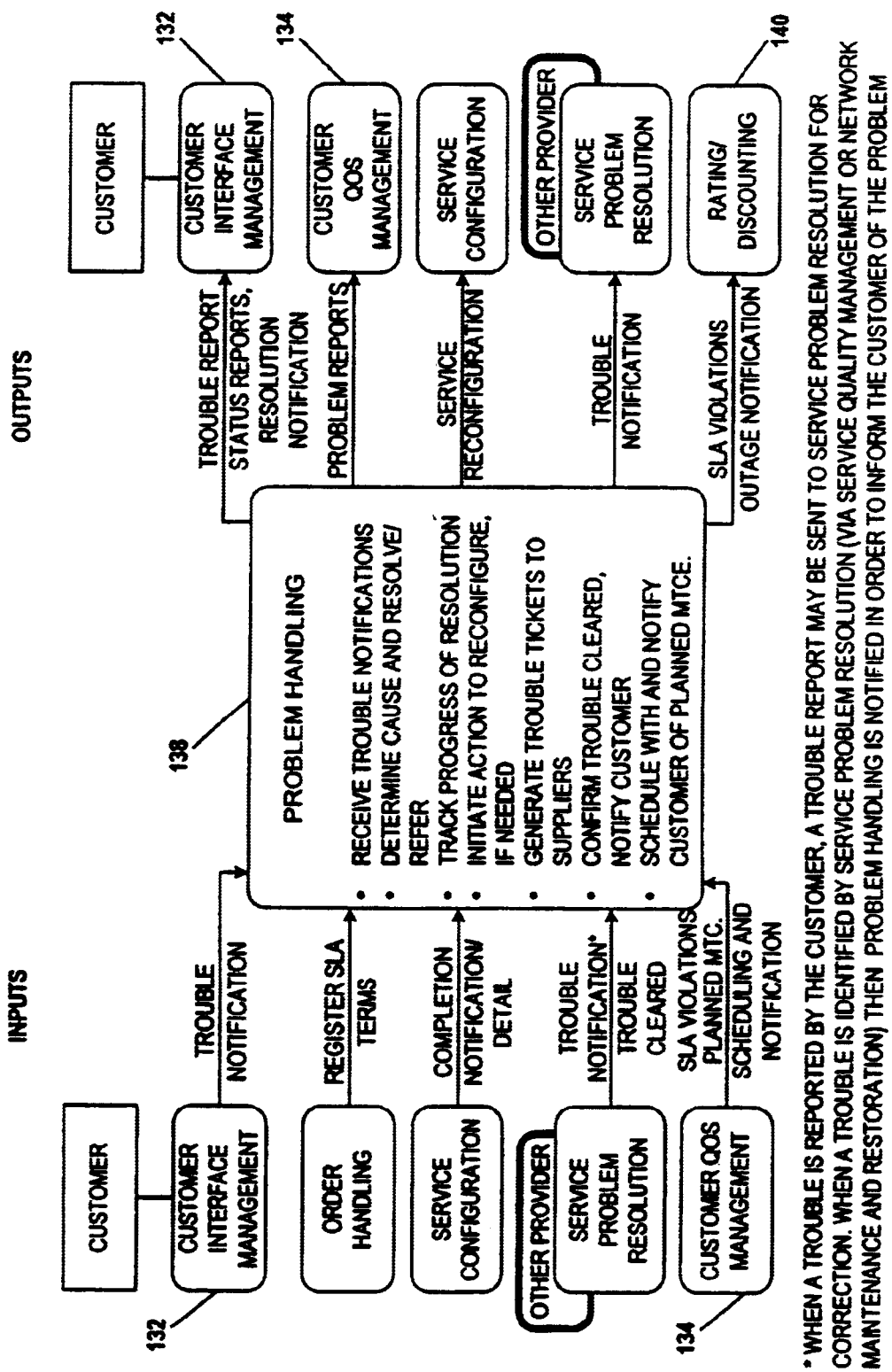
FIG. 1F shows a block diagram of the Problem Handling Process in accordance with a preferred embodiment.
Figures 1, 1F:
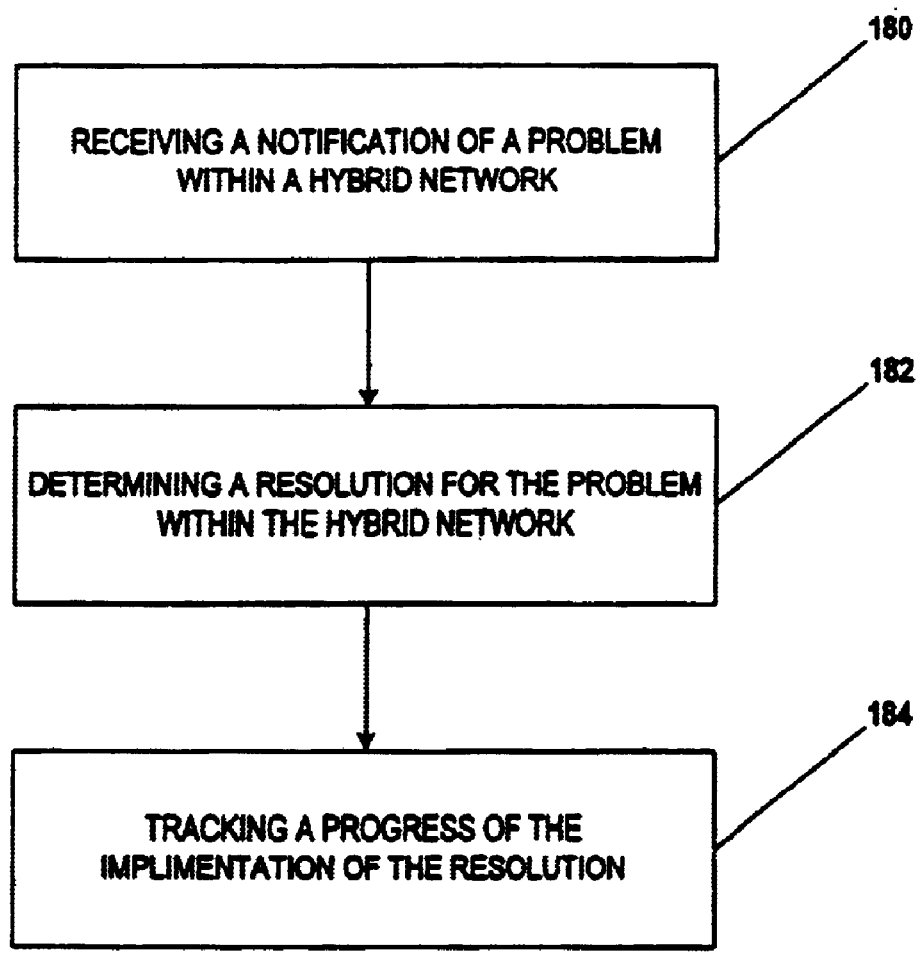

FIG. 1F shows a block-diagram of the Problem Handling Process 138. The Problem Handling Process receives information from the Customer Interface Management Process 132 and the Customer Quality of service Management Process 134. It is responsible for receiving service complaints from customers, resolve them to the customer's satisfaction and provide meaningful status on repair or restoration activity. This process is also responsible for any service-affecting problems, including notifying the customer in the event of a disruption (whether reported by the customer or not), resolving the problem to the customer's satisfaction, and providing meaningful status on repair or restoration activity.

This proactive management also includes planned maintenance outages. The aim is to have the largest percentage of problems proactively identified and communicated to the customer, to provide meaningful status and to resolve in the shortest timeframe.

FIG. 1F-1 is a flowchart illustrating a Problem Handling Management Process in accordance with a preferred embodiment. First, in step 180, a notification of a problem within a hybrid network is received by the system. Next, in step 182, a resolution for the problem within the hybrid network is determined. The resolution may include a status report, resolution notification, problem reports, service reconfiguration, trouble notification, service level agreement violations, and/or outage notification. Finally, in step 184, the progress of the implementation of the resolution is tracked.

Figure 1G:
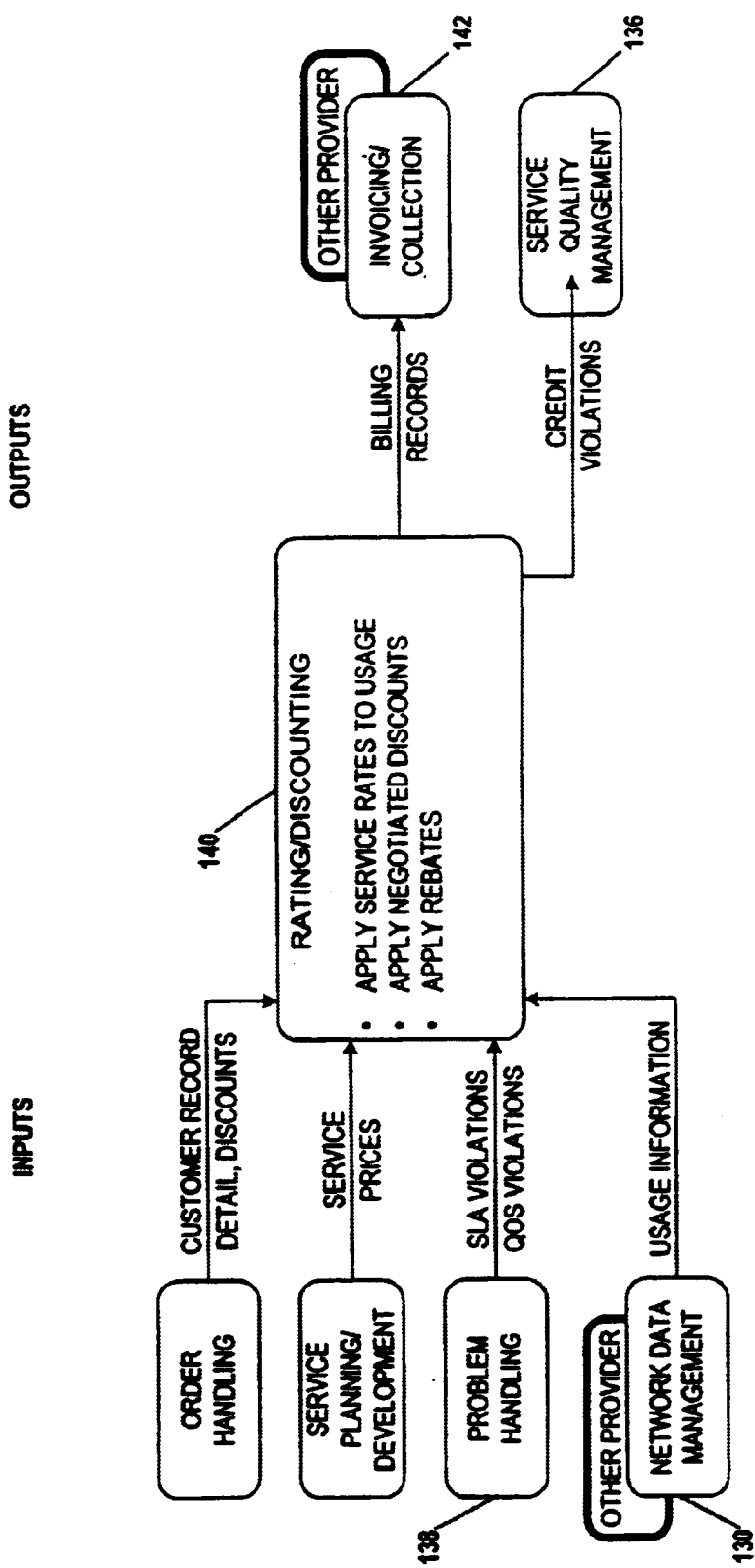
FIG. 1G shows a block diagram of the Rating and Discounting Process in accordance with a preferred embodiment.
Figures 1, 1G:
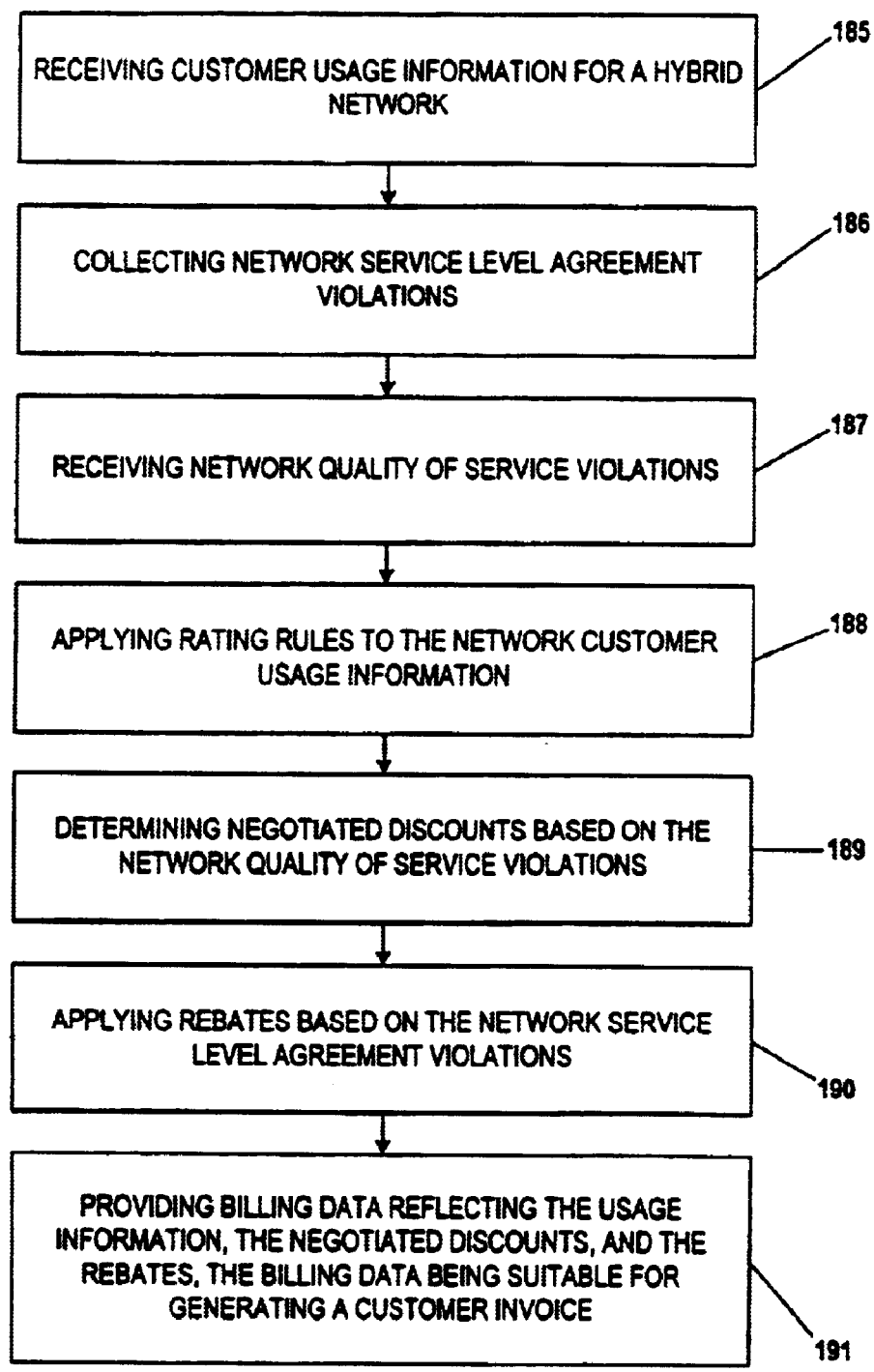

The Problem Handling Process 138 and the Network Data Management 130 feed information to the Rating and Discounting Process 140, as shown in FIG. 1G. This process applies the correct rating rules to usage data on a customer-by-customer basis, as required. It also applies any discounts agreed to as part of the Ordering Process, for promotional discounts and charges, and for outages. In addition, the Rating and Discounting Process 140 applies any rebates due because service level agreements were not met. The aim is to correctly rate usage and to correctly apply discounts, promotions and credits.

FIG. 1G-1 is a flowchart illustrating Rating and Discounting Process in accordance with a preferred embodiment. First, in step 185, hybrid network customer usage information is received. In step 186, network service level agreement violations are collected, and, in step 187, network quality of service violations are received by the Rating and Discounting system. Next, in step 188, rating rules are applied to the network customer usage information. Further, in step 189, negotiated discounts are determined based on the network quality of service violations and, in step 190, rebates are determined based on the network service level agreement violations. Thereafter, in step 191, billing data reflecting the usage information, the negotiated discounts, and the rebates is provided to generate a customer invoice.

Figure 1H:
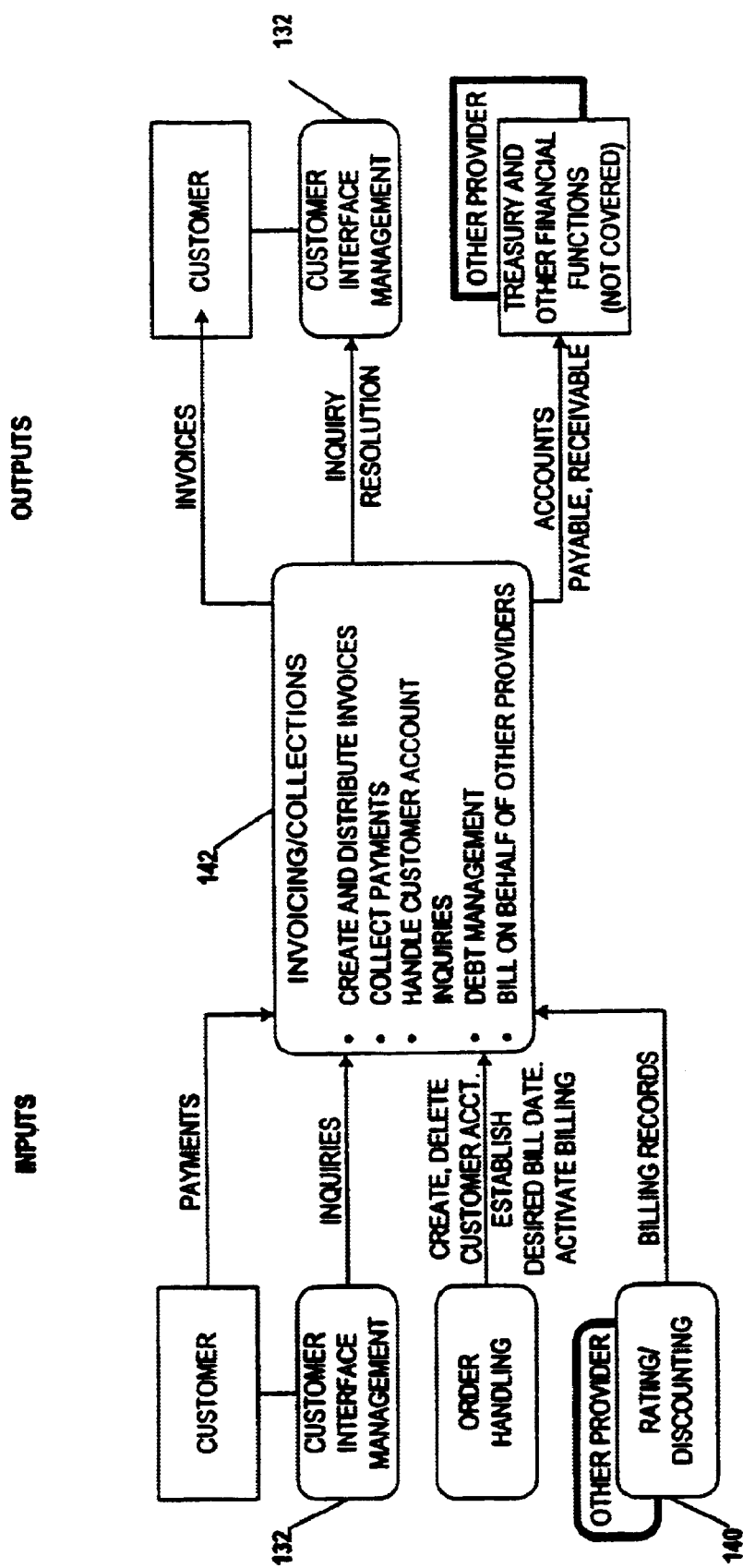
FIG. 1H shows a block diagram of the Invoice and Collections Process in accordance with a preferred embodiment.
Figures 1, 1H:
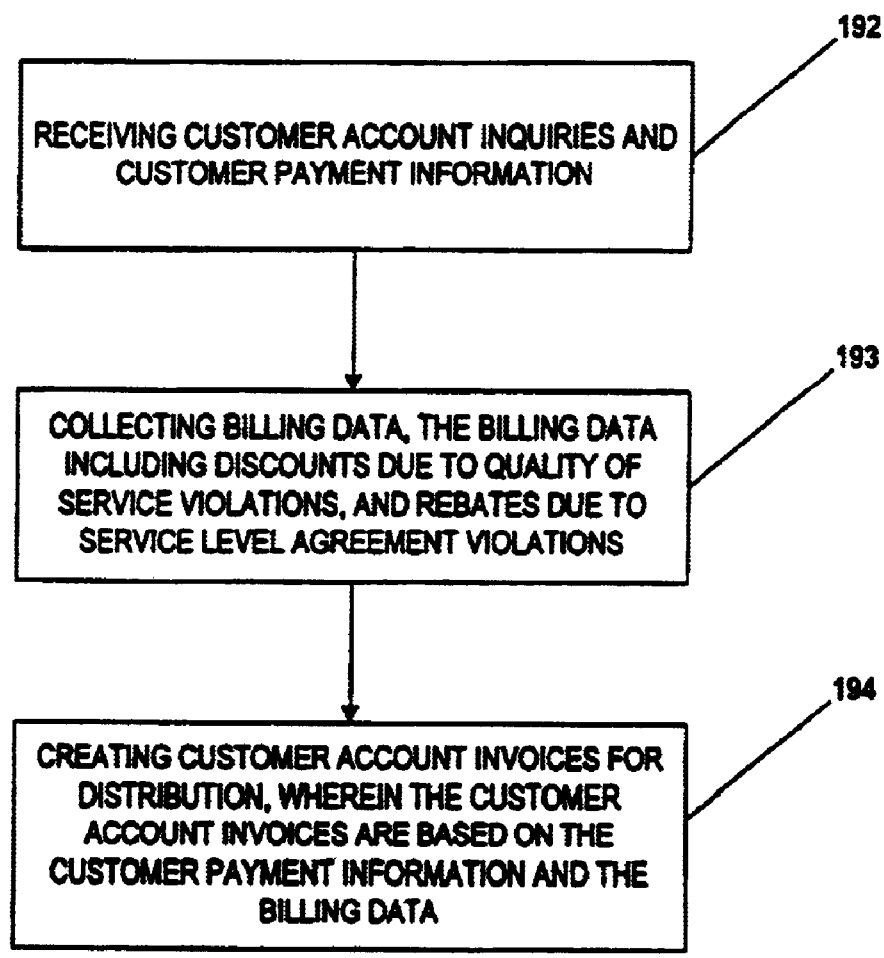

Utilizing information from the Rating and Discounting Process 140, the Invoice and Collections Process 142, as shown in FIG. 1H, creates correct billing information. This process encompasses sending invoices to customers, processing their payments and performing payment collections. In addition, this process handles customer inquiries about bills, and is responsible to resolve billing problems to the customer's satisfaction. The aim is to provide a correct bill and, if there is a billing problem, resolve it quickly with appropriate status to the customer. An additional aim is to collect money due the service provider in a professional and customer supportive manner.

FIG. 1H-1 is a flowchart illustrating an Invoice and Collections Process in accordance with a preferred embodiment. First, in step 192, customer account inquiries and customer payment information is received by the system. Next, in step 193, billing data, including discounts due to quality of service violations and rebates due to service level agreement violations, is collected and processed. Thereafter, in step 194, customer account invoices are created for distribution based on the customer payment information and the billing data.

Mediation and activity tracking are provided by the event logger and event manager. The event logger and event manager feed the rating and billing information for Degraded service using the personally customized rules database. Utilizing an expert system for the tailored capabilities of each customer, the event driver, collector and manager analyze notification events generated by the system. When a notification event is received the system analyzes the event and uses it to identify the customer. The notification event is also used to credit the customer if they experience a non-impacting event that breaches the customer's contract. In addition to the system itself generating the notification event, the customer is also able to notify the provider directly should such an event occur.

Figure 2A:
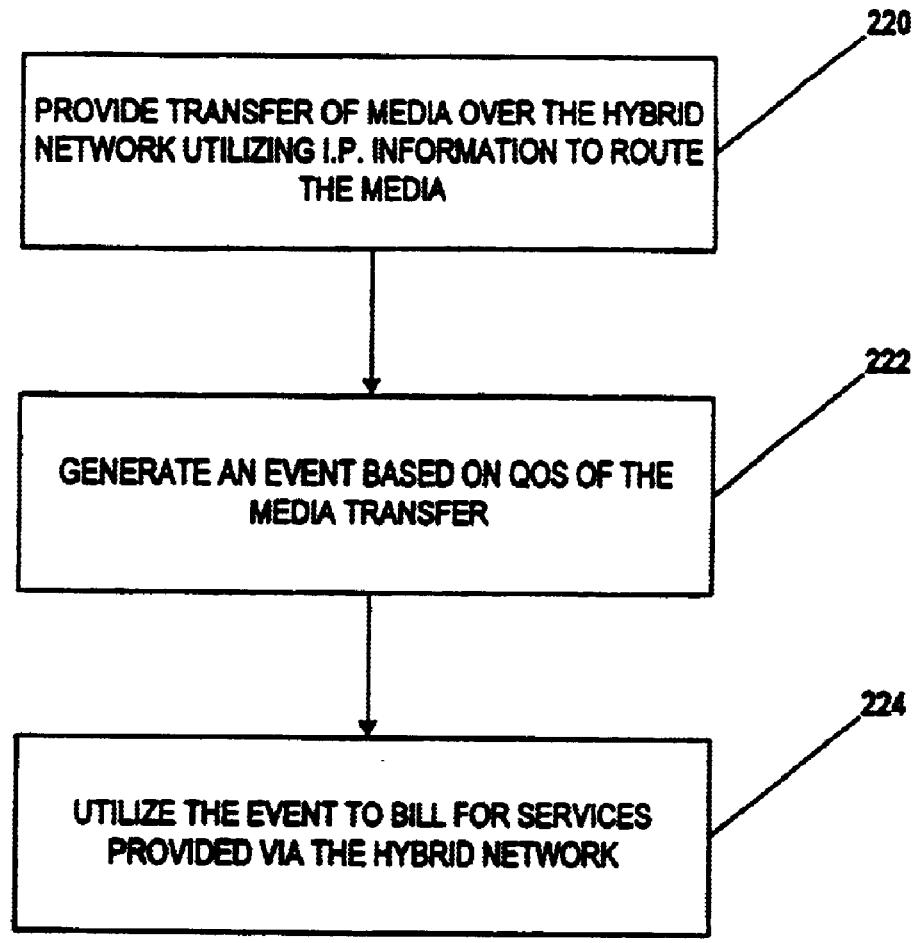
FIG. 2A is a flowchart showing illustrating media communication over a hybrid network in accordance with a preferred embodiment.

FIG. 2A is a flowchart illustrating media communication over the hybrid network of the present invention. When a customer initiates a use of the hybrid network, the hybrid network, in a first step 220, transfers the media over the network using IP information to route it to the appropriate destination. The media transferred over the network may be telephony data, image data, or any other data capable of packet switched transmission.

In a second step 222, events are generated based on the quality of service of the media transfer. As discussed above with reference to FIG. 1D and FIG. 1E, these events include performance notifications due to SLA violations, and customer generated events from the Customer Interface Management Process 132.

In a third step 224, the events generated in step 222 are utilized to generate a bill for the customer. In addition to normal billing for service provided via the hybrid network, the bill is modified based on events generated during the media transfer. For example, events representing SLA violations are used to credit customers. As discussed above with reference to FIGS. 1F, 1G, and 1H, the Problem Handling Process 138 is responsible for receiving service complaints and other service-affecting problems. Together with the Network Data Management 130, the Problem Handling Process feeds data to the Discounting Process 140. The Discounting Process 140 applies the correct rating rules on a customer-by-customer basis, and applies discounts for events, such as outages and other SLA violations. Finally, the Invoice and Collections Process 142, utilizes the information from the Discounting Process 140 to create customer billing information.

To better understand the invention, it is useful to describe some additional terminology relating to a telecommunication network. A telephone call comes into a switch on a transmission line referred to as the originating port, or trunk. The originating port is one of many transmission lines coming into the switch from the same location of origin. This group of ports is the originating trunk group. After processing an incoming call, the switch transmits the call to a destination location, which may be another switch, a local exchange carrier, or a private branch exchange. The call is transmitted over a transmission line referred to as the terminating port, or trunk. Similar to the originating port, the terminating port is one of a group of ports going from the switch to the same destination. This group of ports is the terminating trunk group.

Contemporary telecommunication networks provide customers with the capability of using the general public network as well as the capability of defining a custom virtual network (VNet). With a VNet, a customer defines a private dialing plan, including plan telephone numbers. A VNet customer is not limited to the default telephone numbers allocated to a public telecommunication system dedicated to a specific geographic region, but can define custom telephone numbers.

Upon processing a telephone call, a switch must generate a call record large enough to contain all of the needed information on a call. The call record, however, must not be so large that the typical call results in the majority of the record fields in the call record to be unused. In such a case, storing such call records results in large amounts of wasted storage, and transmitting such a call record causes unnecessary transmissions.

One solution for creating and processing call records is to implement a fixed length call record format, such as a 32-word call record. A word is two (2) bytes, or sixteen (16) bits. A fixed length record format, however, cannot expand when new call features are implemented. More importantly, fixed call record formats cannot handle expanded data fields as the telecommunications network becomes more complex with new features and telephone numbers.

Contemporary fixed length record formats include time point fields recording local time in three (3) second increments where local switch time represents the time of day at a switch. The timepoint fields are used by the network switches, billing center, and other network subsystems. Each subsystem, however, may require the time period for a different use and in a different format, such as in an epoch time format. Epoch time is the number of one (1) second increments since a particular date and time in history. For example, the billing center requires epoch time for its billing records whereas switch reports and error logs require local switch time.

A problem also arises when using only local switch time in that there is no accommodation for time changes due to daylight savings time. In addition, each subsystem may require a finer granularity of precision than the current three (3) second increments. By providing only local switch time at three (3) second increments, the switches have passed the burden of translating the time into a usable format to the network subsystems. The fixed record format cannot accommodate the various time period requirements because it only contains the time periods in local switch time at a low level of precision. Because of its fixed nature, the fixed record format cannot expand to include different time formats, nor to include a finer granularity of precision, such as a one (1) second increment.

Therefore, there is a need for switches of a telecommunications network to store call record information in a flexible and expandable format. There is a further need to provide time point fields with one (1) second granularity in a flexible format that easily and efficiently responds to daylight savings time and time zone changes.

There is also a need to match all of the call records associated with a specific telephone call. For example, for proper billing and cost control, it is necessary for the billing center to match the originating switch's call record to the terminating switch's call record. Also, for troubleshooting and security purposes, it may be necessary to trace a specific telephone call through the network with ease in order to isolate problem areas.

Therefore, there is a need for switches of a telecommunications network to uniquely identify each telephone call that traverses the network, thereby uniquely identifying all of the call records associated with a specific telephone call.

An Embodiment

Call Record Format

An embodiment solves the problem of providing a flexible and expandable call record format by implementing both a small and a large call record format. In particular, the embodiment implements a default 32-word call record format, plus an expanded 64-word call record format. An embodiment uses a 32-word call record format for the typical telephone call, which comprises the majority of all telephone calls, and uses a 64-word call record format when additional information is needed regarding the call. This implementation provides the flexibility needed to efficiently manage varying data requirements of a given call record. New call features can be developed and easily incorporated into the variable call record format of the present invention.

This embodiment also records timepoints in the epoch time format. The embodiment records the origination time of a call in epoch time format, and the remaining timepoints are offsets, or the number of seconds, from that origination time. This embodiment solves the problems associated with converting to and from daylight savings time because daylight savings time is a local time offset and does not affect the epoch time. Furthermore, the timepoints in epoch time format require less space in the call record than they do in local switch time format.

The epoch time format may represent coordinated universal time (UTC), as determined at Greenwich, England, which has a time zone of zero (0) local switch time, or any other time. Epoch time is only a format and does not dictate that UTC must be used. The billing time and the local switch time may be in UTC or local time, and the local switch time may not necessarily be the same time that is used for billing. Therefore, the switch must keep billing time and local switch time separate in order to prevent the problems that occur during daylight savings time changes.

Network Call Identifier

This embodiment solves the problem of uniquely identifying each telephone call and all of the call records associated with a specific telephone call by providing a unique identifier to each call record. It generates a network call identifier (NCID) that is assigned to each call record at the point of call origination, that is, the originating switch generates an NCID for each telephone call. The NCID accompanies the associated telephone call through the telecommunications network to the termination point at the terminating switch. Therefore, at any point of a telephone call in the network, the associated NCID identifies the point and time of origin of the telephone call. Each switch through which the telephone call passes records the NCID in the call record associated with the call. The NCID is small enough to fit in a 32-word call record, thereby reducing the data throughput and storage. The NCID provides the billing center and other network subsystems with the ability to match originating and terminating call records for a specific telephone call.

This embodiment also provides the switch capability of discarding a received NCED and generating a new NCID. A switch discards a received NCID if the NCID format is invalid or unreliable, thereby ensuring a valid unique identifier to be associated with each call going through the network. For instance, an NCID may be unreliable if generated by third party switches in the telecommunications network.

This embodiment relates to switches of a telecommunication network that generate call records using a flexible and expandable record format. The call record formats include a small (preferably 32-word) and a large (preferably 64-word) expanded format. It would be readily apparent to one skilled in the relevant art to implement a small and large record format of different sizes.

The embodiment also relates to switches of a telecommunication network that generate a unique NCID for each telephone call traversing the network. The NCID provides a mechanism for matching all of the call records associated with a specific telephone call. It would be readily apparent to one skilled in the relevant art to implement a call record identifier of a different format.

Figure 2B:
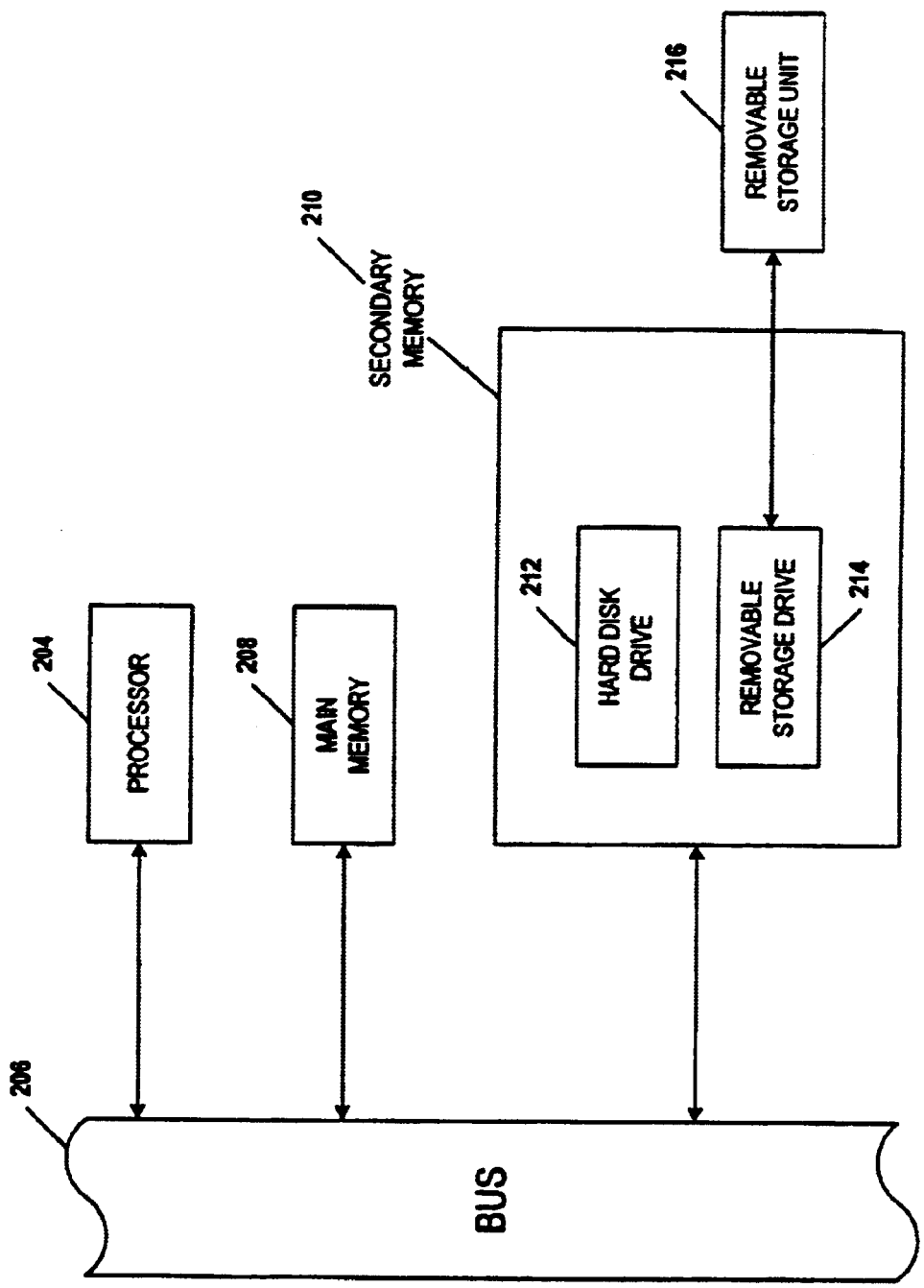
FIG. 2B is a block diagram of an exemplary computer system in accordance with a preferred embodiment.

The chosen embodiment is computer software executing within a computer system. FIG. 2B shows an exemplary computer system. The computer system 202 includes one or more processors, such as a processor 204. The processor 204 is connected to a communication bus 206.

The computer system 202 also includes a main memory 208, preferably random access memory (RAM), and a secondary memory 210. The secondary memory 210 includes, for example, a hard disk drive 212 and/or a removable storage drive 214, representing a floppy disk drive, a magnetic tape drive, a compact disk drive, etc. The removable storage drive 214 reads from and/or writes to a removable storage unit 216 in a well known manner.

Removable storage unit 216, also called a program storage device or a computer program product, represents a floppy disk, magnetic tape, compact disk, etc. The removable storage unit 216 includes a computer usable storage medium having therein stored computer software and/or data.

Computer programs (also called computer control logic) are stored in main memory 208 and/or the secondary memory 210. Such computer programs, when executed, enable the computer system 202 to perform the functions of the present invention as discussed herein. In particular, the computer programs, when executed, enable the processor 204 to perform the functions of the present invention. Accordingly, such computer programs represent controllers of the computer system 202.

Another embodiment is directed to a computer program product comprising a computer readable medium having control logic (computer software) stored therein. The control logic, when executed by the processor 204, causes the processor 204 to perform the functions as described herein.

Another embodiment is implemented primarily in hardware using, for example, a hardware state machine. Implementation of the hardware state machine so as to perform the functions described herein will be apparent to persons skilled in the relevant arts.

Call Record Format

This embodiment provides the switches of a telecommunication network with nine (9) different record formats. These records include: Call Detail Record (CDR), Expanded Call Detail Record (ECDR), Private Network Record (PNR), Expanded Private Network Record (EPNR), Operator Service Record (OSR), Expanded Operator Service Record (EOSR), Private Operator Service Record (POSR), Expanded Private Operator Service Record (EPOSR), and Switch Event Record (SER). Each record is 32 words in length, and the expanded version of each record is 64 words in length.

Figure 15A:
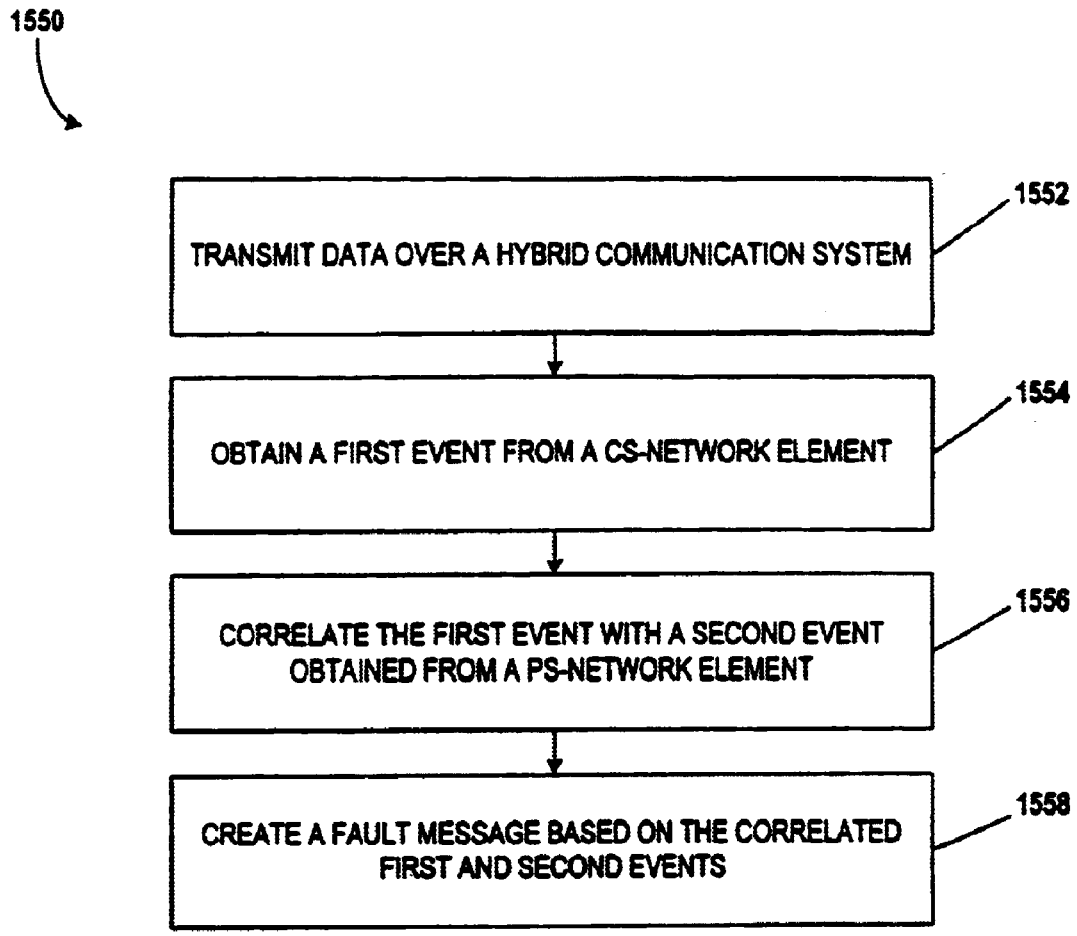
FIG. 15A is a flowchart showing a Fault Management Process in accordance with a preferred embodiment of the present invention.
Figures 1, 15B:
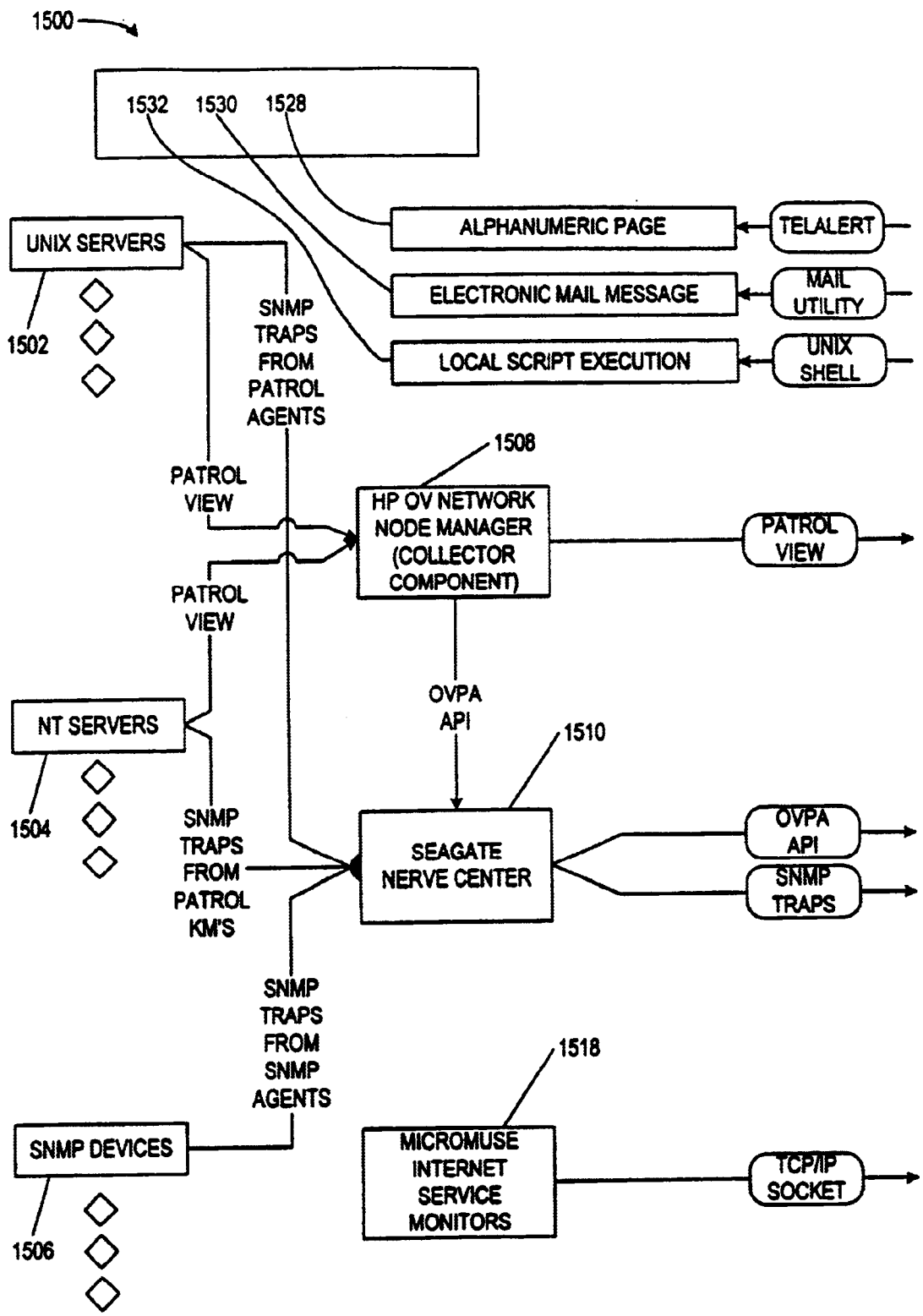
Figures 2, 15B:
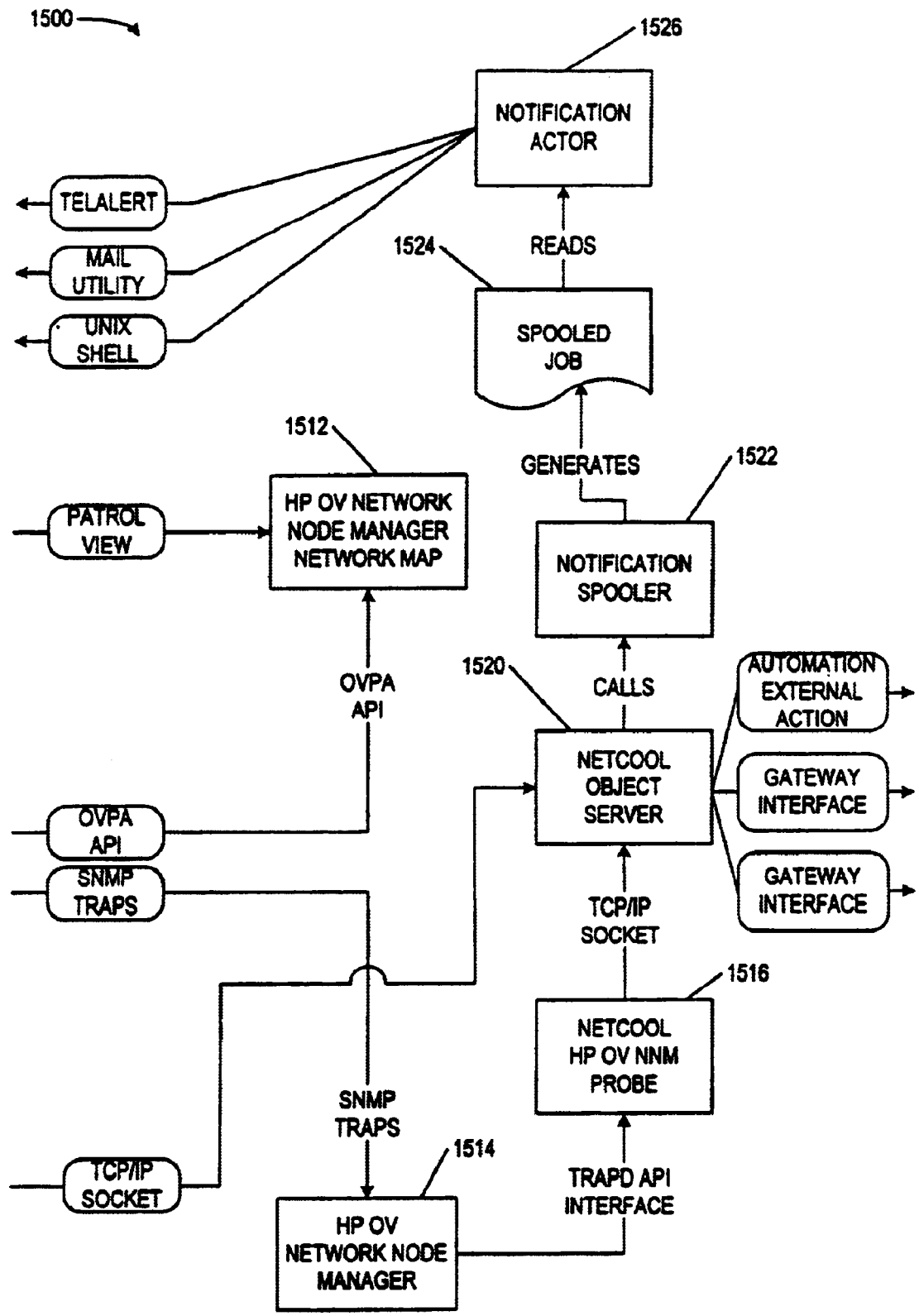
FIG. 15B is a block diagram showing a Fault Management component in accordance with a preferred embodiment of the present invention.
Figures 3, 15B:
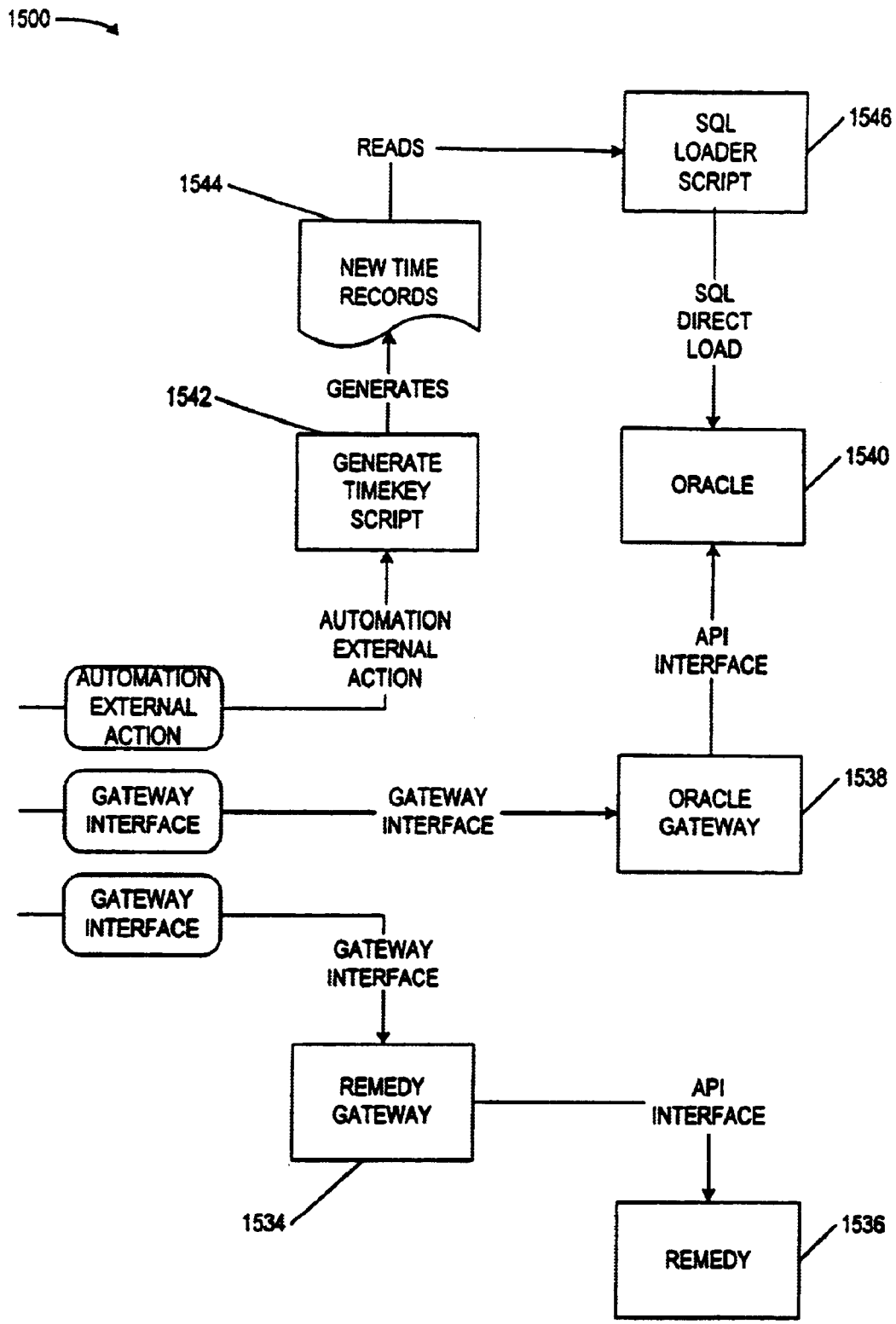
FIG. 3 illustrates the CDR and PNR call record formats in accordance with a preferred embodiment.

Example embodiments of the nine (9) call record formats discussed herein are further described in FIGS. 1–5. The embodiments of the call records of the present invention comprise both 32-word and 64-word call record formats. It would be apparent to one skilled in the relevant art to develop alternative embodiments for call records comprising a different number of words and different field definitions. Table 301 of the Appendix contains an example embodiment of the CDR and PNR call record formats. FIG. 3 shows a graphical representation of the CDR and PNR call record formats. Table 302 of the Appendix contains an example embodiment of the ECDR and EPNR call record formats. FIGS. 4A and 4B show a graphical representation of the ECDR and EPNR call record formats. Table 303 of the Appendix contains an example embodiment of the OSR and POSR call record formats. FIG. 5 shows a graphical representation of the OSR and POSR call record format. Table 304 of the Appendix contains an example embodiment of the EOSR and EPOSR call record formats. FIGS. 6(A) and 6(B) show a graphical representation of the EOSR and EPOSR call record formats. Table 305 of the Appendix contains an embodiment of the SER record format. FIG. 7 shows a graphical representation of the SER record format.

The CDR and PNR, and thereby the ECDR and EPNR, are standard call record formats and contain information regarding a typical telephone call as it passes through a switch. The CDR is used for a non-VNET customer, whereas the PNR is used for a VNET customer and is generated at switches that originate VNET calls. The fields of these two records are identical except for some field-specific information described below.

The OSR and POSR, and thereby the EOSR and EPOSR, contain information regarding a telephone call requiring operator assistance and are generated at switches or systems actually equipped with operator positions. A switch completes an OSR for a non-VNET customer and completes a POSR for a private VNET customer. These records are only generated at switches or systems that have the capability of performing operator services or network audio response system (NARS) functions. The formats of the two (2) records are identical except for some field-specific information described below.

A SER is reserved for special events such as the passage of each hour mark, time changes, system recoveries, and at the end of a billing block. The SER record format is also described in more detail below.

Figure 8A:
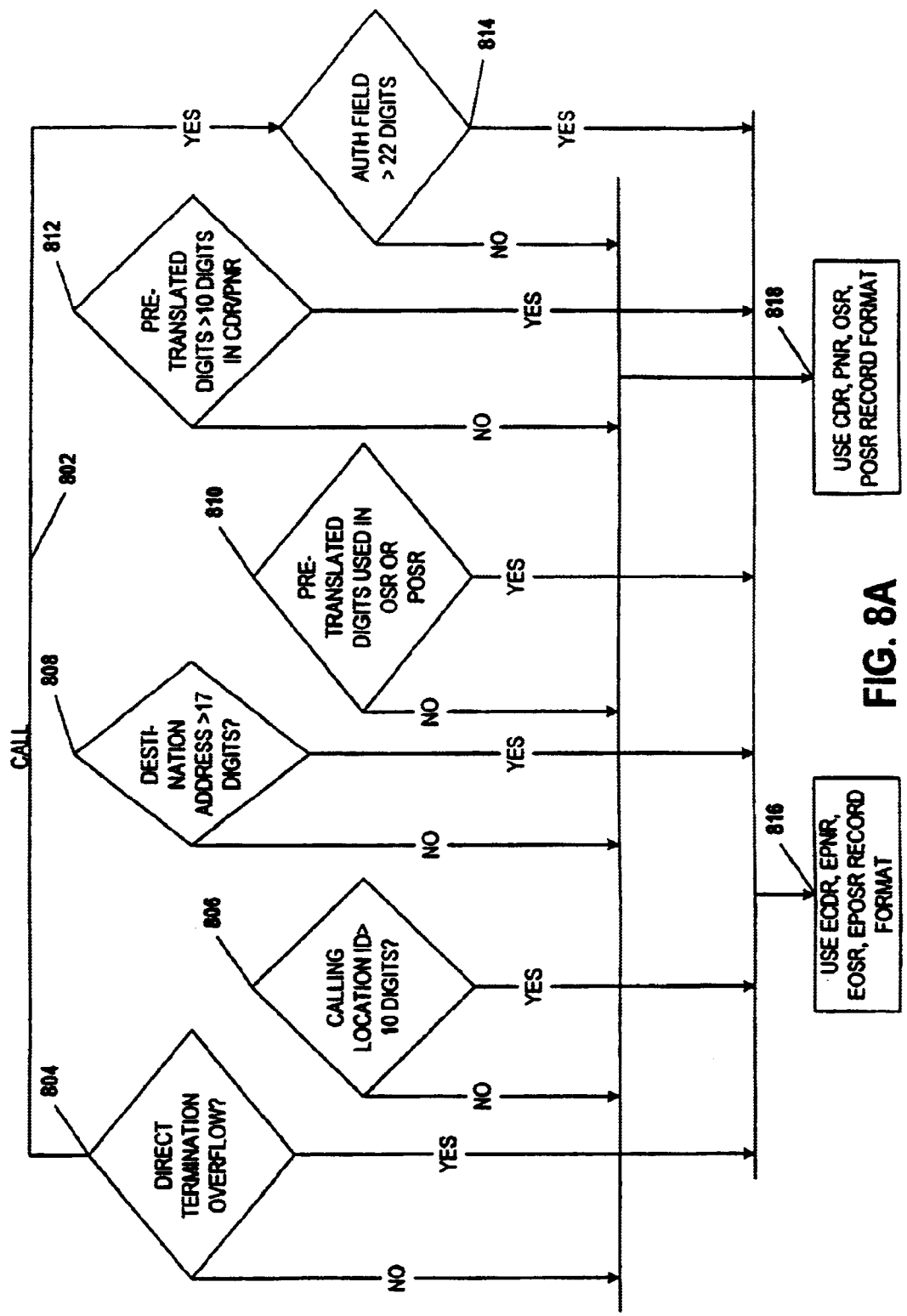
FIGS. 8(A) and 8(B) are control flow diagrams illustrating the conditions under which a switch uses the expanded record format in accordance with a preferred embodiment.
Figure 8B:
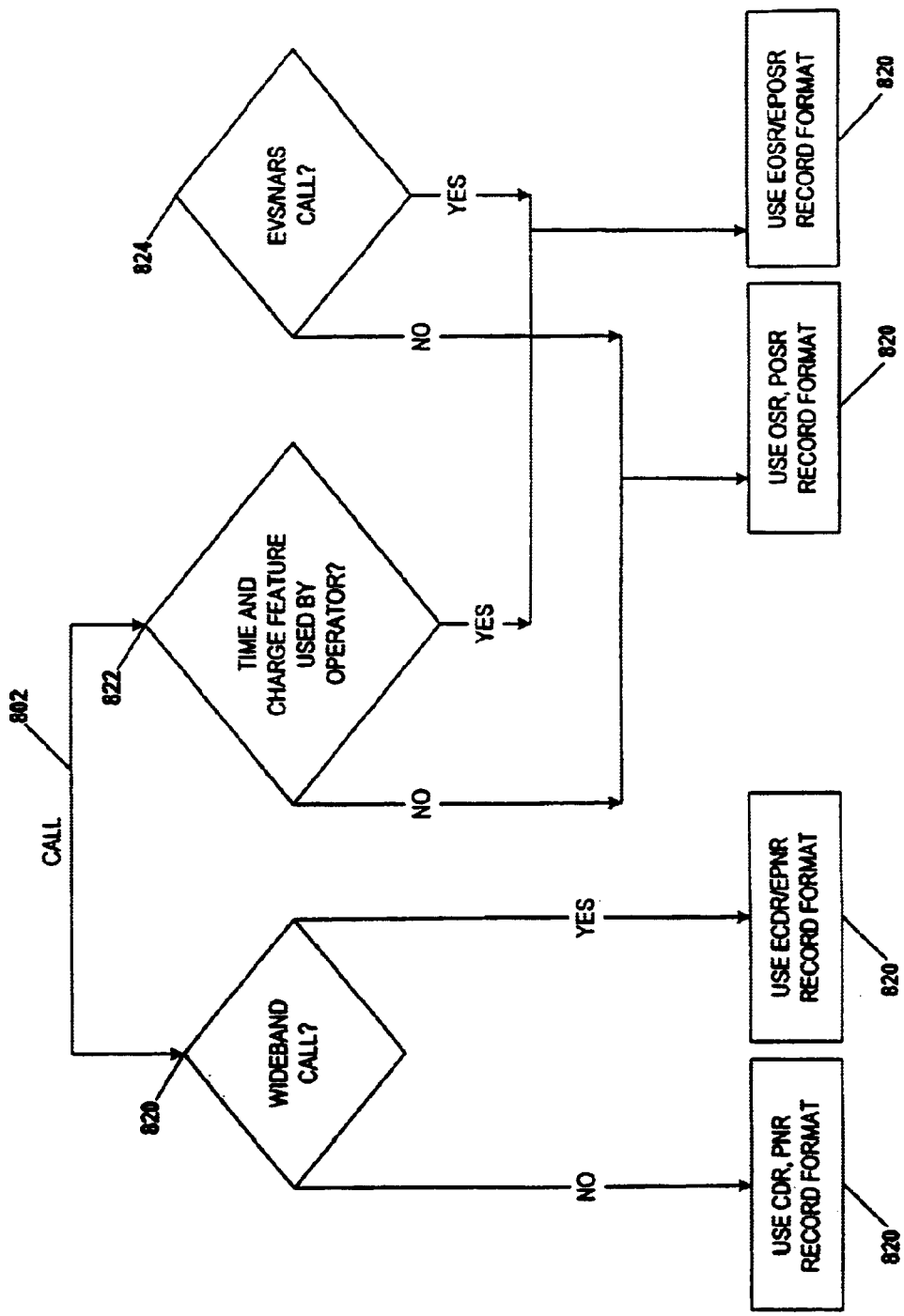

FIGS. 8(A) and 8(B) collectively illustrate the logic that a switch uses to determine when to use an expanded version of a record format. A call 202 comes into a switch 106–110 (called the current switch for reference purposes; the current switch is the switch that is currently processing the call), at which time that switch 106–110 determines what call record and what call record format (small/default or large/expanded) to use for the call's 802 call record. In this regard, the switch 106-110 makes nine (9) checks for each call 802 that it receives. The switch 106–110 uses an expanded record for a call 802 that passes any check as well as for a call 802 that passes any combination of checks.

The first check 804 determines if the call is involved in a direct termination overflow (DTO) at the current switch 106–110. For example, a DTO occurs when a customer makes a telephone call 802 to an 800 number and the original destination of the 800 number is busy. If the original destination is busy, the switch overflows the telephone call 802 to a new destination. In this case, the switch must record the originally attempted destination, the final destination of the telephone call 802, and the number of times of overflow. Therefore, if the call 802 is involved in a DTO, the switch 106–110 must complete an expanded record (ECDR, EPNR, EOSR, EPOSR) 816.

The second check 806 made on a call 802 by a switch 106–110 determines if the calling location of the call 802 is greater than ten (10) digits. The calling location is the telephone number of the location from where the call 802 originated. Such an example is an international call which comprises at least eleven (11) digits. If the calling location is greater than ten (10) digits, the switch records the telephone number of the calling location in an expanded record (ECDR, EPNR, EOSR, EPOSR) 816.

A switch 106–110 makes a third check 808 on a call 802 to determine if the destination address is greater than seventeen (17) digits. The destination address is the number of the called location and may be a telephone number or trunk group. If the destination is greater than seventeen (17) digits, the switch records the destination in an expanded record (ECDR, EPNR, EOSR, EPOSR) 816.

A switch 106–110 makes a fourth check 810 on a call 802 to determine if the pre-translated digits field is used with an operated assisted'service call. The pre-translated digits are the numbers of the call 802 as dialed by a caller if the call 202 must be translated to another number within the network. Therefore, when a caller uses an operator service, the switch 106–110 records the dialed numbers in expanded record (EOSR, EPOSR) 816.

In a fifth check 812 on a call 802, a switch 106–110 determines if the pre-translated digits of a call 802 as dialed by a caller without operator assistance has more than ten (10) digits. If there are more than ten (10) pre-translated digits, the switch 106–110 records the dialed numbers in expanded record (ECDR, EPNR) 816.

In a sixth check 814 on a call 802, a switch 106–110 determines if more than twenty-two (22) digits, including supplemental data, are recorded in the Authorization Code field of the call record. The Authorization Code field indicates a party who gets billed for the call, such as the calling location or a credit card call. If the data entry requires more than twenty-two (22) digits, the switch 106–110 records the billing information in an expanded record (ECDR, EPNR, EOSR, EPOSR) 816.

In a seventh check 820 on a call 802, a switch 106–110 determines if the call 802 is a wideband call. A wideband call is one that requires multiple transmission lines, or channels. For example, a typical video call requires six (6) transmission channels one (1) for voice and five (5) for the video transmission. The more transmission channels used during a wideband call results in a better quality of reception. Contemporary telecommunication systems currently provide up to twenty-four (24) channels. Therefore, to indicate which, and how many, of the twenty-four channels is used during a wideband call, the switch records the channel information in an expanded record (ECDR, EPNR) 828.

In an eighth check 822 on a call 802, a switch 106–110 determines if the time and charges feature was used by an operator. The time and charges feature is typically used in a hotel scenario when a hotel guest makes a telephone call using the operator's assistance and charges the call 802 to her room. After the call 802 has completed, the operator informs the hotel guest of the charge, or cost, of the call 802. If the time and charges feature was used with a call 802, the switch 106–110 records the hotel guest's name and room number in an expanded record (EOSR, EPOSR) 832.

The ninth, and final, check 824 made on a call 802 by a switch 106–110 determines if the call 802 is an enhanced voice service/network audio response system (EVS/NARS) call. An EVS/NARS is an audio menu system in which a customer makes selections in response to an automated menu via her telephone key pad. Such a system includes a NARS switch on which the audio menu system resides. Therefore, during an EVSINARS call 802, the NARS switch 106–110 records the customer's menu selections in an expanded record (EOSR, EPOSR) 832.

If none of the checks 804–824 return a positive result, then the switch 106–110 uses the default record format (OSR, POSR) 830.

Once the checks have been made on a call, a switch generates and completes the appropriate call record. Call record data is recorded in binary and Telephone Binary Coded Decimal (TBCD) format. TBCD format is illustrated below:

0000=TBCD-Null
0001=digit 1
0010=digit 2
0011=digit 3
0100=digit 4
0101=digit 5
0110=digit 6
0111=digit 7
1000=digit 8
1001=digit 9
1010=digit 0
1011=special digit 1 (DTMF digit A)
1100=special digit 2 (DTMF digit B)
1101=special digit 3 (BTMF digit C)
1110=special digit 4 (DTMF digit D)
1111=special digit 5 (Not Used)

All TBCD digit fields must be filled with TBCD-Null, or zero, prior to data being
15 recorded. Where applicable, dialed digit formats conform to these conventions
N=digits 2–9
X=digits 0–9
Y=digits 2–8

Thus, if the specification for a call record field contains a N, the valid field values are the digits 2–9.

Each call record, except SER, contains call specific timepoint fields. The timepoint fields are recorded in epoch time format. Epoch time is the number of one second increments from a particular date/time in history. The embodiment of the present invention uses a date/time of midnight (00:00 am UTC) on Jan. 1, 1976, but this serves as an example and is not a limitation. It would be readily apparent to one skilled in the relevant art to implement an epoch time based on another date/time. In the records, Timepoint 1 represents the epoch time that is the origination time of the call 802. The other timepoint stored in the records are the number of seconds after Timepoint 1, that is, they are offsets from Timepoint 1 that a particular timepoint occurred. All of the timepoint fields must be filled in with "0's" prior to any data being recorded. Therefore, if a timepoint occurs, its count is one (1) or greater. Additionally, timepoint counters, not including Timepoint 1, do not rollover their counts, but stay at the maximum count if the time exceeds the limits.

The switch clock reflects local switch time and is used for all times except billing. Billing information is recorded in epoch time, which in this embodiment is UTC. The Time offset is a number reflecting the switch time relative to the UTC, that is, the offset due to time zones and, if appropriate, daylight savings time changes. There are three factors to consider when evaluating time change relative to UTC. First, there are time zones on both sides of UTC, and therefore there may be both negative and positive offsets. Second, the time zone offsets count down from zero (in Greenwich, England) in an Eastward direction until the International Dateline is reached. At the Dateline, the date changes to the next day, such that the offset becomes positive and starts counting down until the zero offset is reached again at Greenwich. Thirid, there are many areas of the world that have time zones that are not in exact one-hour increments. For example, Australia has one time zone that has a thirty (30) minute difference from the two time zones on either side of it, and Northern India has a time zone that is fifteen (15)minute after the one next to if. Therefore, the Time Offset of the call records must account for variations in both negative and positive offsets in fifteen (15) minute increments. The embodiment of the present invention satisfies this requirement by providing a Time Offset representing either positive or negative one minute increments.

There are two formulas used to convert local switch time to epoch time and back.
i) Epoch Time+(Sign Bit*Time Offset)=Local Switch Time
ii) Local Switch Time–(Sign Bit*Time Offset)=Epoch Time The switch records the Time Offset in the SER using a value where one (1) equals one (1) minute, and computes the Time Offset in seconds and adds this value to each local Timepoint 1 before the call record is recorded. For example, Central Standard Time is six (6) hours before UTC. In this case, the Sign Bit indicates "1" for negative offset and the Time Offset value recorded in the SER would be 360 (6 hours *60 minutes/hour=360 minutes). See FIG. 5 for more details on the SER record format. When recording Timepoint 1 in the call record, the switch multiplies the Time Offset by 60, because there is 60 seconds in each 1 minute increment, and determines whether the offset is positive or negative by checking the Sign Bit. This example results in a value of –21,600 (–1*360 minutes*60 seconds/minute=–21,600 seconds). Using equation (ii) from above, if the local switch time were midnight, the corresponding epoch time might be, for example, 1,200,000,000. Subtracting the Time Offset of –21,600 results in a corrected epoch time of 1,200,021,600 seconds, which is the epoch time for 6 hours after midnight on the next day in epoch time. This embodiment works equally as well in switches that are positioned on the East side of Greenwich where the Time Offset has a positive value.

Figure 9:
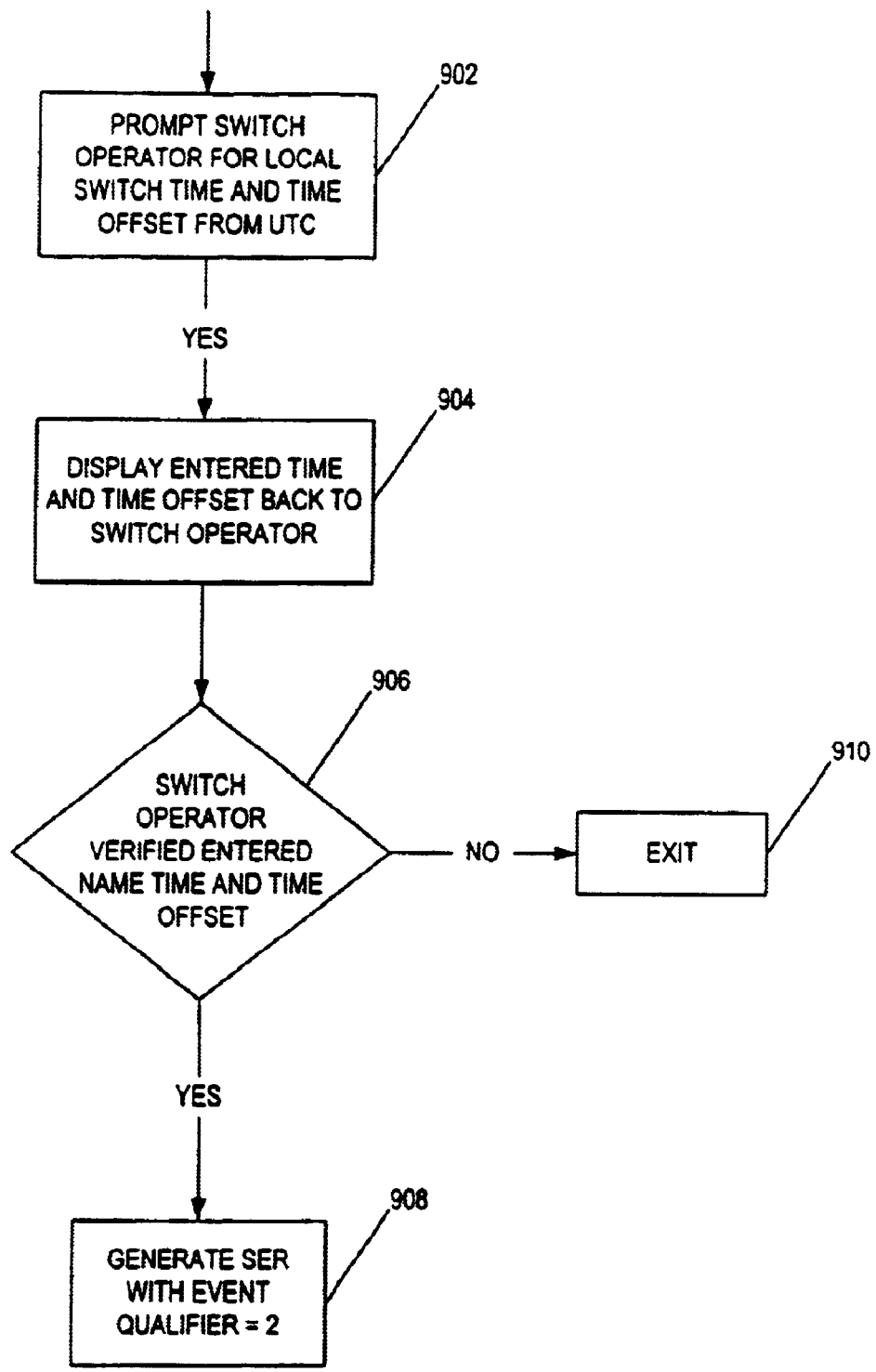
FIG. 9 is a control flow diagram illustrating the Change Time command in accordance with a preferred embodiment.

Two commands are used when changing time. First, FIG. 9 illustrates the control flow of the Change Time command 900, which changes the Local Switch Time and the Time Offset. In FIG. 9, after a switch operator enters the Change Time command, the switch enters step 902 and prompts the switch operator for the Local Switch Time and Time Offset from UTC. In step 902 the switch operator enters a new Local Switch Time and Time Offset. Continuing to step 904, the new time and Time Offset are displayed back to the switch operator. Continuing to step 906, the switch operator must verify the entered time and Time Offset before the actual time and offset are changed on the switch. If in step 906 the switch operator verifies the changes, the switch proceeds to step 908 and generates a SER with an Event Qualifier equal to two which identifies that the change was made to the Local Switch Time and Time Offset of the switch. The billing center uses the SER for its bill processing. The switch proceeds to step 910 and exits the command. Referring back to step 906, if the switch operator does not verify the changes, the switch proceeds to step 910 and exits the command without updating the Local Switch Time and Time Offset. For more information on SER, see FIG. 5.

Figure 10:
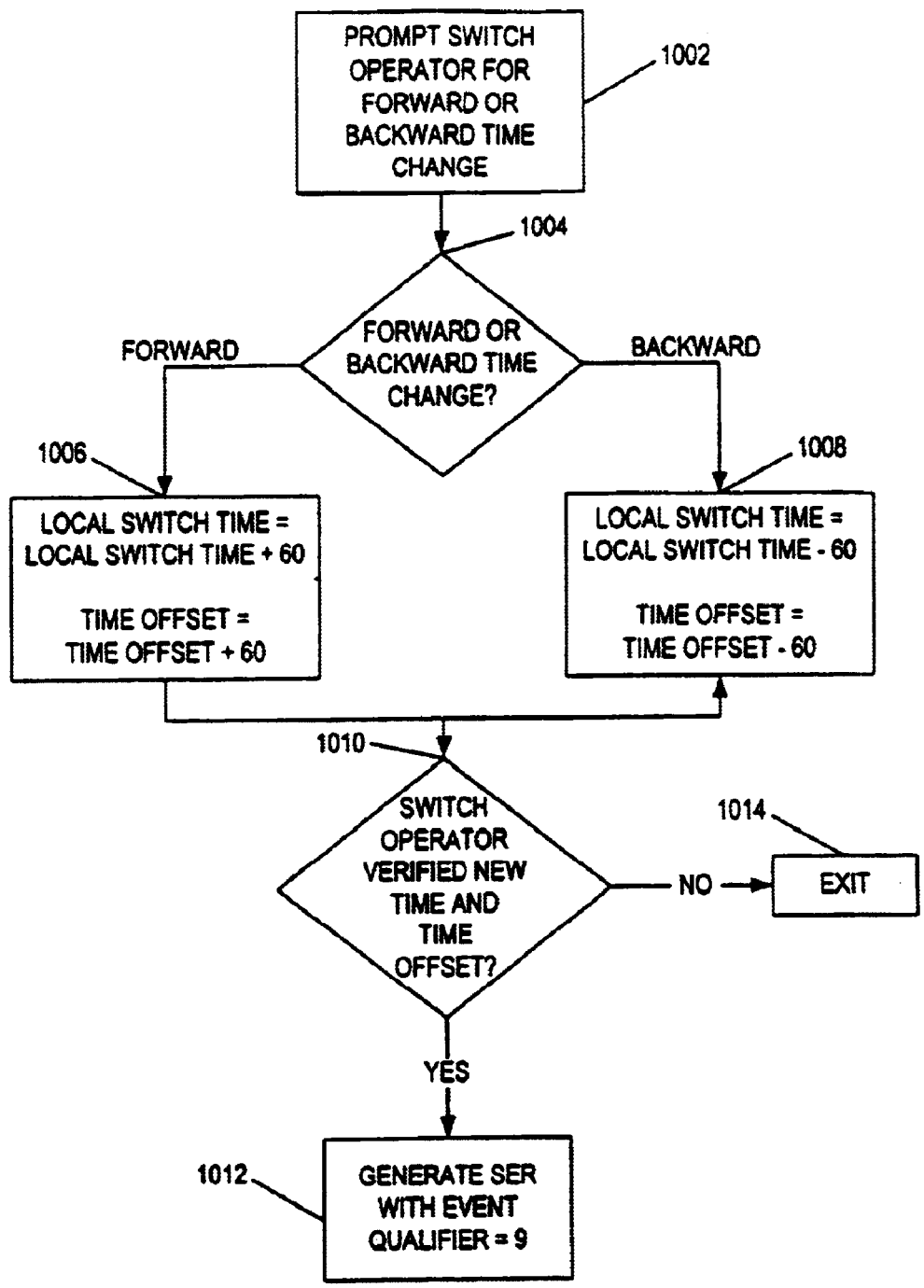
FIG. 10 is a control flow diagram illustrating the Change Daylight Savings Time command in accordance with a preferred embodiment.

FIG. 10 illustrates the control flow for the Change Daylight Savings Time command 1000 which is the second command for changing time. In FIG. 10, after a switch operator enters the Change Daylight Savings Time command, the switch enters step 1002 and prompts the switch operator to select either a Forward or Backward time change. Continuing to step 1004, the switch operator makes a selection. In step 1004, if the switch operator selects the Forward option, the switch enters step 1006. In step 1006, the switch sets the Local Switch Time forward one hour and adds one hour (count of 60) to the Time Offset. The switch then proceeds to step 1010.

Referring back to step 1004, if the switch operator selects the Backward option, the switch sets the Local Switch Time back one hour and subtract one hour (count of 60) from the Time Offset. The switch then proceeds to step 1010.

In step 1010, the switch operator must verify the forward or backward option and the new Local Switch Time and Time Offset before the actual time change takes place. If in step 1010, the switch operator verifies the new time and Time Offset, the switch proceeds to step 1012 and generates a SER with an Event Qualifier equal to nine which changes the Local Switch Time and Time Offset of the switch. The switch proceeds to step 1014 and exits the command. Referring back to step 1010, if the switch operator does not verify the changes, the switch proceeds to step 1014 and exits the command without updating the Local Switch Time and Time Offset.

After the successful completion of a Change Daylight Savings Time Command, the is billing records are affected by the new Time Offset. This embodiment allows the epoch time, used as the billing time, to increment normally through the daylight savings time change procedure, and not to be affected by the change of Local Switch Time and Time Offset.

Network Call Identifier

An embodiment provides a unique NCID that is assigned to each telephone call that traverses through the telecommunications network. Thus, the NCID is a discrete identifier among all network calls. The NCID is transported and recorded at each switch that is involved with the telephone call.

The originating switch of a telephone call generates the NCID. The chosen embodiment of the NCID of the present invention is an eighty-two (82) bit identifier that is comprised of the following subfields:

i) Originating Switch ID (14 bits): This field represents the NCS Switch ID as defined in the Office Engineering table at each switch. The SER call record, however, contains an alpha numeric representation of the Switch ID. Thus, a switch uses the alphanumeric Switch ID as an index into a database for retrieving the corresponding NCS Switch ID.

ii) Originating Trunk Group (14 bits): This field represents the originating trunk group as defined in the 32/64-word call record format described above.

iii) Originating Port Number (19 bits): This field represents the originating port number as defined in the 32/64-word call record format described above.

iv) Timepoint 1 (32 bits): This field represents the Timepoint 1 value as defined in the 32/64-word call record format described above.

v) Sequence Number (3 bits): This field represents the number of calls which have occurred on the same port number with the same Timepoint 1 (second) value. The first telephone call will have a sequence number set to '0.' This value increases incrementally for each successive call which originates on the same port number with the same Timepoint 1 value.

It would be readily apparent to one skilled in the relevant art to create an NCID of a different format. Each switch records the NCID in either the 32 or 64-word call record format. Regarding the 32-word call record format, intermediate and terminating switches will record the NCID in the AuthCode field of the 32-word call record if the AuthCode filed is not used to record other information. In this case, the Originating Switch ID is the NCS Switch ID, not the alphanumeric Switch ID as recorded in the SER call record. If the AuthCode is used for other information, the intermediate and terminating switches record the NCID in the 64-word call record format. In contrast, originating switches do not use the AuthCode field when storing an NCID in a 32-word call record. Originating-switches record the sub-fields of the NCID in the corresponding separate fields of the 32-word call record. That is, the Originating Switch ID is stored as an alphanumeric Switch ID in the Switch ID field of the SER call record; the Originating Trunk Group is stored in the Originating Trunk Group field of the 32-word call record; the Originating Port Number is stored in the Originating Port field of the 32-word call record; the Timepoint 1 is stored in the Timepoint 1 field of the 32-word call record; the Sequence Number is stored in the NCID Sequence Number field of the 32-word call record. The 32-word call record also includes an NCID Location (NCIDLOC) field to identify when the NCID is recorded in the AuthCode field of the call record. If the NCID Location field contains a '1,' then the AuthCode field contains the NCID. If the NCID Location field contains a '0,' then the NCID is stored in its separate sub-fields in the call record. Only intermediate and terminating switches set the NCID Location field to a '1' because originating switches store the NCID in the separate fields of the 32-word call record.

Regarding the 64-word call record format, the expanded call record includes a separate field, call the NCID field, to store the 82 bits of the NCID. This call record is handled the same regardless of whether an originating, intermediate, or terminating switch stores the NCID. In the 64-word call record format, the Originating Switch ID is the NCS Switch ID, not the alphanumeric Switch ID as recorded in the SER call record.

Figure 11:
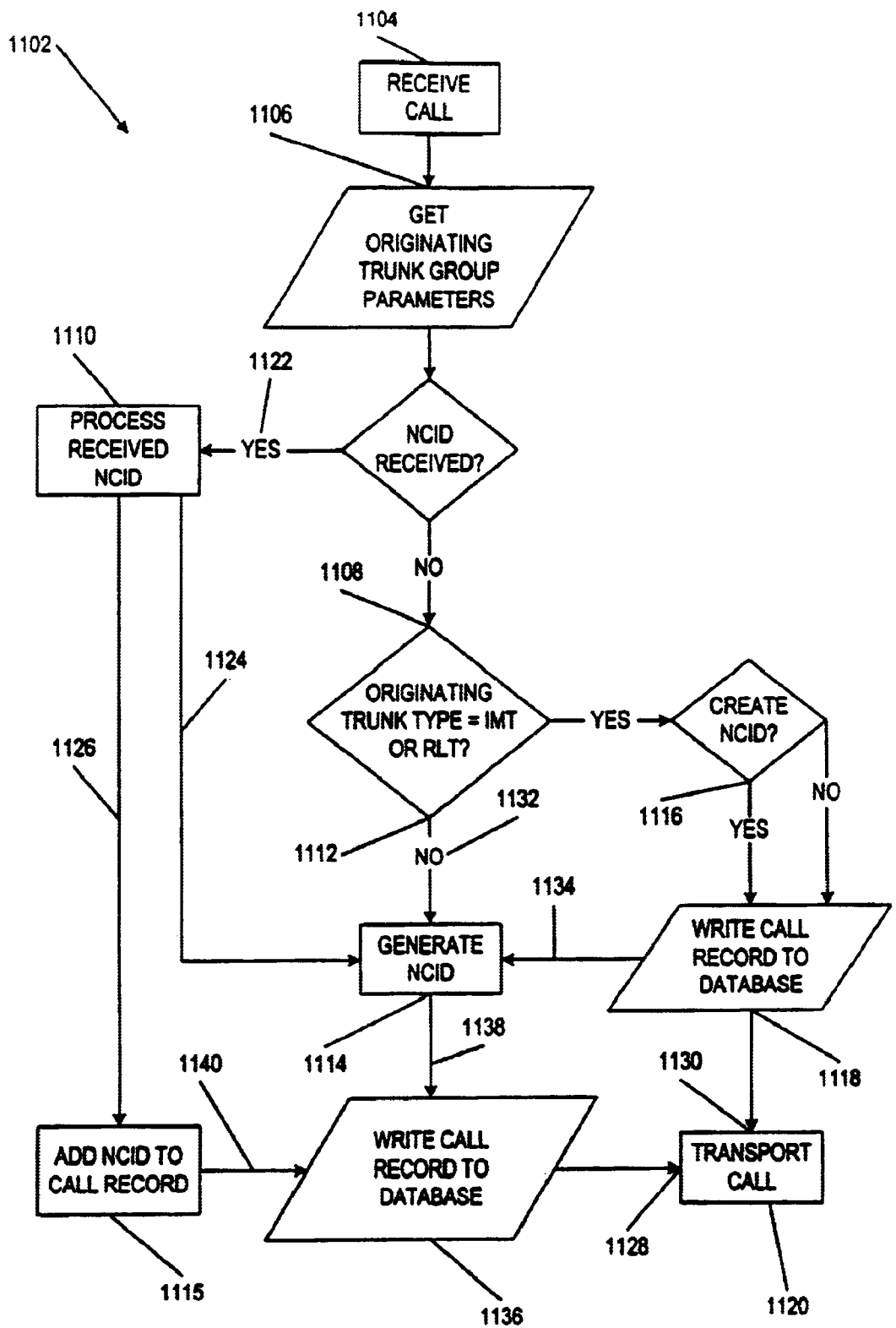
FIG. 11 is a control flow diagram illustrating the Network Call Identifier (NCID) switch call processing in accordance with a preferred embodiment.

FIG. 11 illustrates the control flow of the Network Call Identifier switch call processing. A call 202 comes into a switch 106–110 (called the current switch for reference purposes; the current switch is the switch that is currently processing the call) at step 1104. In step 1104, the current switch receives the call 202 and proceeds to step 1106. In step 1106, the current switch accesses a local database and gets the trunk group parameters associated with the originating trunk group of the call 202. After getting the parameters, the current switch proceeds to step 1108. In step 1108, the current switch determines if it received an NCID with the call 202. If the current switch did not receive an NCID with the call 202, the switch continues to step 1112.

In step 1112, the switch analyzes the originating trunk group parameters to determine the originating trunk group type. If the originating trunk group type is an InterMachine Trunk (IMT) or a release link trunk (RLT), then the switch proceeds to step 1116. An IMT is a trunk connecting two normal telecommunication switches, whereas a RLT is a trunk connecting an intelligent services network (ISN) platform to a normal telecommunication switch. When the current switch reaches step 1116, the current switch knows that it is not an originating switch and that it has not received an NCID. In step 1116, the current switch analyzes the originating trunk group parameters to determine whether it is authorized to create an NCID for the call 202. In step 1116, if the current switch is not authorized to create an NCID for the call 202, the current switch proceeds to step 1118. When in step 1118, the current switch knows that it is not an originating switch, it did not receive an NCID for the call 202, but is not authorized to generate an NCID. Therefore, in step 1118, the current switch writes the call record associated with the call 202 to the local switch database and proceeds to step 1120. In step 1120, the current switch transports the call 202 out through the network with its associated NCID. Step 1120 is described below in more detail.

Referring again to step 1116, if the current switch is authorized to create an NCID for the call 202, the current switch proceeds to step 1114. In step 1114, the current switch generates a new NCID for the call 202 before continuing to step 1136. In step 1136, the current switch writes the call record, including the NCID, associated with the call 202 to the local switch database and proceeds to step 1120. In step 1120, the current switch transports the call 202 out through the network with its associated NCID. Step 1120 is described below in more detail.

Referring again to step 1112, if the current switch determines that the originating trunk group type is not an INIT or RLT, the current switch proceeds to step 1114. When reaching step 1114, the current switch knows that it is an originating switch and, therefore, must generate a NCD for the call 202. Step 1114 is described below in more detail. After generating a NCID in step 1114, the current switch proceeds to step 1136 to write the call record, including the NCID, associated with the call 202 to the local database. After writing the call record, the current switch proceeds to step 1120 to transport the call out through the network with its associated NCID. Step 1120 is also described below in more detail.

Referring again to step 1108, if the current switch determines that it received an NCID with the call 202, the current switch proceeds to step 1110. In step 1110, the current switch processes the received NCID. In step 1110, there are two possible results. First, the current switch may decide not to keep the received NCID thereby proceeding from step 1110 to step 1114 to generate a new NCED. Step 1110 is described below in more detail. In step 1114, the current switch may generate a new NCID for the call 202 before continuing to step 1136. Step 1114 is also described below in more detail. In step 1136, the current switch writes the call record associated with the call 202 to the local database. The current switch then proceeds to step 1120 and transports the call 202 out through the network with its associated NCID. Step 1120 is also described below in more detail.

Referring again to step 1110, the current switch may decide to keep the received NCID thereby proceeding from step 1110 to step 1115. In step 1115, the current switch adds the received NCID to the call record associated with the call 202. Steps 1110 and 1115 are described below in more detail. After step 1115, the current switch continues to step 1136 where it writes the call record associated with the call 202 to the local database. The current switch then proceeds to step 1120 and transports the call 202 out through the network with its associated NCD. Step 1120 is also described below in more detail.

Figure 12:
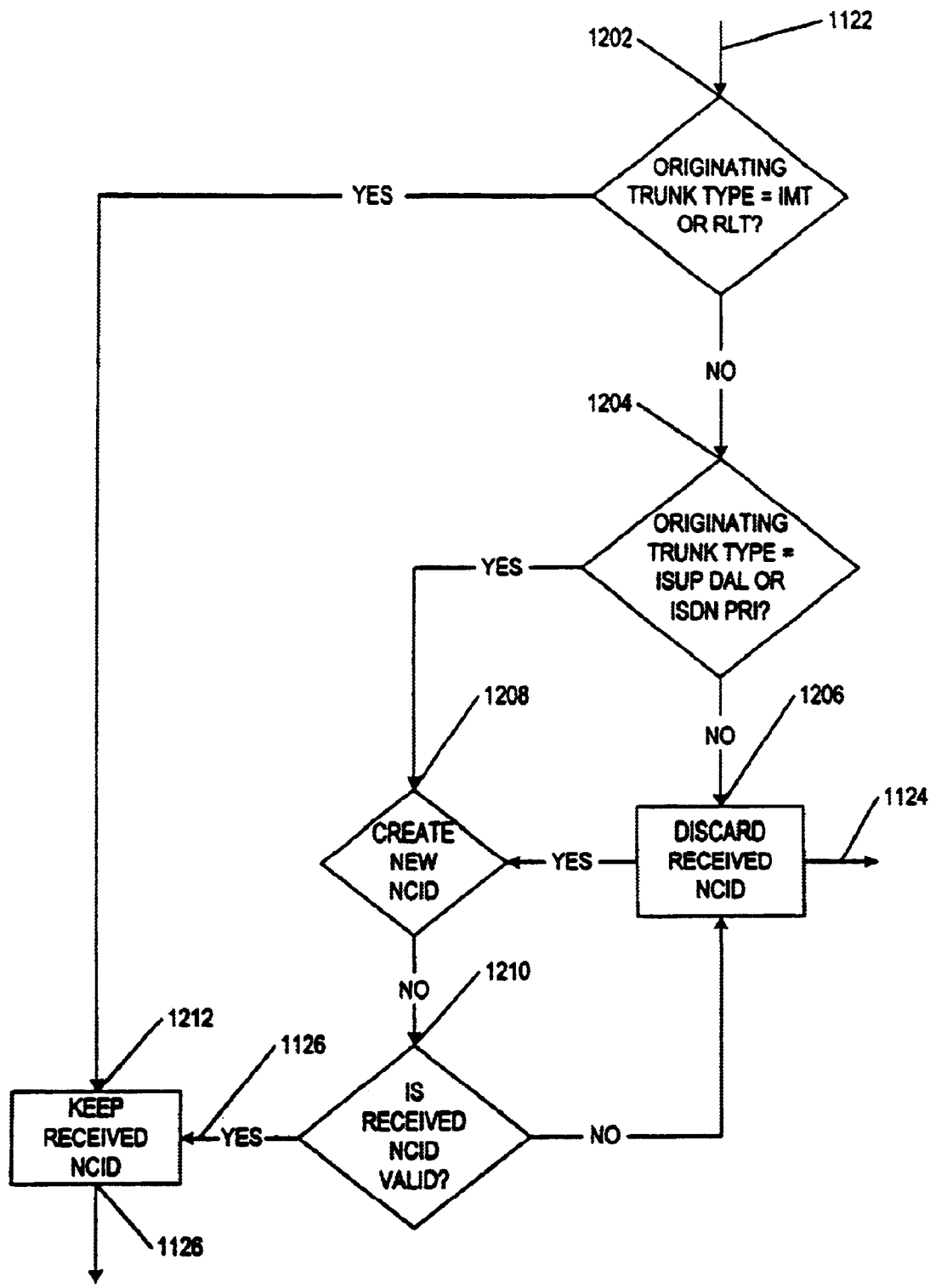
FIG. 12 is a control flow diagram illustrating the processing of a received Network Call Identifier in accordance with a preferred embodiment.

FIG. 12 illustrates the control logic for step 1110 which processes a received NCID. The current switch enters step 1202 of step 1110 when it determines that an NCID was received with the call 202. In step 1202, the current switch analyzes the originating trunk group parameters to determine the originating trunk group type. If the originating trunk group type is an IMT or RLT, then the current switch proceeds to step 1212. When in step 1212, the current switch knows that it is not an originating switch and that it received an NCD for the call 202. Therefore, in step 1212, the current switch keeps the received NCID and exits step 1110, thereby continuing to step 1115 in FIG. 11, after which the current switch will store the received NCID in the call record and transport the call.

Referring again to step 1202, if the originating trunk group type is not an IMT or RLT, the current switch proceeds to step 1204. In step 1204, the current switch determines if the originating trunk group type is an Integrated Services User Parts Direct Access Line (ISUP DAL) or an Integrated Services Digital Network Primary Rate Interface (ISDN PRI). ISUP is a signaling protocol which allows information to be sent from switch to switch as information parameters. An ISUP DAL is a trunk group that primarily is shared by multiple customers of the network, but can also be dedicated to a single network customer. In contrast, an ISDN PRI is a trunk group that primarily is dedicated to a single network customer, but can also be shared by multiple network customers. A network customer is an entity that leases network resources. In step 1204, if the current switch determines that the trunk group type is not an ISUP DAL or ISDN PRI, the current switch proceeds to step 1206. When in step 1206, the current switch knows that it received an NCED that was not generated by a switch that is part of the telecommunication network or by a switch that is a customer of the network. Therefore, in step 1206, the current switch discards the received NCID because it is an unreliable NCID. From step 1206, the current switch exits step 1110, thereby continuing to step 1114 in FIG. 11 where the current switch will create a new NCID and transport that NCID with the call 202.

Referring back to step 1204, if the current switch determines that the originating trunk group type is an ISUP DAL or ISDN PRI, the current switch continues to step 1208. When in step 1208, the current switch knows that it received an NCID from a customer trunk group. Therefore, the current switch analyzes the originating trunk group parameters to determine whether it is authorized to create a new NCD for the call 202. The current switch may be authorized to create a new NCID and overwrite the NCID provided by the customer to ensure that a valid NCID corresponds to the call 202 and is sent through the network. In step 1208, if the current switch is not authorized to create a new NCID for the call 202, the current switch proceeds to step 1210. In step 1210, the current switch checks the validity of the received NCID, for example, the NCID length. If the received NCID is invalid, the current switch proceeds to step 1206. In step 1206, the current switch discards the invalid NCID. From step 1206, the current switch exits step 1110, thereby continuing to step 1114 in FIG. 11 where the current switch will create a new NCED and transport that NCID with the call 202.

Referring again to step 1210, if the current switch determines that the received NCID is valid, the current switch proceeds to step 1212. In step 1212 the current switch keeps the received NCID and exits step 1110, thereby continuing to step 1115 in FIG. 11 where the current switch will store the received NCID in the call record and transport the call.

Figure 13A:
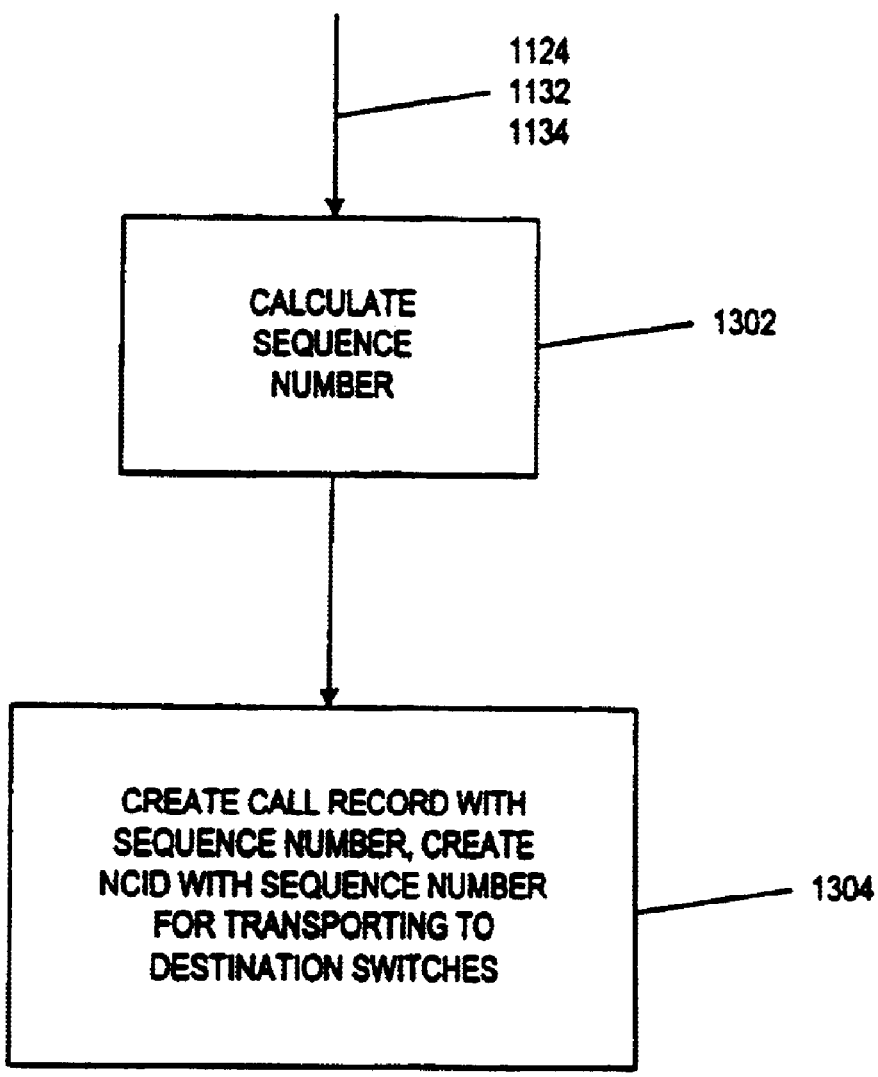
FIG. 13(A) is a control flow diagram illustrating the generation of a Network Call Identifier in accordance with a preferred embodiment.

FIG. 13A illustrates the control logic for step 1114 which generates an NCID. The current switch enters step 1302 when an NCID must be created. In step 1302, the current switch will calculate a sequence number. The sequence number represents the number of calls which have occurred on the same port number with the same Timepoint 1 value. The first call has a sequence number value of '0,' after which the sequence number will increase incrementally for each successive call that originates on the same port number with the same Timepoint 1 value. After creating the sequence number in step 1302, the current switch proceeds to step 1304. In step 1304, the current switch creates a call record for the call202, including in it the call's 202 newly created NCID. After the call record has been created, the current switch exits step 1114 and proceeds to step 1136 in FIG. 11 where the current switch writes the call record to the local switch database.

Figure 13B:
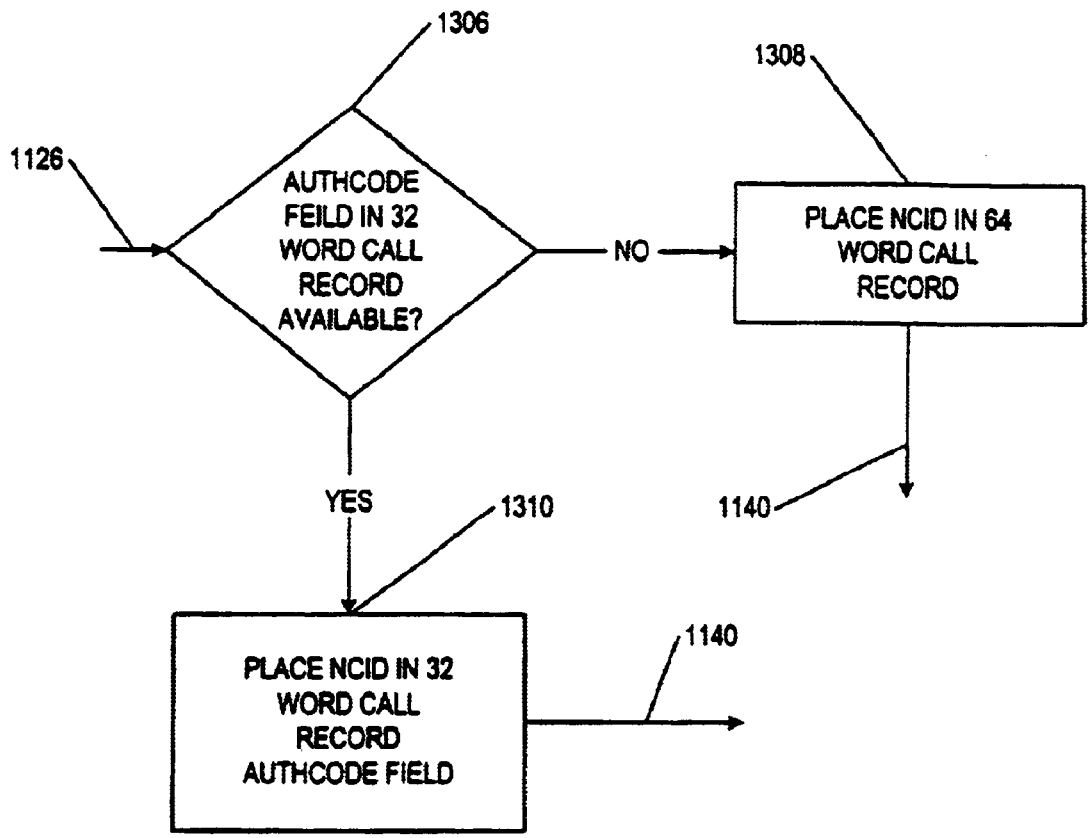
FIG. 13(B) is a control flow diagram illustrating the addition of a Network Call Identifier to a call record in accordance with a preferred embodiment.

FIG. 13B illustrates the control logic for step 1115 which adds a received NCID to the call record associated with the call 202. Upon entering step 1115, the current switch enters step 1306. When in step 1306, the current switch knows that it has received a valid NCID from an intermediate or terminating switch, or from a customer switch. In step 1306, the current switch determines if the AuthCode field of the 32-word call record is available for storing the NCID. If the AuthCode field is available, the current switch proceeds to step 1310. In step 1310, the current switch stores the NCID in the AuthCode field of the 32-word call record. The current switch must also set the NCID Location field to the value '1' which indicates that the NCID is stored in the AuthCode field. After step 1310, the current switch exits step 1115 and continues to step 1136 in FIG. 11 where the current switch writes the call record to the local switch database.

Referring again to step 1306, if the AuthCode field is not available in the 32-word call record, the current switch proceeds to step 1308. In step 1308, the current switch stores the NCID in the NCID field of the 64-word call record. After step 1308, the current switch exits step 1115 and continues to step 1136 in FIG. 11 where the current switch writes the call record to the local switch database.

Figure 14:
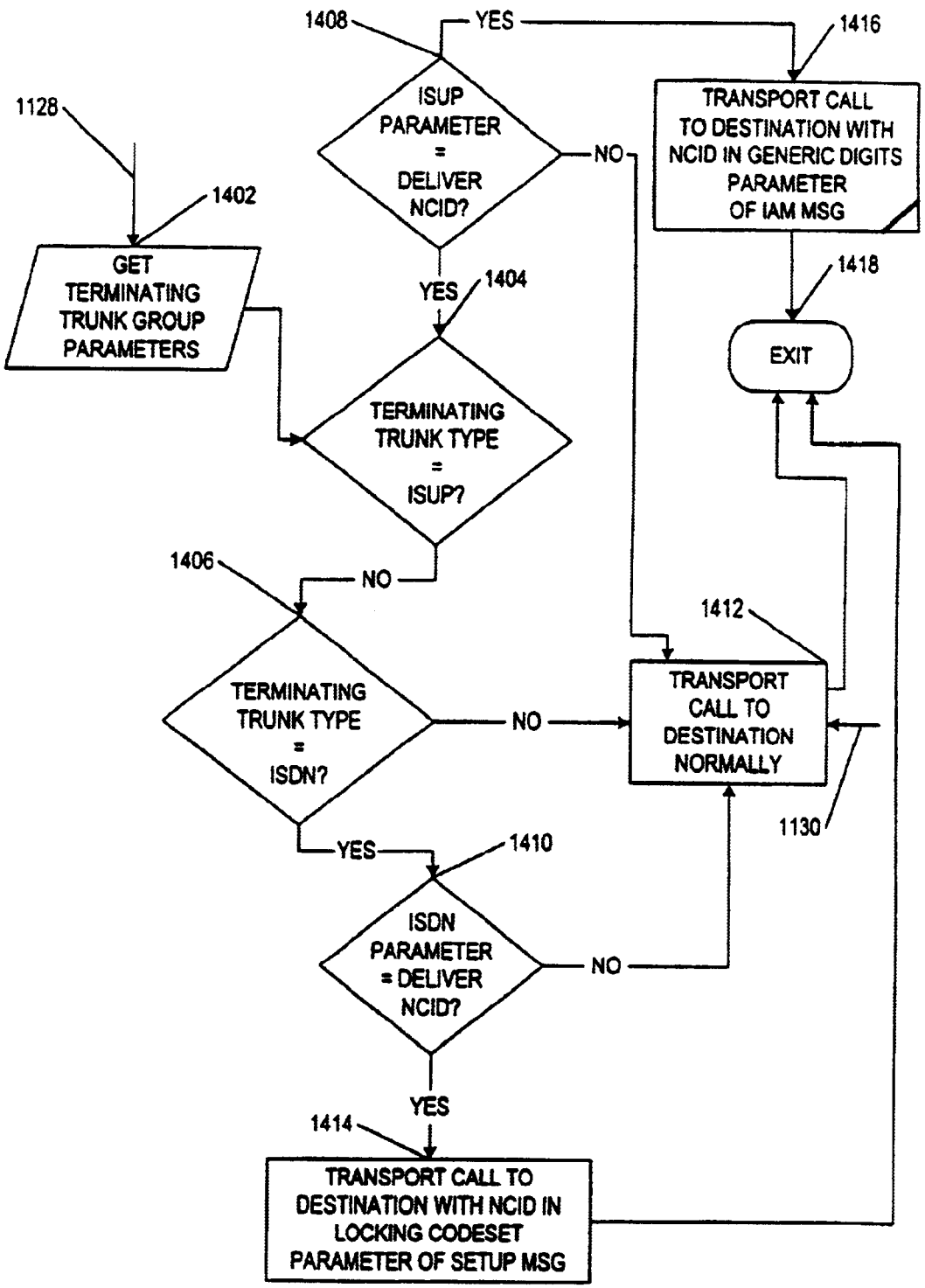
FIG. 14 is a control flow diagram illustrating the transport of a call in accordance with a preferred embodiment.

FIG. 14 illustrates the control logic for step 1120 which transports the call from the current switch. There are two entry points for this control logic: steps 1402 and 1412. Upon entering step 1402 from step 1136 on FIG. 11, the current switch knows that it has created an NCID or has received a valid NCID. In step 1402, the current switch accesses a local database and gets the trunk group parameters associated with the terminating trunk group for transporting the call 202. After getting the parameters, the current switch proceeds to step 1404. In step 1404, the current switch determines the terminating trunk group type. If the terminating trunk is an ISUP trunk, the current switch proceeds to step 1408. In step 1408, the current switch analyzes the parameters associated with the ISUP trunk type to determine whether or not to deliver the NCID to the next switch. If the current switch is authorized to deliver the NCID, the current switch proceeds to step 1416. In step 1416, the current switch transports the call to the next switch along with a SS7 initial address message (IAM). The NCID is transported as part of the generic digits parameter of the IAM. The IAM contains setup information for the next switch which prepares the next switch to accept and complete the call 202. The format of the generic digits parameter is shown below in Table 306:

Generic Digits Parameter:
Code: 11000001
Type: 0

TABLE 306

| Byte #, Bit # | Description |
| --- | --- |
| byte 1, bits 0–4 | Type of Digits : Indicates the contents of the parameter. This field has a binary value of '11011' to indicate that the parameter contains the NCID. |
| byte 1, bits 5–7 | Encoding Scheme : Indicates the format of the parameter contents. This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |

TABLE 306-continued

| Byte #, Bit # | Description |
| --- | --- |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 202 and the IAM, the current switch proceeds to step 1418, thereby exiting the switch processing.

Referring again to step 1408, if the current switch is not authorized to deliver the NCID to the next switch in an IAM message, the current switch proceeds to step 1412. In step 1412, the current switch transports the call 202 to the next switch under normal procedures which consists of sending an IAM message to the next switch without the NCID recorded as part of the generic digits parameter. After transporting the call 202, the current switch proceeds to step 1418, thereby exiting the switch processing.

Referring again to step 1404, if the current switch determines that the terminating trunk is not an ISUP, the current switch proceeds to step 1406. In step 1406, the current switch determines if the terminating trunk group is an ISDN trunk (the terminating trunk group is dedicated to one network customer). If the terminating trunk group is an ISDN, the current switch proceeds to step 1410. In step 1410, the current switch analyzes the parameters associated with the ISDN trunk group type to determine whether or not to deliver the NCID to the next switch. If the current switch is authorized to deliver the NCID, the current switch proceeds to step 1414. In step 1414, the current switch transports the call to the next switch along with a setup message. The setup message contains setup information for the next switch which prepares the next switch to accept and complete the call 202. The NCID is transported as part of the locking shift codeset 6 parameter of the setup message. The format of the locking shift codeset 6 parameter is shown below in Table 307:

Locking Shift Codeset 6 Parameter:
Code: 11000001
Type: 0

TABLE 307

| Byte #, Bit # | Description |
| --- | --- |
| byte 1, bits 0–4 | Type of Digits : Indicates the contents of the parameter. This field has a binary value of '11011' to indicate that the parameter contains the NCID. |
| byte 1, bits 5–7 | Encoding Scheme : Indicates the format of the parameter contents. This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |
| byte 5, bits 0–3 | |

TABLE 307-continued

| Byte #, Bit # | Description |
| --- | --- |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 202 and the setup message, the current switch proceeds to step 1418, thereby exiting the switch processing.

Referring again to step 1410, if the current switch determines that it does not have authority to deliver the NCD to the next switch in a setup message, the current switch proceeds to step 1412. In step 1412, the current switch transports the call 202 to the next switch under normal procedures which consists of sending a setup message to the next switch without the NCID recorded as part of the locking shift codeset 6 parameter. After transporting the call 202, the current switch proceeds to step 1418, thereby exiting the switch processing.

Referring again to step 1412, this step is also entered from step 1118 on FIG. 11 when the current switch did not receive an NCID, is an intermediate or terminating switch, and is not authorized to create an NCID. In this case, in step 1412, the current switch also transports the call 202 to the next switch under normal procedures which consists of sending an IAM or setup message to the next switch without the NCID recorded as part of the parameter. After transporting the call 202, the current switch proceeds to step 1418, thereby exiting the switch processing.

A system and method for the switches of a telecommunications network to generate call records for telephone calls using a flexible and expandable record format. Upon receipt of a telephone call, a switch in the network analyzes the telephone call to determine whether the default call record is sufficiently large to store call record information pertaining to the telephone call, or whether the expanded call record must be used to store the call information pertaining to the telephone call. After determining which call record to use, the switch generates the default or expanded call record. The switch sends a billing block, comprised of completed call records, to a billing center upon filling an entire billing block.

Introduction to a Callback Telephony System in Accordance With a Preferred Embodiment In today's telephony environment, a caller must contact an operator to initiate a conference call and/or have all parties dial a common number to connect into a conference call. This requires the cost of a human operator and the inconvenience of dialing a predefined number to be carried as overhead of each conference call. It also makes it very inefficient to schedule a conference call and assure that all parties are available to participate. It also requires a dedicated number for all the parties to access to facilitate the call.

In accordance with a preferred embodiment, a callback system is facilitated by a caller accessing a display from a computer and filling out information describing the parameters of a call. Information such as the date and time the call should be initiated, billing information, and telephone numbers of parties to participate in the call could be captured. Then, based on the information entered, a central or distributed computing facility with access to the hybrid network transmits e-mail in a note to each party required for the call copying the other parties to verify participation and calendar the event. The e-mail would include any particulars, such as the password associated with the call and time the call would be commenced. The necessary network facilities would also be reserved to assure the appropriate Quality of Service (QOS) would be available, and when the date and time requested arrived, the call is initiated by contacting each of the participants whether they be utilizing a telephone attached to a PSTN or a voice capable apparatus (such as a computer or intelligent television) attached to the hybrid network. At any time during scheduling, initiation or duration of the call, any party could request operator assistance by selecting that service from the display associated with the call. Thus, a completely automated callback system is provided for call setup and control.

For callers that utilize the callback system on a regular basis a custom profile is provided as an extension to the users existing profile information. The custom profile allows a user to store frequent conference call participants information. The profile contains participant's telephone numbers (which could be DDD, IDDD, IP Address or Cellular phone number), E-mail address, paging service, fax number, secretary phone number, location, time zone, working hours and other pertinent information that will be useful for initiating a call. Default profiles based on company or organization needs are also enabled and can be tailored to meet the needs of a particular user based on more global information.

Billing information would also be provided online. A user could enter a pre-arranged billing number or the ability to bill to a credit card or telephone number. If billing to a telephone number, the system treats the call like a collect or third party call to verify billing.

If profile information were predefined for a particular call scenario, then another option would allow an immediate connection of a conference call or single call at the press of a button, much as speed dialing is performed today except that more than one caller could be joined without intervention of the calling party, Internet callers are supported and an operator can be joined as required.

Before describing this aspect of the present invention, a description of internet environment is presented.

Internet

The Internet is a method of interconnecting physical networks and a set of conventions for using networks that allow the computers they reach to interact. Physically, the Internet is a huge, global network spanning over 92 countries and comprising 59,000 academic, commercial, government, and military networks, according to the Government Accounting Office (GAO), with these numbers expected to double each year. Furthermore, there are about 10 million host computers, 50 million users, and 76,000 World-Wide Web servers connected to the Internet. The backbone of the Internet consists of a series of high-speed communication links between major supercomputer sites and educational and research institutions within the U.S. and throughout the world.

Protocols govern the behavior along the Internet backbone and thus set down the key rules for data communication. Transmission Control Protocol/Internet Protocol (TCP/IP) has an open nature and is available to everyone, meaning that it attempts to create a network protocol system that is independent of computer or network operating system and architectural differences. As such, TCP/IP protocols are publicly available in standards documents, particularly in Requests for Comments (RFCs). A requirement for Internet connection is TCP/IP, which consists of a large set of data communications protocols, two of which are the Transmission Control Protocol and the Internet Protocol.

The International Telecommunication Union-Telecommunication Standardization Sector ("ITU-T") has established numerous standards governing protocols and line encoding for telecommunication devices. Because many of these standards are referenced throughout this document, summaries of the relevant standards are listed below for reference.

ITU G.711 Recommendation for Pulse Code Modulation of 3 kHz Audio Channels.

ITU G.722 Recommendation for 7 kHz Audio Coding within a 64 kbit/s channel.

ITU G.723 Recommendation for dual rate speech coder for multimedia communication transmitting at 5.3 and 6.3 kbits.

ITU G.728 Recommendation for coding of speech at 16 kbit/s using low-delay code excited linear prediction (LD-CELP)

ITU H.221 Frame Structure for a 64 to 1920 kbit/s Channel in Audiovisual Teleservices ITU H.223 Multiplexing Protocols for Low Bitrate Multimedia Terminals ITU H.225 ITU Recommendation for Media Stream Packetization and Synchronization on non-guaranteed quality of service LANs.

ITU H.230 Frame-synchronous Control and Indication Signals for Audiovisual Systems ITU H.231 Multipoint Control Unit for Audiovisual Systems Using Digital Channels up to 2 Mbit/s ITU H.242 System for Establishing Communication Between Audiovisual Terminals Using Digital Channels up to 2 Mbits ITU H.243 System for Establishing Communication Between Three or More Audiovisual Terminals Using Digital Channels up to 2 Mbit/s ITU H.245 Recommendation for a control protocol for multimedia communication ITU H.261 Recommendation for Video Coder-Decoder for audiovisual services supporting video resolutions of 352×288 pixels and 176×144 pixels.

ITU H.263 Recommendation for Video Coder-Decoder for audiovisual services supporting video resolutions of 128×96 pixels, 176×144 pixels, 352×288 pixels, 704×576 pixels and 1408×1152 pixels.

ITU H.320 Recommendation for Narrow Band ISDN visual telephone systems.

ITU H.321 Visual Telephone Terminals over ATM

ITU H.322 Visual Telephone Terminals over Guaranteed Quality of Service LANs

ITU H.323 ITU Recommendation for Visual Telephone Systems and Equipment for Local Area Networks which provide a non-guaranteed quality of service.

ITU H.324 Recommendation for Terminals and Systems for low bitrate(28.8 Kbps) multimedia communication on dial-up telephone lines.

ITU T.120 Transmission Protocols for Multimedia Data.

In addition, several other relevant standards exist including:

ISDN Integrated Services Digital Network, the digital communication standard for transmission of voice, video and data on a single communications link.

RTP Real-Time Transport Protocol, an Internet Standard Protocol for transmission of real-time data like voice and video over unicast and multicast networks.

IP Internet Protocol, an Internet Standard Protocol for transmission and delivery of data packets on a packet switched network of interconnected computer systems.

PPP Point-to-Point Protocol

MPEG Motion Pictures Expert Group, a standards body under the International Standards Organization(ISO), Recommendations for compression of digital Video and Audio including the bit stream but not the compression algorithms.

SLIP Serial Line Internet Protocol

SVP Resource Reservation Setup Protocol

UDP User Datagram Protocol

The popularity of the TCP/IP protocols on the Internet grew rapidly because they met an important need for worldwide data communication and had several important characteristics that allowed them to meet this need. These characteristics, still in use today, include:

1) A common addressing scheme that allows any device running TCP/IP to uniquely address any other device on the Internet.

2) Open protocol standards, freely available and developed independently of any hardware or operating system. Thus, TCP/IP is capable of being used with different hardware and software, even if Internet communication is not required.

Independence from any specific physical network hardware, allows TCP/IP to integrate many different kinds of networks. TCP/IP can be used over an Ethernet, a token ring, a dial-up line, or virtually any other kinds of physical transmission media.

An understanding of how information travels in communication systems is required to appreciate the recent steps taken by key players in today's Internet backbone business. The traditional type of communication network is circuit switched. The U.S. telephone system uses such circuit switching techniques. When a person or a computer makes a telephone call, the switching equipment within the telephone system seeks out a physical path from the originating telephone to the receiver's telephone. A circuit-switched network attempts to form a dedicated connection, or circuit, between these two points by first establishing a circuit from the originating phone through the local switching office, then across trunk lines, to a remote switching office, and finally to the destination telephone. This dedicated connection exists until the call terminates.

The establishment of a completed path is a prerequisite to the transmission of data for circuit switched networks. After the circuit is in place, the microphone captures analog signals, and the signals are transmitted to the Local Exchange Carrier (LEC) Central Office (CO) in analog form over an analog loop. The analog signal is not converted to digital form until it reaches the LEC Co, and even then only if the equipment is modern enough to support digital information. In an ISDN embodiment, however, the analog signals are converted to digital at the device and transmitted to the LEC as digital information.

Upon connection, the circuit guarantees that the samples can be delivered and reproduced by maintaining a data path of 64 Kbps (thousand bits per second). This rate is not the rate required to send digitized voice per se. Rather, 64 Kbps is the rate required to send voice digitized with the Pulse Code Modulated (PCM) technique. Many other methods for digitizing voice exist, including ADPCM (32 Kbps), GSM (13 Kbps), TrueSpeech 8.5 (8.5 Kbps), G.723 (6.4 Kbps or 5.3 Kbps) and Voxware RT29HQ (2.9 Kbps). Furthermore, the 64 Kbps path is maintained from LEC Central Office (CO) Switch to LEC CO, but not from end to end. The analog local loop transmits an analog signal, not 64 Kbps digitized audio. One of these analog local loops typically exists as the "last mile" of each of the telephone network circuits to attach the local telephone of the calling party.

This guarantee of capacity is the strength of circuit-switched networks. However, circuit switching has two significant drawbacks. First, the setup time can be considerable, because the call signal request may find the lines busy with other calls; in this event, there is no way to gain connection until some other connection terminates. Second, utilization can be low while costs are high. In other words, the calling party is charged for the duration of the call and for all of the time even if no data transmission takes place (i.e. no one speaks). Utilization can be low because the time between transmission of signals is unable to be used by any other calls, due to the dedication of the line. Any such unused bandwidth during the connection is wasted.

Additionally, the entire circuit switching infrastructure is built around 64 Kbps circuits. The infrastructure assumes the use of PCM encoding techniques for voice. However, very high quality codecs are available that can encode voice using less than one-tenth of the bandwidth of PCM. However, the circuit switched network blindly allocates 64 Kbps of bandwidth for a call, end-to-end, even if only one-tenth of the bandwidth is utilized. Furthermore, each circuit generally only connects two parties.

Without the assistance of conference bridging equipment, an entire circuit to a phone is occupied in connecting one party to another party. Circuit switching has no multicast or multipoint communication capabilities, except when used in combination with conference bridging equipment.

Other reasons for long call setup time include the different signaling networks involved in call setup and the sheer distance causing propagation delay. Analog signaling from an end station to a CO on a low bandwidth link can also delay call setup. Also, the call setup data travels great distances on signaling networks that are not always transmitting data at the speed of light. When the calls are international, the variations in signaling networks grows, the equipment handling call setup is usually not as fast as modem setup and the distances are even greater, so call setup slows down even more. Further, in general, connection-oriented virtual or physical circuit setup, such as circuit switching, requires more time at connection setup time than comparable connectionless techniques due to the end-to-end handshaking required between the conversing parties.

Message switching is another switching strategy that has been considered. With this form of switching, no physical path is established in advance between the sender and receiver; instead, whenever the sender has a block of data to be sent, it is stored at the first switching office and retransmitted to the next switching point after error inspection. Message switching places no limit on block size, thus requiring that switching stations must have disks to buffer long blocks of data; also, a single block may tie up a line for many minutes, rendering message switching useless for interactive traffic.

Packet switched networks, which predominate the computer network industry, divide data into small pieces called packets that are multiplexed onto high capacity intermachine connections. A packet is a block of data with a strict upper limit on block size that carries with it sufficient identification necessary for delivery to its destination. Such packets usually contain several hundred bytes of data and occupy a given transmission line for only a few tens of milliseconds. Delivery of a larger file via packet switching requires that it be broken into many small packets and sent one at a time from one machine to the other. The network hardware delivers these packets to the specified destination, where the software reassembles them into a single file.

Packet switching is used by virtually all computer interconnections because of its efficiency in data transmissions. Packet switched networks use bandwidth on a circuit as needed, allowing other transmissions to pass through the lines in the interim. Furthermore, throughput is increased by the fact that a router or switching office can quickly forward to the next stop any given packet, or portion of a large file, that it receives, long before the other packets of the file have arrived. In message switching, the intermediate router would have to wait until the entire block was delivered before forwarding. Today, message switching is no longer used in computer networks because of the superiority of packet switching.

To better understand the Internet, a comparison to the telephone system is helpful. The public switched telephone network was designed with the goal of transmitting human voice, in a more or less recognizable form. Their suitability has been improved for computer-to-computer communications but remains far from optimal. A cable running between two computers can transfer data at speeds in the hundreds of megabits, and even gigabits per second. A poor error rate at these speeds would be only one error per day. In contrast, a dial-up line, using standard telephone lines, has a maximum data rate in the thousands of bits per second, and a much higher error rate. In fact, the combined bit rate times error rate performance of a local cable could be 11 orders of magnitude better than a voice-grade telephone line. New technology, however, has been improving the performance of these lines.

The Internet is composed of a great number of individual networks, together forming a global connection of thousands of computer systems. After understanding that machines are connected to the individual networks, we can investigate how the networks are connected together to form an internetwork, or an internet. At this point, internet gateways and internet routers come into play.

In terms of architecture, two given networks are connected by a computer that attaches to both of them. Internet gateways and routers provide those links necessary to send packets between networks and thus make connections possible. Without these links, data communication through the Internet would not be possible, as the information either would not reach its destination or would be incomprehensible upon arrival. A gateway may be thought of as an entrance to a communications network that performs code and protocol conversion between two otherwise incompatible networks. For instance, gateways transfer electronic mail and data files between networks over the internet.

IP Routers are also computers that connect networks and is a newer term preferred by vendors. These routers must make decisions as to how to send the data packets it receives to its destination through the use of continually updated routing tables. By analyzing the destination network address of the packets, routers make these decisions. Importantly, a router does not generally need to decide which host or end user will receive a packet; instead, a router seeks only the destination network and thus keeps track of information sufficient to get to the appropriate network, not necessarily the appropriate end user. Therefore, routers do not need to be huge supercomputing systems and are often just machines with small main memories and little disk storage. The distinction between gateways and routers is slight, and current usage blurs the line to the extent that the two terms are often used interchangeably. In current terminology, a gateway moves data between different protocols and a router moves data between different networks. So a system that moves mail between TCP/IP and OSI is a gateway, but a traditional IP gateway (that connects different networks) is a router.

Now, it is useful to take a simplified look at routing in traditional telephone systems. The telephone system is organized as a highly redundant, multilevel hierarchy. Each telephone has two copper wires coming out of it that go directly to the telephone company's nearest end office, also called a local central office. The distance is typically less than 10 km; in the U.S. alone, there are approximately 20,000 end offices. The concatenation of the area code and the first three digits of the telephone number uniquely specify an end office and help dictate the rate and billing structure.

The two-wire connections between each subscriber's telephone and the end office are called local loops. If a subscriber attached to a given end office calls another subscriber attached to the same end office, the switching mechanism within the office sets up a direct electrical connection between the two local loops. This connection remains intact for the duration of the call, due to the circuit switching techniques discussed earlier.

If the subscriber attached to a given end office calls a user attached to a different end office, more work has to be done in the routing of the call. First, each end office has a number of outgoing lines to one or more nearby switching centers, called toll offices. These lines are called toll connecting trunks. If both the caller's and the receiver's end offices happen to have a toll connecting trunk to the same toll office, the connection may be established within the toll office. If the caller and the recipient of the call do not share a toll office, then the path will have to be established somewhere higher up in the hierarchy. There are sectional and regional offices that form a network by which the toll offices are connected. The toll, sectional, and regional exchanges communicate with each other via high bandwidth inter-toll trunks. The number of different kinds of switching centers and their specific topology varies from country to country, depending on its telephone density.

Using Network Level Communication for Smooth User Connection

In addition to the data transfer functionality of the Internet, TCP/IP also seeks to convince users that the Internet is a solitary, virtual network. TCP/IP accomplishes this by providing a universal interconnection among machines, independent of the specific networks to which hosts and end users attach. Besides router interconnection of physical networks, software is required on each host to allow application programs to use the Internet as if it were a single, real physical network.

The basis of Internet service is an underlying, connectionless packet delivery system run by routers, with the basic unit of transfer being the packet. In internets running TCP/IP, such as the Internet backbone, these packets are called datagrams. This section will briefly discuss how these datagrams are routed through the Internet.

In packet switching systems, routing is the process of choosing a path over which to send packets. As mentioned before, routers are the computers that make such choices. For the routing of information from one host within a network to another host on the same network, the datagrams that are sent do not actually reach the Internet backbone. This is an example of internal routing, which is completely self-contained within the network. The machines outside of the network do not participate in these internal routing decisions.

At this stage, a distinction should be made between direct delivery and indirect delivery. Direct delivery is the transmission of a datagram from one machine across a single physical network to another machine on the same physical network. Such deliveries do not involve routers. Instead, the sender encapsulates the datagram in a physical frame, addresses it, and then sends the frame directly to the destination machine.

Indirect delivery is necessary when more than one physical network is involved, in particular when a machine on one network wishes to communicate with a machine on another network. This type of communication is what we think of when we speak of routing information across the Internet backbone. In indirect delivery, routers are required. To send a datagram, the sender must identify a router to which the datagram can be sent, and the router then forwards the datagram towards the destination network. Recall that routers generally do not keep track of the individual host addresses (of which there are millions), but rather just keeps track of physical networks (of which there are thousands). Essentially, routers in the Internet form a cooperative, interconnected structure, and datagrams pass from router to router across the backbone until they reach a router that can deliver the datagram directly.

The changing face of the internet world causes a steady inflow of new systems and technology. The following three developments, each likely to become more prevalent in the near future, serve as an introduction to the technological arena.

Asynchronous Transfer Mode (ATM) is a networking technology using a high-speed, connection-oriented system for both local area and wide area networks. ATM networks require modern hardware including:

1) High speed switches that can operate at gigabit (trillion bit) per second speeds to handle the traffic from many computers.
2) Optical fibers (versus copper wires) that provide high data transfer rates, with host-to-ATM switch connections running at 100 or 155 Mbps (million bits per second).
3) Fixed size cells, each of which includes 53 bytes.

ATM incorporates features of both packet switching and circuit switching, as it is designed to carry voice, video, and television signals in addition to data. Pure packet switching technology is not conducive to carrying voice transmissions because such transfers demand more stable bandwidth.

Frame relay systems use packet switching techniques, but are more efficient than traditional systems. This efficiency is partly due to the fact that they perform less error checking than traditional X.25 packet-switching services. In fact, many intermediate nodes do little or no error checking at all and only deal with routing, leaving the error checking to the higher layers of the system. With the greater reliability of today's transmissions, much of the error checking previously performed has become unnecessary. Thus, frame relay offers increased performance compared to traditional systems.

An Integrated Services Digital Network is an "international telecommunications standard for transmitting voice, video, and data over digital lines," most commonly running at 64 kilobits per second. The traditional phone network runs voice at only 4 kilobits per second. To adopt ISDN, an end user or company must upgrade to ISDN terminal equipment, central office hardware, and central office software. The ostensible goals of ISDN include the following:

1) To provide an internationally accepted standard for voice, data and signaling;
2) To make all transmission circuits end-to-end digital;
3) To adopt a standard out-of-band signaling system; and
4) To bring significantly more bandwidth to the desktop.

An ISP is composed of several disparate systems. As ISP integration proceeds, formerly independent systems now become part of one larger whole with concomitant increases in the level of analysis, testing, scheduling, and training in all disciplines of the ISP.

Internet-Based Callback Architecture

The following information discusses the detailed architecture of an internet-based callback architecture in accordance with a preferred embodiment. A block diagram of the architecture is illustrated in FIG. 14 in accordance with a preferred embodiment. The callback call flow commences when a caller 11412 calls into a local internet service provider 11419 as illustrated in FIG. 14 at 11410. The caller addresses the callback server 11414 to access the callback home page 11411 through the internet 11419, shown as an internet cloud labeled Basic Inernet Protocol Platform 11419. At the callback server home page 11411, the caller enters, sees and/or updates default information such as: callback Internet Protocol (IP) address, call-to phone number (or multiple phone numbers to initiate a conference call) and charge-to method at a minimum. Other information, such as one or more numbers comprising entry of a Direct Distance Dialing (DDD), International Direct Distance Dialing (IDDD) or an Internet Protocol (IP) address can be utilized to specify a phone number or internet computer with voice capability. In addition, a date and time can be prearranged for staging the callback operation. Additional information that can be captured at the callback server home page 11411 is detailed below in specific examples designed to elaborate and clarify in accordance with a preferred embodiment.

Then, at 11420, the callback server 11414 send a message to the callback switch 11432 with the appropriate calling information, and the callback switch 11432 initiates the callback leg as shown by step 11430 of the call through the Public Service Telephony Network (PSTN) 11435 to the destination specified by the caller whereby the callback caller answers the incoming call to 11437. Once the caller end of the call is prepared, then the callback switch initiates call-to call leg(s) which connect the call through path 11440 through PSTN 11445 to telephone set 11446 and/or 11447. Once all of the callers have been connected, then when the status of the call changes, an exception condition is indicated on the display if it is an IP call, or an audio indicia of the condition is transmitted to the callers if they are utilizing a standard telephony device. A change in status could be a caller hanging up or a glitch occurring in the transmission. The exception conditions are also captured for quality of service analysis.

When the call is initiated utilizing the information entered into the callback server home page 11411, as part of the initialization of the callback session, a separate temporary webpage is created which is accessible to all members of the callback via a password selected by the initiator of the callback session. While all of the callers are being connected and throughout the duration of the telephony experience, the status of the call leg changes, and exception conditions, are indicated on the temporary created status webpage, or an audio indicia, where appropriate, of the condition is transmitted to the callers if they are utilizing a standard telephony device. Then, as callers are connected, removed, or change status, the display is updated to reflect the status of each participant's connection. In addition, as the call progresses, participants can drag and drop files, video clips or any other information which would be utilized as collaborative material during the call. Each participant would be required to move information to their personal computer before the call terminated, since the webpage is temporary and is deleted upon termination of the call. The temporary webpage is password protected to avoid unauthorized access to the information contained in the webpage.

Callback Service Potential

The callback service includes support for one-to-one calling, one-to-many calling (conference calling, fax broadcast, text-to-speech message delivery, voice-to-voice message delivery, conference call reservation whereby the server sends E-mails to call-to participants with the conference call details, the server sends fax to call-to participants, or the server sends a text-to-speech message to call-to participants.

Internet Service Potential

Real-time view of the status of each conference call participant, ANI and an alphanumeric representation to identify each participant entered by the initiator when a call is "reserved" can be displayed on screen as participants connect to conference.

This information is captured as part of the call record set forth earlier and detailed in the appendix.

In an alternative embodiment, a conference call without callback leg is enabled. In this embodiment, a callback customer participates through a Voice Over Network (VON) application utilizing a computer with voice capability, and can initiate a video screen popup on the computer display for manual operator assistance as detailed above in the description of a video operator.

Internet-Based Callback Architecture

In an internet based callback architecture as illustrated in FIG. 15A, the callback caller dials into a local internet service provider 11512. Then, the caller addresses the host server 11514 containing the callback home page 11510→11511. At the callback server home page 11511, the caller enters the information described earlier including a callback Internet Protocol (IP) address, call-to phone number (or multiple phone numbers to initiate a conference call) and charge-to method at a minimum. Then, for the callback call flow to initiate the call, the callback server 11514, where the callback server home page 11511 is located, transmits a message to the callback switch 11532 with the necessary calling information generated from the callback home page 11511. Finally, the callback switch 11532, establishes an internet voice session with the callback caller utilizing the internet service provider 11512 to establish a voice IP session with the initiating client 11535. The callback switch 11511 then initiates the call-to call leg(s) routing the call 11540 out over the public service telephony network 11541 to a telephone set 11542.

Self-Regulating System

An expert system monitors each call in accordance with a preferred embodiment. The system includes rules that define what logic to execute when an exception occurs. The rules include specialized processing based on whether the call is routed via a PSTN or the internet. In addition, the system includes a default connection to a manual operator if no other correction of the connection is available. For example, if a caller hangs up during a teleconference and other callers are still connected, an exception message is sent to each of the still connected callers informing them of the status change. Another aspect of the expert system is to ensure quality of service (QOS) and produce reports indicating both integrity and exceptions. Scheduling of resources is tied to this expert system, which regulates whether calls can be scheduled based on available or projected resources at the time of the proposed call. For example, since all calls used by this system are initiated by the callback switch (item 11432 in FIG. 14 and item 11532 in FIG. 15B-1), if there are insufficient outgoing trunk ports during the period of time that a callback subscriber requests, then the callback subscriber is prompted to select another time or denied access to the resources for that time. This is utilized to predict when additional ports and/or resources are required.

Fault Management

The NGN operations architecture specifies the points of insertion and collections for network wide events that feed the Fault Management systems. Since the components of the packet portion of the hybrid NGN infrastructure are in most cases manageable by SNMP or some other standard management protocol the major challenges are the following:

1. Correlation of the events from the packet infrastructure with the Core circuit-based network events to provide the operators with a seamless service oriented view of the overall health of the network;
2. Event gathering and interpretation from the Core circuit network elements; and
3. Mediation and standardization of the network messages to aid processing by the network management framework of the NGN.

The network management components of the NGN provide comprehensive solutions to address these challenges. Correlation is provided by the use of rules based inference engines. Event gathering and interpretation is typically performed by custom development of software interfaces which communicate directly with the network elements, process raw events and sort them by context prior to storing them. For example, alarms versus command responses. The mediation and standardization challenge is addressed by using a comprehensive library of all possible message types and network events categorize the numerous messages that the NGN generates.

FIG. 15A is a flowchart showing a Fault Management Process 1550 in accordance with a preferred embodiment of the present invention. The Fault Management Process 1550 begins with a transmitting step 1552. In step 1552, data is transmitted over the hybrid network, including video and mixed audio information. The data transmission generally makes full use of the hybrid networks mixed circuit-switched an packet-switched components. As discussed above, the hybrid network includes approximately all the advantages of a packet based network while still making use of the older circuit-switched components already in place. The system is able to do this by correlating events raised by both the circuit-switched and packet-switch network elements, as discussed later in relation to event and correlating steps 1554 and 1556.

In a circuit-switched event gathering step 1554, an event is obtained from a circuit-switched based network element. As discussed above, event gathering and interpretation is typically performed by custom developed software interfaces which communicate directly with the network elements, process raw network events, and sort the events by context prior to storing them. After obtaining the events, the events are correlated in a correlation step 1556.

In a correlation step 1556, the event gathered in step 1554 is correlated with a second event obtained from a packet-switched network element. As with circuit-switched network elements, packet-switched event gathering and interpretation is typically performed by custom developed software interfaces which communicate directly with the network elements, process raw network events, and sort the events by context prior to storing them. As discussed above, the correlation is preferably provided by a rules based inference engine. After the events are correlated, a fault message is created in a fault message step 1558.

In a fault message step 1558, a fault message is created based on the correlated first and second events obtained in steps 1554 and 1556. Preferably the fault message is created utilizing a comprehensive library of all possible message types and network events which categorizes the numerous messages that the hybrid network generates.

FIG. 15B is a block diagram showing a Fault Management component 1500 in accordance with a preferred embodiment of the present invention. The Fault Management component 1500 records failures and exceptions in network devices (e.g. network routers or UNIX servers) and performs the following operations:

1) performs root-cause correlation of the failures and exceptions;
2) immediately takes corrective and/or informative actions such as sending a page, logging a help desk ticket, sending an electronic mail message, or calling a resolution script;
3) stores the information into a Database Component for later analysis by the Reporting Component; and
4) allows real time viewing of faults in a network map and network event views.

The Fault Management component 1500 includes the following elements:

UNIX Servers 1502—Any UNIX Server with BMC Patrol clients loaded.

NT Servers 1504—Any NT Server with BMC Patrol clients loaded.

SNMP Devices 1506—Any SNMP manageable device.

HP OV Network Node Manager (Collector Component) 1508—HP OpenView Network Node Manager is one product which performs several functions. In this context it is it is responsible for receiving performance information from BMC Patrol clients via BMC Patrol View.

Seagate NerveCenter 1510—In a fault management context, Seagate NerveCenter performs root-cause correlation of faults and events across the network.

HP OV Network Node Manager Network Map 1512—BP OpenView Network Node Manager is one product which performs several functions. In this context it is responsible for maintaining and displaying the node level network map of the network the NMNSIS architecture monitors.

HP OV Network Node Manager 1514—HP OpenView Network Node Manager is one product which performs several functions. In this context it is it is responsible for receiving and displaying all events, regardless of their source.

Netcool HP OV NNM Probe 1516—An Omnibus Netcool probe which is installed on the same system as HP OV Network Node Manager and forwards events to the Omnibus Netcool Object Server.

Micromuse Internet Service Monitors 1518— An Omnibus Netcool suite of active probes (monitors) which monitor internet services such as FFP, POP3, SMTP, NNTP, DNS, HTTP, and RADIUS. These monitors collect availability and performance data and forward the information as alerts to the Omnibus Netcool Object Server.

Netcool Object Server 1520—The Omnibus Netcool Object Server is a real-time memory resident database which stores all current events (alerts). The events are viewable by operations personnel using a number of event lists and views, all of which are highly customizable by each operator.

Notification Spooler 1522—A custom provided subcomponent which spools job-files that specify which events have occurred for possible notifications.

Spooled Job 1524—Each spooled job represents a specific event that was received by the Netcool Object Server and may need to result in one or more notification actions. Each job is stored as a file in a special notification spool directory.

Notification Actor 1526—A custom provided subcomponent which determines the alert time, source node, and alert type from the loaded spooled job and initiates notification actions based as specified in the configuration file. Notification actions include alphanumeric pages, trouble tickets, email, and resolution scripts. Multiple notification actions can be specified in the configuration files such that different actions are taken for different alert times, source nodes, and/or alert types. Default actions are also supported.

Alphanumeric Page 1528—An alphanumeric page sent using Telamon TelAlert via modem dialing the relevant paging provider. The alphanumeric page message provides contextual notification of actions to be performed. Context can include any information but frequently contains information such as the device name, problem description, and priority.

Electronic Mail Message 1530—An internet mail message send using the UNIX mail utility. The mail message is frequently used to provide non-urgent notification of situations or actions automatically performed by the MNSIS architecture along with detailed context.

Local Script Execution 1532—Initiates any local script on the machine, which may initiate scripts or applications on other machines.

Remedy Gateway 1534—The Omnibus Netcool Remedy Gateway automatically reads alerts in the Netcool Object Server and opens tickets within Remedy as customized by the user. The Remedy trouble ticket ID is returned to the Omnibus and can be viewed as further reference.

Remedy 1536—Remedy Action Request System, a trouble ticketing system.

Oracle Gateway 1538—The Omnibus Netcool Oracle Gateway automatically reads alerts in the Netcool Object Server and logs records within Oracle as customized by the user.

Oracle 1540—Oracle is a relational database management system.

Generate Time Key Script 1542—Script which generates New Time Records from alerts in the Netcool Object Server.

New Time Records 1544—Time records corresponding to new alerts in Netcool Object Server which need to be added to the Oracle time tables.

SOL Loader Script 1546—A custom script which automatically loads records into Oracle via SQL Loader Direct Load.

Proactive Threshold Manager

The Proactive Threshold Manager is an automated network manager that forewarns service providers of a chance that a service level agreement to maintain a certain level of service is in danger of being breached.

The Proactive Threshold Manager provides real-time threshold analysis (that is, it continuously monitors for plan thresholds that have been exceeded) using algorithms. It receives call detail records from the Server and returns alarms which may be retrieved and examined using an NGN workstation. The threshold manager resides on an NGN hybrid network computer.

A threshold generally is a number which, when exceeded, generates an alarm in the Proactive Threshold Manager indicating possible breach of a service level agreement. Thresholds may be specified for the time of day and/or the day of the week. Furthermore, a threshold may be applied to each category for which the Proactive threshold manager keeps counts, including the number of short-duration calls, long-duration calls, and cumulative minutes.

When an alarm is generated by the Proactive Threshold Manager, it is also prioritized. The priority is a multiple of the number of times a threshold has been exceeded. For example, if the threshold was 10 and the relevant count has reached 50, then the priority of the alarm is 5 (50.div.10).

Each alarm is available to an NGN hybrid network analyst via an NGN Workstation. The workstation is a PC with access to a Server and retrieves the next available alarm of the highest priority. The analyst investigates the alarm data and, if a service level agreement breach is suspected, notifies the provider and suggests appropriate actions to stop the breach.

Figure 16A:
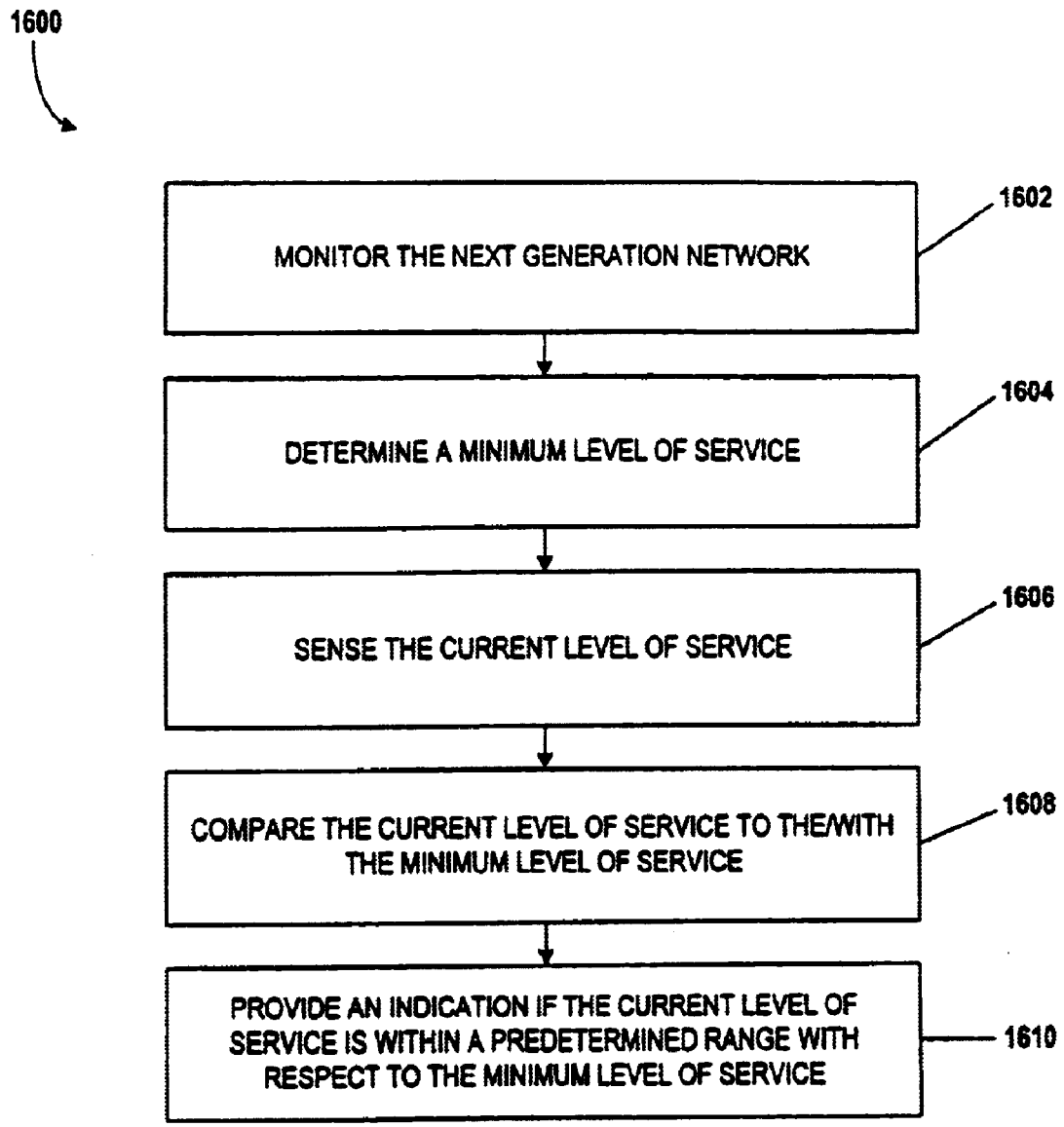
FIG. 16A is a flowchart showing a Proactive Threshold Management Process in accordance with a preferred embodiment of the present invention.

FIG. 16A is a flowchart showing a Proactive Threshold Management Process 1600 in accordance with a preferred embodiment of the present invention. The process begins with a monitoring step 1602. In step 1602, the Proactive Threshold Manager monitors the NGN hybrid network. The Proactive Threshold Manager generally monitors the network at all times to ensure proper service is provided to subscribers of the network, by assisting service providers in maintaining a proper level of service.

In a minimum level determination step 1604, the Proactive Threshold Manager determines the minimum level of service needed to avoid breaching subscriber service level agreements. Service level agreement information is generally provided to the Proactive Threshold Manager by the rules database which contains most pertinent subscriber information.

In a sensing step 1606, the Proactive Threshold Manager senses the current level of service which is being provided to customers. Protocol converters assist the Proactive Threshold Manager in communicating with various components of the system. Protocol converters are able to translate information between the packet-switched an circuit-switched system components, thus allowing the Proactive Threshold Manager to communicate with all the components of the hybrid system.

In a comparing step 1608, the Proactive Threshold Manager compares the current level of service, sensed in step 1606, with the minimum level of service, determined in step 1604, to determine where the current level of service is in relation to the minimum level service which needs to be provided to subscribers.

In an alarm step 1610, the Proactive Threshold Manager provides an indication or alarm to the service provider if the current level of service is within a predetermined range with respect to the minimum level of service. The threshold is preferably chosen such that the service provider is allowed enough time to cure the service level problem before the minimum service level is reached and the subscriber's service level agreement breached.

Figure 16B:
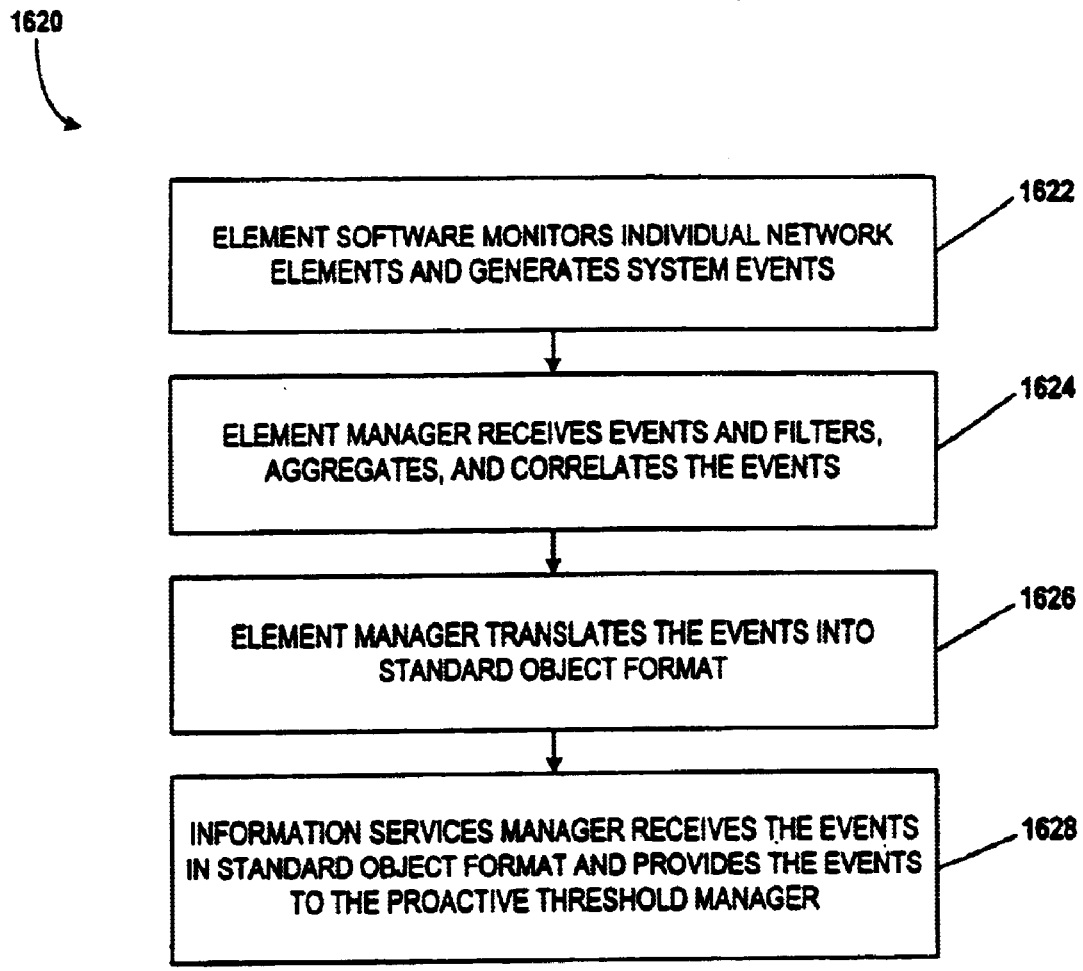
FIG. 16B is a flowchart showing a Network Sensing Process in accordance with one embodiment of the present invention.

FIG. 16B is a flowchart showing a Network Sensing Process 1620 in accordance with one embodiment of the present invention. The Network Sensing Process 1620 begins with an element monitoring step 1622. In step 1622, custom developed element software monitors the individual network elements and generates events based on hardware occurrences, such as switch failures. Typically, the various elements that make up the hybrid network are very different from one another. Thus, custom software is generally needed for each network element or group of related network elements. The custom developed software communicates directly with the hardware and generates events when various occurrences related to the individual hardware happens. For example, when a hardware element fails, the related element software senses the failure and generates an event indicating the hardware failure and the general nature of the failure. The events are then routed to an element manger to processed.

In an event processing step 1624, events generated in step 1622 are filtered, aggregated, and correlated by an element manager. The element manager is where the primary data reduction functions reside. The element manager filters, aggregates, and correlates the events to further isolate problems within the network. Any information that is deemed critical to monitor and manage the network is translated into standard object format in a translation step 1626.

In a translation step 1626, information from step 1624 that is deemed critical to monitor and manage the network is translated into a standard object format. Generally, typical operational events are only logged and not translated into standard object format. However, critical information, such as hardware failure, is translated and forwarded to the Information Services Manager in an information provisioning step 1628.

In an information provisioning step 1628, information from step 1626 is received by the Information Services Manager and forwarded to the Proactive Threshold Manager. The Information Services Manager provides the data management and data communications between the element manager and other system components. Generally, the Information Services Manager adheres to CORBA standards to provide universal information access by an object request broker. The object request broker allows the Information Services Manager to share management information stored in distributed databases. The Proactive Threshold Manager uses the information provided by the Information Services Manger to determine a current level of service and compare the current level of services with the minimum level of service that the service provider can provide without violating SLAs.

Element Management

As discussed above, the element manager works with the Information Services Manager and the Presentation Manager to assist in the management of the hybrid network system. The three components are briefly described below to provide context for the detailed discussion of the element manager that follows.

Element Manager

The element manager communicates with the network elements to receive alarms and alerts through trapping and polling techniques. The element manager is the layer where the primary data reduction functions reside. At this layer, events received at the element manager will-be filtered, aggregated and correlated to further isolate problems within the network. Information that is deemed critical to monitor and manage the network is translated into a standard object format and forwarded to the Information Services Manager. An element manager can be, but is not necessarily, software which adheres to open standards such as the Simple Network Management Protocol (SNMP) and the Object Management Group's (OMG) Common Object Request Broker Architecture (CORBA).

Information Services Manager

The information services manager provides the data management and data communications between element managers and presentation managers. All information forwarded from the element managers is utilized by the information services manager to provide information to the network operators. The information services manager adheres to CORBA standards to provide ubiquitous information access via an object request broker (ORB). The ORB allows the information services manager to share management information stored in distributed databases.

The information services manager stores critical management information into operational (real-time) and analytical (historical) distributed databases. These databases provide common data storage so that new products can be easily inserted into the management environment. For example, if an event is received at an element manager that is deemed critical to display to a network user, the information services manager will store a copy of the alarm in the operational database and then forward the alarm to the appropriate network operator.

Media and textual databases are also provided by the information services manager. The databases includes online manuals for administrative purposes, as well as for the maintenance specialists to access element specific information. The databases also provide procedures, policies and computer based training to network users.

The information services manager provides requested information (real-time and historical) to the network users via the presentation manager.

Presentation Manager

The presentation manager performs the function its name implies: the presentation of the information to an end user. Because different locations and job functions require access to different types of information, there are at least two types of display methods. The first is for graphic intensive presentations and the second is for nomadic use, such as field technicians. The first environment requires a graphic i ntensive display, such as those provided by X-Windows/ MOTIF. The second environment is potentially bandwidth poor where dial-up or wireless access may be used along with more traditional LAN access. This is also where browser technology is employed.

The Element Management Aspect of the present invention works in conjunction with other components of the system, such as Fault Management, to provide communication between the various network elements of the system.

Figure 17:
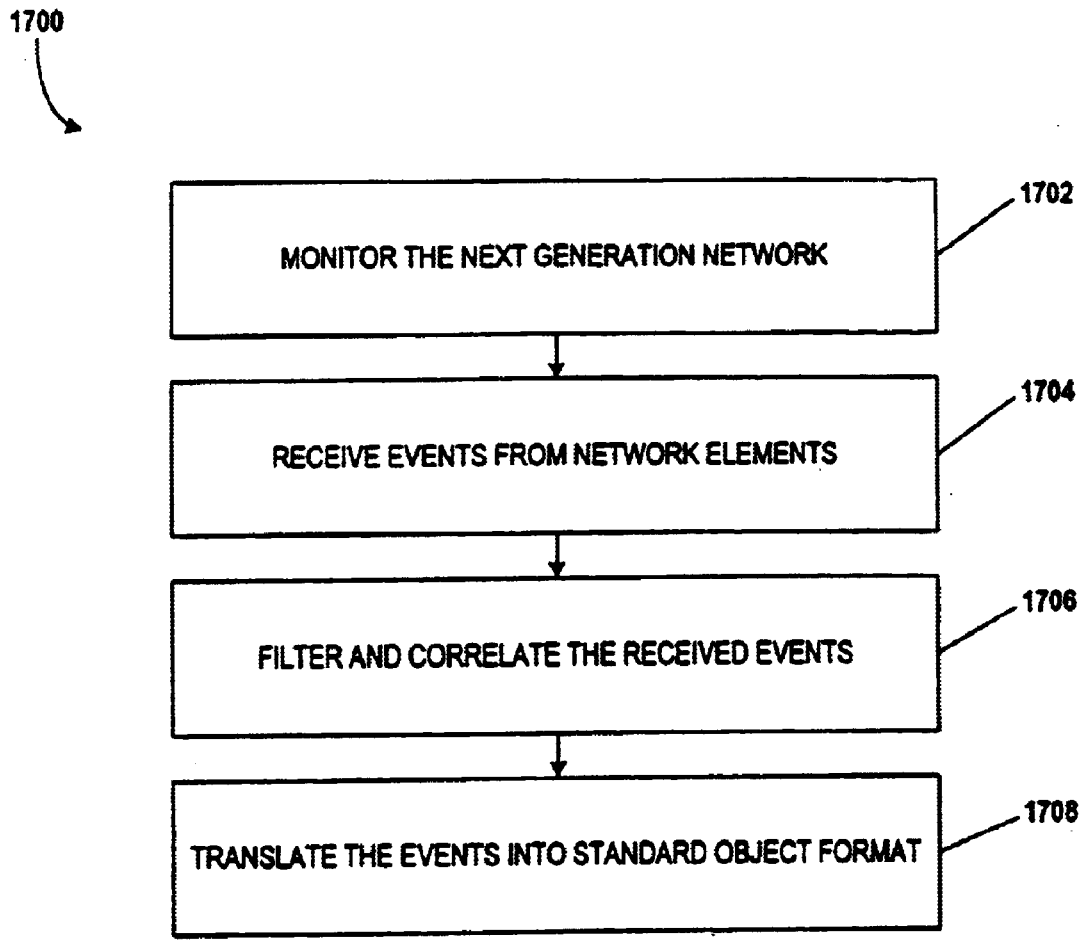
FIG. 17 is a flowchart showing an Element Management Process in accordance with a preferred embodiment of the present invention.

FIG. 17 is a flowchart showing an Element Management Process 1700 in accordance with a preferred embodiment of the present invention. The Element Management Process 1700 begins with a monitoring step 1702. In step 1702, the Element Manager monitors the system for events generated by network elements.

Generally, the Element Manager continuously monitors the system to translate events for other system components, such as the Fault Management Component.

In an event receiving step 1704, the Element Manager receives events from various network elements. Preferably the events are provided by custom software interfaces which communicate directly with network elements. The software interfaces preferably process the raw network events and sort them by context prior to providing the events to the Element Manager.

In a filtering and correlating step 1706, the Element Manager filters and correlates the events received in step 1704. Preferably the correlation is provided by a rules based inference engine. After collecting and correlating the events, the Element Manager performs a translation step 1708. In step 1708, the events correlated in step 1706 are translated into standard object format. Generally a comprehensive library of all message types generated by the hybrid system is utilized to translate the correlated events into standard object format. Once the events are translated, they are ready for use by other system components, such as Fault Management or Billing.

Customer Support Structure

The organization model for customer service support in the NGN network provides a single point of contact that is customer focused. This single point of contact provides technical expertise in resolving customer incidents, troubles and requests. Generally a three tiered support structure is greatly increases customer satisfaction in service needs. Each tier, or level, possess an increased level of skill, with tasks and responsibilities distributed accordingly.

Figure 18:
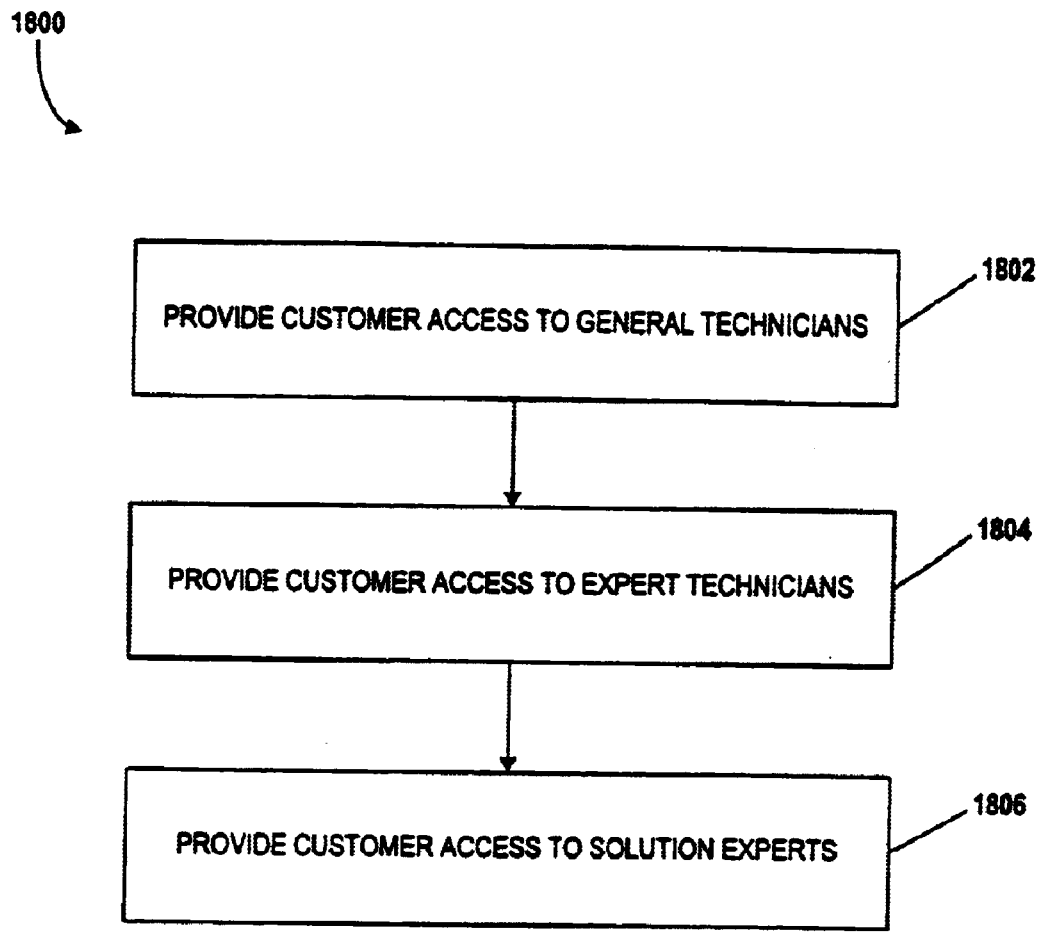
FIG. 18 is a flowchart showing a three tiered customer support process in accordance with a preferred embodiment of the present invention.

FIG. 18 is a flowchart showing a Three Tiered Customer Support Process 1800 in accordance with a preferred embodiment of the present invention. The Three Tiered Customer Support Process 1800 begins with a First Tier step 1802. In step 1802, a customer with a hybrid network problem is provided access to customer support personnel having a broad set of technical skills. The broad set of technical skills allows this group to solve about 60–70% of all hybrid network problems. If the customers network problem is solved at this stage, the process ends. However, if the customers network problem is not solved at this stage, the process continues to a Second Tier step 1804.

In the Second Tier step 1804, the customer is provided access to technical experts and field support personnel who may specialize in specific areas. The greater specialized nature of this group allows it to solve many problems the group in step 1802 could not solve. This group is generally responsible for solving 30–40% of all hybrid network problems. If the customers network problem is solved at this stage, the process ends. However, if the customers network problem is not solved at this stage, the process continues to a Third Tier step 1806.

In the Third Tier step 1806, the customer is provided access to solution experts who are often hardware vendors, software vendors, or customer application development and maintenance teems. Customer network problems that get this far in the customer support process 1800 need individuals possessing in-depth skills to investigate and resolve the difficult problems with there area of expertise. Solution experts are the last resort for solving the most difficult problems. Typically this group solves about 5% of all hybrid network problems.

The above model is generally referred to as the Skilled Model because personnel at all three tiers are highly skilled. This model generally creates a high percentage of calls resolved on the first call. Other approaches include a Functional Model, and a Bypass Model. In the Functional Model users are requested to contact different areas depending on the nature of the incident. Calls are routed to the customer support representative best able to handle the call. This model can easily be coupled with the Skill Model above. In the Bypass Model First Tier only logs calls, they do not resolve calls. One advantage of this model is that skilled resources don't have to waste time logging calls.

In more detail, a customer calling a customer support center in accordance with one embodiment of the present invention is first asked a series of questions by an interactive voice response (IVR) system or an live operator. The customer uses Touch-Tone keys on the telephone to respond to these queries from the IVR, or responds normally to a live operator.

When a product support engineer becomes available, the previously gathered information (both from the IVR query responses and the diagnostic information solicited from the system problem handlers and element managers) is available to the product support engineer.

After reviewing the situation with the customer, the product support engineer can query the customer's computer via support agents for additional information, if necessary.

In systems according to the preferred embodiment, the customer spends less time interacting with a product support engineer, and is relieved of many of the responsibilities in diagnosing and resolving problems. Automated diagnoses and shorter customer interactions save the product support center time, resources, and money. At the same time, the customer receives a better diagnosis and resolution of the problem than could usually be achieved with prior art product support techniques.

In addition, one embodiment of the present invention makes the Internet a viable alternative to telephone calls as a tool for providing consumer product support. Many on-line computer services, such as Prodigy and America On-Line, provide, for a fee as a part of their on-line service, software for connecting to and accessing the Internet.

The Internet access software accesses and "handshakes" with an "Internet Entry Server", which verifies the PIN number, provides the access and times the user's access time. The Internet Entry Server is programmed to recognize the PIN number as entitling the user to a limited prepaid or "free" Internet access time for on-line help services. Such a time period could be for a total time period such as 1 hour or more, or access to on-line help services can be unlimited for 90 days, 6 months, etc., for example, with the access time paid for by the sponsor/vendor. The first time a customer uses the on-line help service, the Internet Entry Server performs a registration process which includes a number of personal questions and custom data gathering in the form of queries provided by the sponsor/vendor for response by the user.

The pertinent answers are then immediately provided to the sponsor/vendor. The Internet Entry Server then "hotlinks" the customer to the sponsor/vendor's Internet domain or Home Page for a mandatory "guided tour" where the user is exposed to any current product promotion by the sponsor/vendor and can download promotional coupons, product information, etc. After this mandatory guided tour is completed, the customer is allowed to enter queries for help in installing or using the sponsor/vendor's product. As an optional promotional service, upon termination of the on-line help session, access to other information on the Internet can be provided. Once the "free" on-line help service time or time period is up, the Internet Entry Server prompts the user with one or more of a plurality of options for extending the availability of on-line help. For example, the user can be prompted to enter a credit card number to which on-line help charges can be charged; he or she can be given the opportunity to answer additional survey information in return for additional "free" on-line help; or a 900 subscriber paid telephone access number can be provided through which additional on-line help will be billed via the normal telephone company 900 billing cycles.

Integrated IP Telephony User Interface

One embodiment of the present invention allows a user of a web application to communicate in an audio fashion in-band without having to pick up another telephone. Users can click a button and go to a call center through a hybrid network using IP telephony. The system invokes an IP telephony session simultaneously with the data session, and uses an active directory lookup whenever a person uses the system.

Figure 19:
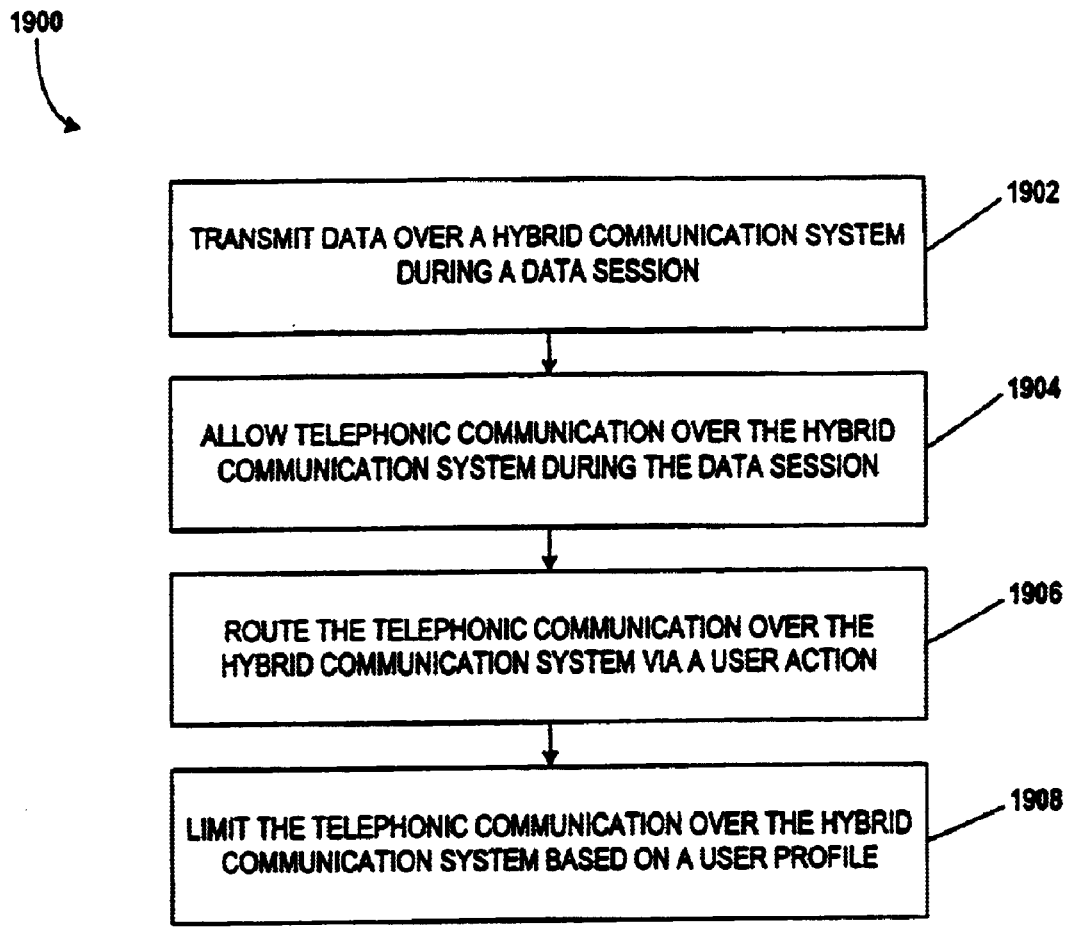
FIG. 19 is a flowchart showing an integrated IP telephony process in accordance with a preferred embodiment of the present invention.

FIG. 19 is a flowchart showing an integrated IP telephony process 1900 in accordance with a preferred embodiment of the present invention. The IP telephony process 1900 begins with a transmitting step 1902. In step 1902, data is transmitted over the hybrid network during a data session. This data session is typically a normal Internet browsing session, and is generally initiated by a web browser. Utilizing a web browser, users begin the data session by performing actions such as searching for web sites or downloading data from Internet sites. During the data session, the present invention allows users the option to initiate phone calls without the need to use another telephone.

In a telephony step 1904, the present invention allows users to initiate and continue telephonic communication. The telephonic is routed by a user action in step 1906, when a user selects a phone number to call. Telephone numbers are typically included in a telephone directory accessible on screen by the user. In addition, the directory may include icons which provide a highly recognizable visual mnemonic to allow users to easily recall the information included in a particular directory entry. The present invention utilizes the routing information to direct the call. Since both the original data from the data session and the new IP telephony data use Internet protocol, the present invention can provide a seamless integration of the two, to provide virtually simultaneous telephonic and non-telephonic data communication. The availability of packet switching elements in the hybrid network facilitate this process.

In packet switching networks, packets in the form of units of data are transmitted from a source—such as a user terminal, computer, application program within a computer, or other data handling or data communication device—to a destination, which may be simply another data handling or data communication device of the same character. The devices themselves typically are referred to as users, in the context of the network. Blocks or frames of data are transmitted over a link along a path between nodes of the network. Each block consists of a packet together with control information in the form of a header and a trailer which are added to the packet as it exits the respective node. The header typically contains, in addition to the destination address field, a number of subfields such as operation code, source address, sequence number, and length code. The trailer is typically a technique for generating redundancy checks, such as a cyclic redundancy code for detecting errors. At the other end of the link, the receiving node strips off the control information, performs the required synchronization and error detection, and reinserts the control information onto the departing packet.

Packet switching arose, in part, to fulfill the need for low cost data communications in networks developed to allow access to host computers. Special purpose computers designated as communication processors have been developed to offload the communication handling tasks which were formerly required of the host. The communication processor is adapted to interface with the host and to route packets along the network; consequently, such a processor is often simply called a packet switch. Data concentrators have also been developed to interface with hosts and to route packets along the network. In essence, data concentrators serve to switch a number of lightly used links onto a smaller number of more heavily used links. They are often used in conjunction with, and ahead of, the packet switch.

In virtual circuit (VC) or connection-oriented transmission, packet-switched data transmission is accomplished via predetermined end-to-end paths through the network, in which user packets associated with a great number of users share link and switch facilities as the packets travel over the network. The packets may require storage at nodes between transmission links of the network until they may be forwarded along the respective outgoing link for the overall path. In connectionless transmission, another mode of packet-switched data transmission, no initial connection is required for a data path through the network. In this mode, individual datagrams carrying a destination address are routed through the network from source to destination via intermediate nodes, and do not necessarily arrive in the order in which they were transmitted.

In a lookup step 1908, the telephonic communication over the hybrid network is limited bases on a user profile. Preferably the user profile is included in a rules database. By locating the user profile within the rules database, the rules database can provide seamless cross-location registration without the need for duplicate databases located on different networks. Using a rules database, a user utilizing the Internet in Europe can get the same telephony service as provided in the United States, as described above. Preferably the computer used to interface with the Internet includes multimedia equipment such as speakers and a microphone. Utilizing a multimedia equipped computer allows a user to use telephonic communication with little or no disruption while interfacing with the Internet. Multimedia computer speakers are used to receive the telephony audio from the network and the microphone is used to transmit the telephony data to the network.

Data Mining

The present invention includes data mining capability that provides the capability to analyze network management data looking for patterns and correlations across multiple dimensions. The system also constructs models of the behavior of the data in order to predict future growth or problems and facilitate managing the network in a proactive, yet cost-effective manner.

A technique called data mining allows a user to search large databases and to discover hidden patterns in that data. Data mining is thus the efficient discovery of valuable, non-obvious information from a large collection of data and centers on the automated discovery of new facts and underlying relationships in the data. The term "data mining"

comes from the idea that the raw material is the business data, and the data mining algorithm is the excavator, shifting through the vast quantities of raw data looking for the valuable nuggets of business information.

Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground.

Accurate forecasting relies heavily upon the ability to analyze large amounts of data. This task is extremely difficult because of the sheer quantity of data involved and the complexity of the analyses that must be performed. The problem is exacerbated by the fact that the data often resides in multiple databases, each database having different internal file structures.

Rarely is the relevant information explicitly stored in the databases. Rather, the important information exists only in the hidden relationships among items in the databases. Recently, artificial intelligence techniques have been employed to assist users in discovering these relationships and, in some cases, in automatically discovering the relationships.

Figure 20:
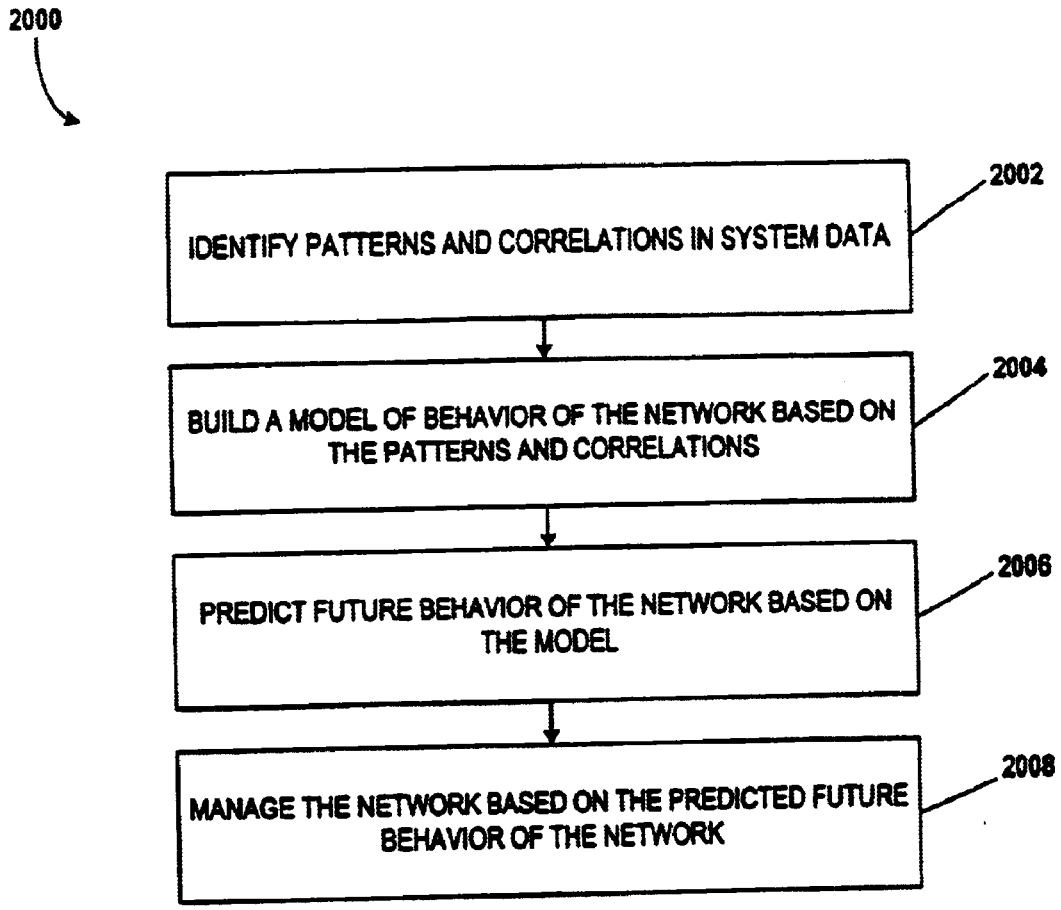
FIG. 20 is a flowchart showing a Data Mining Process in accordance with a preferred embodiment of the present invention.

FIG. 20 is a flowchart showing a Data Mining Process 2000 in accordance with a preferred embodiment of the present invention. The Data Mining Process 2000 begins with an identifying step 2002. In step 2002, the system identifies patterns and correlations in the system data over the hybrid communication system. Preferably the system data is analyzed across multiple dimensions to provide better future system behavior prediction.

In a model building step 2004, the system builds a model of the network behavior based on the patterns and correlations identified in step 2002. Data mining is a process that uses specific techniques to find patterns in data, allowing a user to conduct a relatively broad search of large databases for relevant information that may not be explicitly stored in the databases. Typically, a user initially specifies a search phrase or strategy and the system then extracts patterns and relations corresponding to that strategy from the stored data. Such a search system permits searching across multiple databases. The extracted patterns and relations can be: (1) used by the user, or data analyst, to form a prediction model; (2) used to refine an existing model; and/or (3) organized into a summary of the target database, as in predicting step 2006.

In a predicting step 2006, the system predicts future behavior of the network based on the model generated in step 2004. There are two existing forms of data mining: top-down; and bottom-up. Both forms are separately available on existing systems. Top-down systems are also referred to as "pattern validation," "verification-driven data mining" and "confirmatory analysis." This is a type of analysis that allows an analyst to express a piece of knowledge, validate or validate that knowledge, and obtain the reasons for the validation or invalidation. The validation step in a top-down analysis requires that data refuting the knowledge as well as data supporting the knowledge be considered. Bottom-up systems are also referred to as "data exploration ." Bottom-up systems discover knowledge, generally in the form of patterns, in data.

Finally, in a managing step 2008, the network is managed based on the future behavior of the network. Data mining involves the development of tools that analyze large databases to extract useful information from them. As an application of data mining, customer purchasing patterns may be derived from a large customer transaction database by analyzing its transaction records. Such purchasing habits can provide invaluable marketing information. For example, retailers can create more effective store displays and more effective control inventory than otherwise would be possible if they know consumer purchase patterns. As a further example, catalog companies can conduct more effective mass mailings if they know that, given that a consumer has purchased a first item, the same consumer can be expected, with some degree of probability, to purchase a particular second item within a defined time period after the first purchase.

Classification of the data records to extract useful information is an essential part of data mining. Of importance to the present invention is the construction of a classifier, from records of known classes, for use in classifying other records whose classes are unknown. As generally known in the prior art, a classifier is generated from input data, also called a training set, which consist of multiple records. Each record is identified with a class label. The input data is analyzed to develop an accurate description, or model, for each class of the records. Based on the class descriptions, the classifier can then classify future records, referred to as test data, for which the class labels are unknown.

As an example, consider the case where a credit card company which has a large database on its card holders and wants to develop a profile for each customer class that will be used for accepting or rejecting future credit applicants. Assuming that the card holders have been divided into two classes, good and bad customers, based on their credit history. The problem can be solved using classification. First, a training set consisting of customer data with the assigned classes are provided to a classifier as input. The output from the classifier is a description of each class, i.e., good and bad, which then can be used to process future credit card applicants. Similar applications of classification are also found in other fields such as target marketing, medical diagnosis, treatment effectiveness, and store location search.

In data mining applications of classification, very large training sets such as those having several million examples are common. Thus, it is critical in these applications to have a classifier that scales well and can handle training data of this magnitude. As an additional advantage, being able to classify large training data also leads to an improvement in the classification accuracy.

Another desirable characteristic for a data mining classifier is its short training time, i.e., the ability to construct the class descriptions from the training set quickly. As a result, the methods of the invention are based on a decision-tree classifier. Decision trees are highly developed techniques for partitioning data samples into a set of covering decision rules. They are compact and have the additional advantage that they can be converted into simple classification rules. In addition, they can be easily converted into Structured Query language (SQL) statements used for accessing databases, and achieve comparable or better classification accuracy than other classification methods.

Another data mining classifier technique solves the memory constraint problem and simultaneously improve execution time by partitioning the data into subsets that fit in the memory and developing classifiers for the subsets in parallel. The output of the classifiers are then combined using various algorithms to obtain the final classification. This approach reduces running time significantly. Another method classifies data in batches.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for integrating IP telephony and a computer user interface across a hybrid communication network, comprising the steps of:
  a) transmitting data over a hybrid communication system during a data session;
  b) allowing telephonic communication over the hybrid communication system during the data session;
  c) routing the telephonic communication over the hybrid communication system via a user action;
  d) limiting the telephonic communication over the hybrid communication system based on a user profile, wherein the user profile is enforced by rules in an active database, wherein the active database provides seamless cross-location registration without a need for duplicate databases located on different networks; and
  e) providing user customized fault management tools.

2. A method as recited in claim 1, wherein the data session is initiated by a web browser.

3. A method as recited in claim 1, wherein the user action is a selection of a button on a user interface by a user.

4. A method as recited in claim 1, wherein the user interface includes a directory of information.

5. A method as recited claim 4, wherein the directory includes telephone numbers.

6. A system as recited in claim 1, wherein the user interface includes a directory of information.

7. A system as recited in claim 6, wherein the directory includes telephone numbers.

8. A method as recited in claim 1, further comprising multimedia equipment that is used to receive telephony audio from the network and to transmit telephony data to the network.

9. A method as recited in claim 8, wherein the multimedia equipment includes at least one of: a speaker and a microphone.

10. A system for integrating IP telephony and a computer user interface across a hybrid communication network, comprising:
  a) a processor that transmits data over a hybrid communication system during a data session;
  b) logic that allows telephonic communication over the hybrid communication system during the data session;
  c) logic that routes the telephonic communication over the hybrid communication system via a user action;
  d) a processor that limits the telephonic communication over the hybrid communication system based on a user profile, wherein the user profile is enforced by rules in an active database, wherein the active database provides seamless cross-location registration without a need for duplicate databases located on different networks; and
  e) providing user customized fault management tools.

11. A system as recited in claim 10, further comprising a web browser that initiates the data session.

12. A system as recited in claim 10, wherein the user action is a selection of a button on a user interface by a user.

13. A computer program embodied on a computer readable medium for integrating IP telephony and a computer user interface across a hybrid communication network, comprising:
  a) a code segment that transmits data over a hybrid communication system during a data session;
  b) a code segment that allows telephonic communication over the hybrid communication system during the data session;
  c) a code segment that routes the telephonic communication over the hybrid communication system via a user action;
  d) a code segment that limits the telephonic communication over the hybrid communication system based on a user profile, wherein the user profile is enforced by rules in an active database, wherein the active database provides seamless cross-location registration without a need for duplicate databases located on different networks; and
  e) providing user customized fault management tools.

14. A computer program as recited in claim 13, wherein the data session is initiated by a web browser.

15. A computer program as recited in claim 13, wherein the user action is a selection of a button on a user interface by a user.

16. A computer program as recited in claim 13, wherein the user interface includes a directory of information.

17. A computer program as recited in claim 16, wherein the directory includes telephone numbers.

* * * * *

UNITED STATES PATENT AND TRADEMARK OFFICE
CERTIFICATE OF CORRECTION

PATENT NO. : 6,704,303 B1
DATED : March 9, 2004
INVENTOR(S) : Michel K. Bowman-Amuah It is certified that error appears in the above-identified patent and that said Letters Patent is hereby corrected as shown below:

Column 1,
Line 44, delete "fP" and insert -- IP --

Signed and Sealed this

Thirteenth Day of July, 2004

JON W. DUDAS
*Acting Director of the United States Patent and Trademark Office*